(12) United States Patent
Kamo et al.

(10) Patent No.: US 7,764,439 B2
(45) Date of Patent: Jul. 27, 2010

(54) ZOOM LENS SYSTEM AND IMAGE PICKUP APPARATUS USING THE SAME

(75) Inventors: Yuji Kamo, Hino (JP); Masahiro Imamura, Hachioji (JP); Kenji Ono, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 631 days.

(21) Appl. No.: 11/725,824

(22) Filed: Mar. 19, 2007

(65) Prior Publication Data
US 2007/0223106 A1 Sep. 27, 2007

(30) Foreign Application Priority Data

| Mar. 22, 2006 | (JP) | ............................... 2006-078756 |
| Mar. 23, 2006 | (JP) | ............................... 2006-080485 |
| Apr. 19, 2006 | (JP) | ............................... 2006-115654 |

(51) Int. Cl.
*G02B 15/14* (2006.01)
(52) U.S. Cl. .................. 359/687; 359/715; 359/740; 359/774
(58) Field of Classification Search ................. 359/687, 359/715, 740, 774
See application file for complete search history.

(56) References Cited

U.S. PATENT DOCUMENTS

| 6,069,743 | A | * | 5/2000 | Nagata et al. ................ 359/687 |
| 7,023,624 | B2 | | 4/2006 | Nanba |
| 7,339,748 | B2 | * | 3/2008 | Terada et al. ................ 359/687 |
| 2005/0046962 | A1 | | 3/2005 | Nanba |
| 2006/0098302 | A1 | * | 5/2006 | Miyajima et al. ........... 359/687 |

FOREIGN PATENT DOCUMENTS

JP   2005-62228   3/2005

OTHER PUBLICATIONS

Patent Abstracts of Japan, Publication No. 11-316340, Nov. 16, 1999, and English translation of the Abstract.
Patent Abstracts of Japan, Publication No. 04-171411, Jun. 18, 1992, and English translation of the Abstract.
Patent Abstracts of Japan, Publication No. 2003-098433, Apr. 3, 2003, and English translation of the Abstract.
Patent Abstracts of Japan, Publication No. 2004-199000, Jul. 15, 2004, and English translation of the Abstract.

* cited by examiner

*Primary Examiner*—Evelyn A. Lester
(74) *Attorney, Agent, or Firm*—Kenyon & Kenyon LLP

(57) ABSTRACT

A zoom lens system includes, in order from an object side: a first lens unit having a positive refractive power, a second lens unit having a negative refractive power, a third lens unit having a positive refractive power, and a fourth lens unit having a positive refractive power; and in a telephoto end as compared with a wide-angle end, a space between the first lens unit and the second lens unit increases, a space between the second lens unit and the third lens unit decreases, and a space between the third lens unit and the fourth lens unit changes.

48 Claims, 28 Drawing Sheets

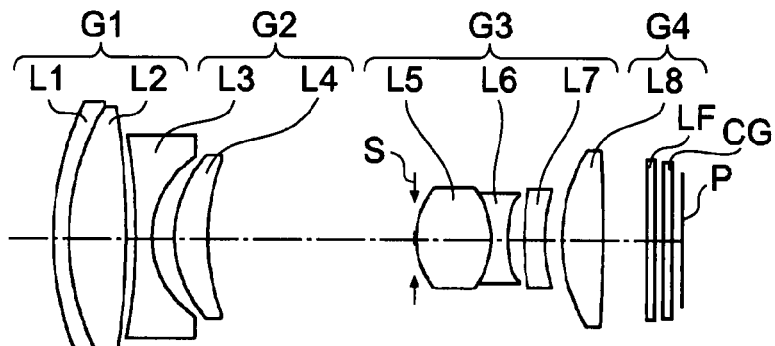
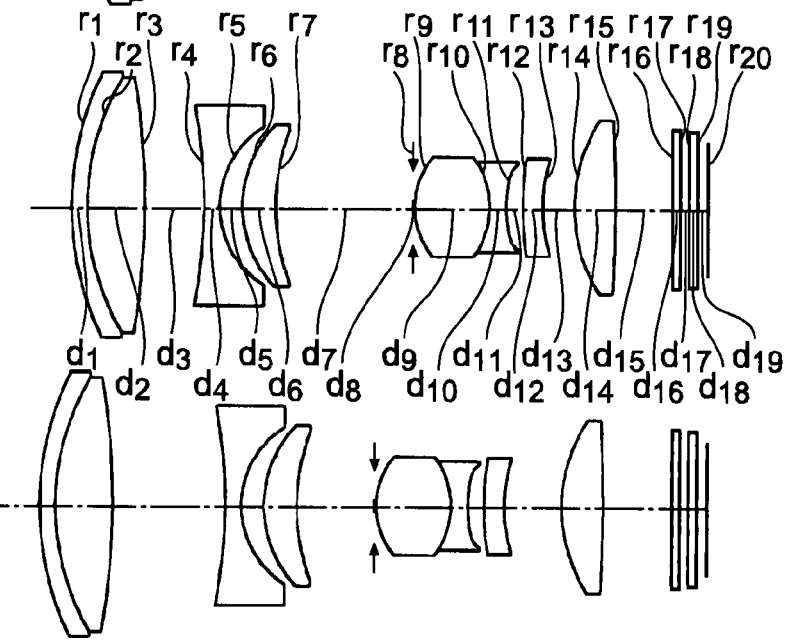
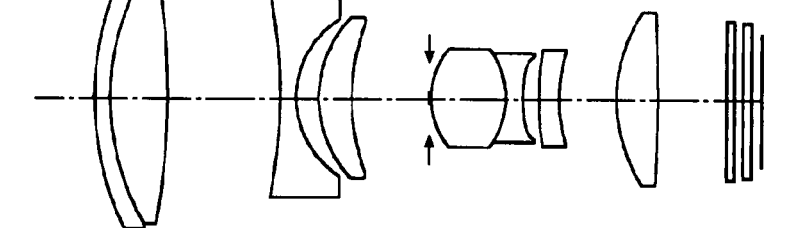
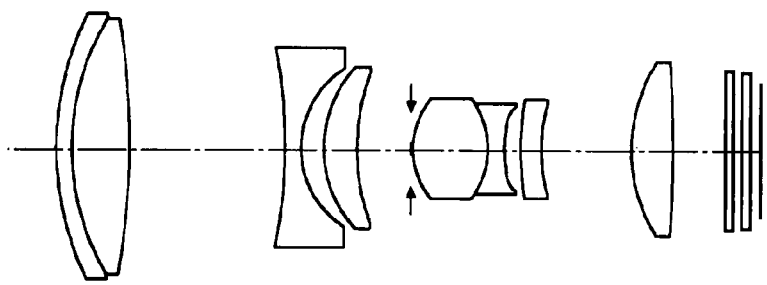
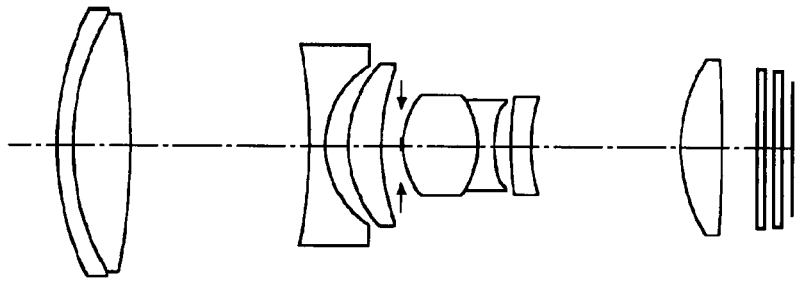

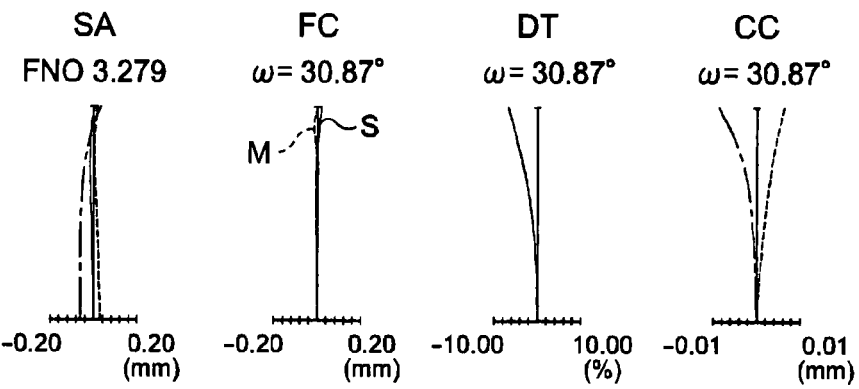
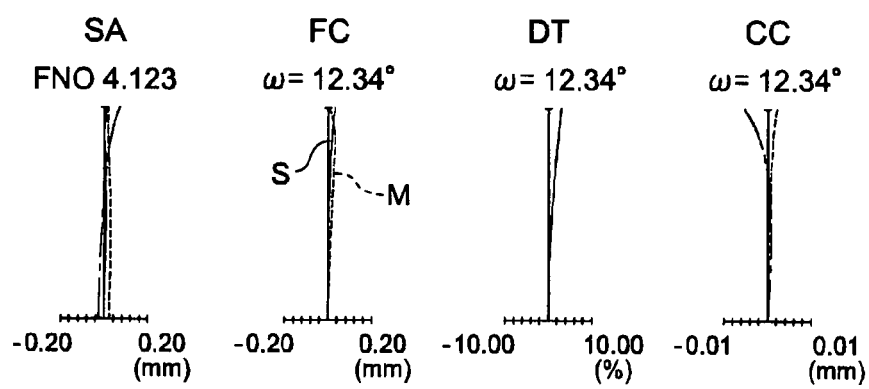
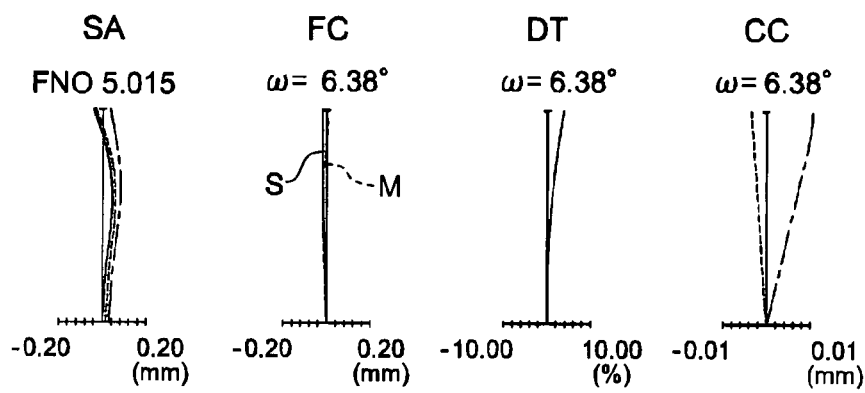

WAVE LENGTH (nm) 435.84 —·—·—
656.27 ---------
587.56 ———

WAVE LENGTH (nm) 435.84 —·—·—
656.27 ---------
587.56 ————

WAVE LENGTH (nm) 435.84 —·—·—
656.27 --------
587.56 ———

WAVE LENGTH (nm) 435.84 —·—·—
656.27 ---------
587.56 ———

WAVE LENGTH (nm) 435.84 —·—·—
656.27 - - - - -
587.56 ———

WAVE LENGTH (nm) 435.84 —·—·—
656.27 ---------
587.56 ———

WAVE LENGTH (nm) 435.84 —·—·—
656.27 ---------
587.56 ———

WAVE LENGTH (nm) 435.84 —·—·—
656.27 ---------
587.56 ———

WAVE LENGTH (nm) 435.84 —·—·—
656.27 ---------
587.56 ———

ZOOM LENS SYSTEM AND IMAGE PICKUP APPARATUS USING THE SAME

CROSS REFERENCE TO RELATED APPLICATION

This application claims benefit under 35 U.S.C. §119 of Japanese Patent Applications of No. 2006-78756 filed on Mar. 22, 2006, No. 2006-80485 filed on Mar. 23, 2006, and No. 2006-115654 filed on Apr. 19, 2006, the contents of which are incorporated herein by reference.

BACKGROUND OF THE INVENTION

1. Field of the Invention

The present invention relates to a zoom lens system and an image pickup apparatus using the zoom lens system.

2. Description of the Related Art

A digital camera is configured to photograph a subject by use of an electronic image pickup element such as a CCD image sensor or a CMOS image sensor instead of a silver halide film. In recent years, people have come to like a small and thin type of such digital camera. The thickness of the camera is determined mainly by the size of an optical system. Therefore, to achieve thinning of the camera, a constitution of the optical system is important. In recent years, a so-called collapsible lens barrel has become popular in which the optical system is projected from a camera body during photographing and in which the optical system is stored in the camera body when being carried. Therefore, in a zoom lens system, a constitution of each lens unit in consideration of the size when collapsed is important.

On the other hand, a zoom ratio of the compact digital camera is generally about 3×, but a camera having a higher zoom ratio has been demanded.

As a related technology suitable for such a zoom lens system having the high zoom ratio, a zoom lens system is known which has, in order from an object side, a first lens unit having a positive refractive power, a second lens unit having a negative refractive power, a third lens unit having a positive refractive power and a fourth lens unit having a positive refractive power.

The zoom lens system having the above refractive power layout is disclosed in Japanese Patent Application Laid-Open Nos. 4-171,411 and 2005-62,228.

In Japanese Patent Application Laid-Open Nos. 2003-98,433 and 2004-199,000, a zoom lens system having the above refractive power layout is disclosed in which the first lens unit is constituted of one positive lens and second lens unit is constituted of two lenses including a negative lens and a positive lens in order to reduce cost and decrease a diameter.

In Japanese Patent Application Laid-Open No. 11-316,340, a zoom lens system having the above refractive power layout is disclosed in which the third lens unit is constituted of three lenses including a positive lens, a negative lens and a negative lens in order from an object side, and a principal point of the third lens unit is disposed closer to the object side. In this zoom lens system, a principal point of the third lens unit can be disposed closer to the second lens unit in a telephoto end. Therefore, a magnification change function of the third lens unit can be improved, and a zoom ratio of about 5× is realized.

SUMMARY OF THE INVENTION

The present invention is directed to a zoom lens system in which increase of a zoom ratio and miniaturization are simultaneously realized and an image pickup apparatus using the zoom lens system.

According to the present invention, the zoom lens system comprises, in order from an object side: a first lens unit having a positive refractive power; a second lens unit having a negative refractive power; a third lens unit having a positive refractive power; and a fourth lens unit having a positive refractive power, wherein in a telephoto end as compared with a wide-angle end, a space between the first lens unit and the second lens unit increases;

a space between the second lens unit and the third lens unit decreases; and a space between the third lens unit and the fourth lens unit changes.

According to one aspect, in the zoom lens system according to the present invention, the third lens unit comprises, in order from the object side, a first lens which is a positive lens element, a second lens which is a double concave negative lens element and a third lens which is a negative lens element, and the total number of the lens elements included in the third lens unit is three.

According to another aspect, the third lens unit comprises, in order from the object side, a first lens which is a positive lens element, a second lens which is a negative lens element and a third lens which is a negative meniscus lens element whose convex surface faces the object side, and the total number of the lens elements included in the third lens unit is three.

According to still another aspect, the third lens unit comprises, in order from the object side, a first lens which is a positive lens element, a second lens which is a negative lens element, a third lens which is a positive lens element and a fourth lens which is a negative lens element, and the total number of the lens elements included in the third lens unit is four;

the second lens of the third lens unit is cemented to at least one of the first lens and the third lens on an optical axis; and during zooming from the wide-angle end to the telephoto end, all of the first lens unit to the fourth lens unit move along the optical axis.

According to a further aspect, the third lens unit comprises, in order from the object side, a first lens which is a positive lens element, a second lens which is a negative lens element, a third lens which is a positive lens element and a fourth lens which is a negative lens element, and the total number of the lens elements included in the third lens unit is four;

at least one of the second lens and the fourth lens of the third lens unit is a double concave lens; and during zooming from the wide-angle end to the telephoto end, all of the first lens unit to the fourth lens unit move along an optical axis.

According to a further aspect, the first lens unit comprises a positive lens element, and the total number of the lens elements included in the first lens unit is one;

the second lens unit comprises, in order from the object side, a negative lens element and a positive lens element, the total number of the lens elements included in the second lens unit is two, and the negative lens element of the second lens unit is a double concave negative lens element;

the third lens unit comprises, in order from the object side, a positive lens element, a positive lens element and a negative lens element, and the total number of the lens elements included in the third lens unit is three; and in the telephoto end, a composite system of the second lens unit and the third lens unit has a negative composite focal length.

According to a further aspect, the first lens unit comprises a positive lens element, and the total number of the lens elements included in the first lens unit is one;

the second lens unit comprises, in order from the object side, a negative lens element and a positive lens element, and the total number of the lens elements included in the second lens unit is two;

the third lens unit comprises, in order from the object side, a positive lens element, a positive lens element and a negative lens element, and the total number of the lens elements included in the third lens unit is three; and during zooming from the wide-angle end to the telephoto end, all of the first lens unit to the fourth lens unit move along an optical axis, and the fourth lens unit moves on a movement track which comprises a portion being convex toward the object side.

According to a further aspect, the first lens unit comprises a positive lens element, and the total number of the lens elements included in the first lens unit is one;

the second lens unit comprises, in order from the object side, a negative lens element and a positive lens element, the total number of the lens elements included in the second lens unit is two, and the negative lens element of the second lens unit is a double concave negative lens element; and the third lens unit comprises, in order from the object side, a positive lens element and a negative lens element, and the total number of the lens elements included in the third lens unit is two.

According to a still further aspect, the first lens unit comprises a positive lens element, and the total number of the lens elements included in the first lens unit is one;

the second lens unit comprises, in order from the object side, a negative lens element and a positive lens element, and the total number of the lens elements included in the second lens unit is two; and the third lens unit comprises, in order from the object side, a positive lens element and a double concave negative lens element, and the total number of the lens elements included in the third lens unit is two.

The zoom lens system according to the present invention is suitable for use as a photographing lens of an image pickup apparatus such as a digital camera. In this case, it is preferable that the image pickup apparatus comprises the zoom lens system according to the present invention, and an image pickup element which is disposed on an image side of the zoom lens system and which converts an optical image formed by the zoom lens system into an electric signal.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 1A to 1E are sectional views of Example 1 of the present invention along an optical axis, FIG. 1A shows an arrangement of lens units in a wide-angle end, FIGS. 1B, 1C and 1D show arrangements of the lens units in three states between the wide-angle end and a telephoto end, and FIG. 1E shows an arrangement of the lens units in the telephoto end;

FIGS. 2A to 2C are aberration diagrams showing a spherical aberration (SA), astigmatism (FC), distortion (DT) and chromatic aberration of magnification (CC) of Example 1 when focused on an infinite object, FIG. 2A shows the aberrations in the wide-angle end, FIG. 2B shows the aberrations in the state shown in FIG. 1C, and FIG. 2C shows the aberrations in the telephoto end;

FIG. 3A shows an arrangement of lens units in a wide-angle end, FIGS. 3B, 3C and 3D show arrangements of the lens units in three states between the wide-angle end and a telephoto end, and FIG. 3E shows an arrangement of the lens units in the telephoto end;

FIG. 4A shows the aberrations in the wide-angle end, FIG. 4B shows the aberrations in the state shown in FIG. 3C, and FIG. 4C shows the aberrations in the telephoto end;

FIG. 5A shows an arrangement of lens units in a wide-angle end, FIGS. 5B, 5C and 5D show arrangements of the lens units in three states between the wide-angle end and a telephoto end, and FIG. 5E shows an arrangement of the lens units in the telephoto end;

FIG. 6A shows the aberrations in the wide-angle end, FIG. 6B shows the aberrations in the state shown in FIG. 5C, and FIG. 6C shows the aberrations in the telephoto end;

FIG. 7A shows an arrangement of lens units in a wide-angle end, FIGS. 7B, 7C and 7D show arrangements of the lens units in three states between the wide-angle end and a telephoto end, and FIG. 7E shows an arrangement of the lens units in the telephoto end;

FIG. 8A shows the aberrations in the wide-angle end, FIG. 8B shows the aberrations in the state shown in FIG. 7C, and FIG. 8C shows the aberrations in the telephoto end;

FIG. 9A shows an arrangement of lens units in a wide-angle end, FIGS. 9B, 9C and 9D show arrangements of the lens units in three states between the wide-angle end and a telephoto end, and FIG. 9E shows an arrangement of the lens units in the telephoto end;

FIG. 10A shows the aberrations in the wide-angle end, FIG. 10B shows the aberrations in the state shown in FIG. 9C, and FIG. 10C shows the aberrations in the telephoto end;

FIG. 11A shows an arrangement of lens units in a wide-angle end, FIGS. 11B, 11C and 11D show arrangements of the lens units in three states between the wide-angle end and a telephoto end, and FIG. 11E shows an arrangement of the lens units in the telephoto end;

FIG. 12A shows the aberrations in the wide-angle end, FIG. 12B shows the aberrations in the state shown in FIG. 11C, and FIG. 12C shows the aberrations in the telephoto end;

FIG. 13A shows an arrangement of lens units in a wide-angle end, FIGS. 13B, 13C and 13D show arrangements of the lens units in three states between the wide-angle end and a telephoto end, and FIG. 13E shows an arrangement of the lens units in the telephoto end;

FIG. 14A shows the aberrations in the wide-angle end, FIG. 14B shows the aberrations in the state shown in FIG. 13C, and FIG. 14C shows the aberrations in the telephoto end;

FIG. 15A shows an arrangement of lens units in a wide-angle end, FIGS. 15B, 15C and 15D show arrangements of the lens units in three states between the wide-angle end and a telephoto end, and FIG. 15E shows an arrangement of the lens units in the telephoto end;

FIG. 16A shows an arrangement of lens units in a wide-angle end, FIGS. 16B, 16C and 16D show arrangements of the lens units in three states between the wide-angle end and a telephoto end, and FIG. 16E shows an arrangement of the lens units in the telephoto end;

FIG. 17A shows an arrangement of lens units in a wide-angle end, FIGS. 17B, 17C and 17D show arrangements of the lens units in three states between the wide-angle end and a telephoto end, and FIG. 17E shows an arrangement of the lens units in the telephoto end;

FIG. 18A shows an arrangement of lens units in a wide-angle end, FIGS. 18B, 18C and 18D show arrangements of the lens units in three states between the wide-angle end and a telephoto end, and FIG. 18E shows an arrangement of the lens units in the telephoto end;

FIG. 19A shows an arrangement of lens units in a wide-angle end, FIGS. 19B, 19C and 19D show arrangements of the lens units in three states between the wide-angle end and a telephoto end, and FIG. 19E shows an arrangement of the lens units in the telephoto end;

FIG. 20A shows the aberrations in the wide-angle end, FIG. 20B shows the aberrations in the state shown in FIG. 15C, and FIG. 20C shows the aberrations in the telephoto end;

FIG. 21A shows the aberrations in the wide-angle end, FIG. 21B shows the aberrations in the state shown in FIG. 16C, and FIG. 21C shows the aberrations in the telephoto end;

FIG. 22A shows the aberrations in the wide-angle end, FIG. 22B shows the aberrations in the state shown in FIG. 17C, and FIG. 22C shows the aberrations in the telephoto end;

FIG. 23A shows the aberrations in the wide-angle end, FIG. 23B shows the aberrations in the state shown in FIG. 18C, and FIG. 23C shows the aberrations in the telephoto end;

FIG. 24A shows the aberrations in the wide-angle end, FIG. 24B shows the aberrations in the state shown in FIG. 19C, and FIG. 24C shows the aberrations in the telephoto end;

DETAILED DESCRIPTION

Figure 3A:
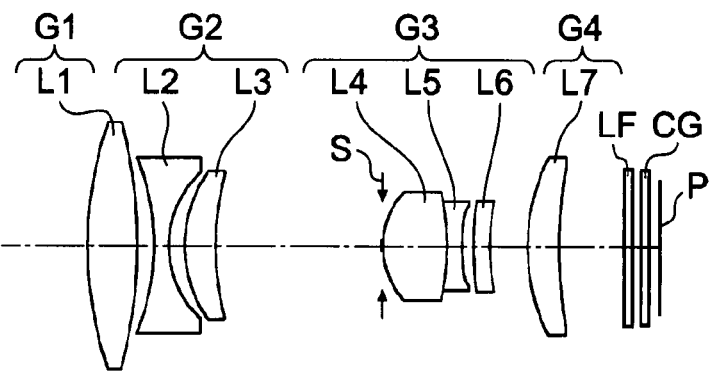
FIGS. 3A to 3E are sectional views of Example 2 of the present invention along an optical axis.

As described above, a zoom lens system according to the present invention comprises, in order from an object side: a first lens unit having a positive refractive power; a second lens unit having a negative refractive power; a third lens unit having a positive refractive power; and a fourth lens unit having a positive refractive power. As compared with a wide-angle end, in a telephoto end, a space between the first lens unit and the second lens unit increases, and a space between the second lens unit and the third lens unit decreases. When the space between the lens units is changed in this manner, both of the second lens unit and the third lens unit share a magnification change function, a zoom ratio is secured and aberration fluctuations are reduced. To miniaturize such a zoom lens system, a constitution of the third lens unit having a large magnification change function needs to be devised. Specifically, to reduce a space between principal points of the second and third lens units both having a large magnification change function, a constitution is preferable in which the principal point of the third lens unit is shifted toward the object side and aberrations generated in the third lens unit can be reduced.

For this purpose, it is preferable that the third lens unit is constituted of three lenses including, in order from the object side, a first lens having a positive refractive power, a second lens having a negative refractive power and a third lens having a negative refractive power. In consequence, a principal point position of the third lens unit is shifted toward the object side, and the zoom lens system can be miniaturized. Further, the aberrations can sufficiently be corrected in the lens unit, and a high zoom ratio can be achieved. Furthermore, since the number of the lenses is as small as three, a thickness of the system in a depth direction can be reduced in a case where the lenses are collapsed using a collapsible lens barrel.

Moreover, in general, the refractive power of each lens unit of the zoom lens system needs to be strengthened in order to achieve both of decrease of the total length of the zoom lens system and increase of the zoom ratio. However, in a lens unit such as the third lens unit having the large magnification change function, when the refractive power is increased, a generated aberration amount remarkably increases. Especially, when there is only one lens having a positive refractive power in the lens unit, the lens has an excessively large converging function. As a method for correcting the aberrations generated in this manner, there is a method in which a diverging function of a negative lens is used.

To use this method, it is preferable that the second lens of the third lens unit is a double concave negative lens. In a case where the negative lens is disposed in a position adjacent to a positive lens having the large converging function, that is, a position in which a ray height is nearly the same as that in the positive lens, a spherical aberration and a coma can effectively be corrected. Since the negative lens is a double concave negative lens, the diverging function can be obtained on the opposite surfaces, and the aberrations can more effectively be corrected. According to such a constitution, the high zoom ratio is achieved while the total length of the zoom lens system is reduced.

In a case where the first lens having a positive refractive power and the second lens having a negative refractive power are arranged in the third lens unit to constitute a telephoto type and the principal point is shifted toward the object side, when the refractive powers of these lenses are strengthened, the miniaturization of the zoom lens system can effectively be achieved. In this case, a remaining aberration might increase. To prevent this increase, it is preferable the third lens of the third lens unit is a negative meniscus lens whose convex surface faces the object side. When the third lens of the third lens unit is the negative meniscus lens in this manner, the coma and a distortion generated and remaining in the first and second lenses can appropriately be corrected by the converging and diverging functions of the negative meniscus lens. As a result, the miniaturized zoom lens system and the high zoom ratio are achieved.

It is more preferable that the third lens unit is constituted of three lenses including, in order from the object side, a first lens which is a positive lens, a second lens which is a double concave negative lens and a third lens which is a negative meniscus lens whose convex surface faces the object side. This is because adjustment of the principal point and the correction of the aberrations can effectively be performed in the third lens unit.

In the above zoom lens system, it is preferable that the first lens unit and the third lens unit are arranged closer to the object side in the telephoto end than in the wide-angle end.

According to the above zoom lens system, contribution of the third lens unit to magnification change is well balanced with respect to the aberrations. To achieve this, when the third lens unit is moved as described above and the third lens unit shares a magnification change function, the high zoom ratio can effectively be achieved. When the first lens unit is moved as described above, the second lens unit can share the magnification change function. This is preferable for reducing the total length of the zoom lens system in the wide-angle end while securing a focal length in the telephoto end.

Moreover, in the above zoom lens system, it is preferable that each of the first, second and fourth lens units is constituted of one or two lenses.

That is, it is preferable that lens units other than the third lens unit are each constituted of one or two lenses in consideration of the reduction of the total length of the zoom lens system when collapsed. At this time, the first lens unit is constituted of one positive lens, or constituted of two lenses including the positive lens and the negative lens in consideration of a chromatic aberration. This constitution is effective in thinning the lens system when collapsed and reducing a diameter of each lens. It is also preferable that the second lens unit is constituted of two lenses including the positive lens and the negative lens in consideration of the chromatic aberration. Furthermore, the fourth lens unit may have a small refractive power. Therefore, it is preferable that the fourth lens unit is constituted of one positive lens in order to miniaturize the lens system when collapsed. It is to be noted that in a case where the fourth lens unit is moved to finely correct aberration fluctuations (fluctuation of astigmatism and the like) and adjust a position of an exit pupil, if the fourth lens unit is constituted of one lens, burden of lens unit driving mechanism can be reduced.

It is more effective for the miniaturization and the high zoom ratio that the zoom lens system described above is constituted so as to meet the following conditions and constitutions.

It is preferable that the zoom lens system satisfies the following condition (1A):

$$0.2 \leq Ih/f_{g3} \leq 0.7 \tag{1A}$$

in which Ih is the maximum image height, and $f_{g3}$ is a focal length of the third lens unit.

When the focal length of the third lens unit is not above an upper limit value of the condition (1A), the refractive power of the third lens unit can be suppressed, and the spherical aberration and the coma are easily corrected. When the focal length is not below a lower limit value of the condition (1A), the total length of the zoom lens system is easily reduced while maintaining the refractive power of the third lens unit. Since the magnification change function of the third lens unit is secured, the refractive powers of the first and second lens units can be reduced. This contributes to the reduction of the aberrations generated in the first and second lens units. Therefore, the number of the lenses of the first and second lens units can be reduced. It is further preferable that the upper limit value of the condition (1A) is set to 0.6 and/or the lower limit value is set to 0.3.

It is preferable that the above zoom lens system satisfies the following condition (2A):

$$1.8 \leq f_{g1}/f_{g3} \leq 4.0 \tag{2A}$$

in which $f_{g1}$ is a focal length of the first lens unit, and $f_{g3}$ is a focal length of the third lens unit.

When the focal lengths of the first and third lens units are not above an upper limit value of the condition (2A), the refractive power of the first lens unit can be maintained. Therefore, the total length of the zoom lens system is easily reduced. Alternatively, the refractive power of the third lens unit is reduced, and the spherical aberration and the coma are easily reduced. When the focal length is not below a lower limit value of the condition (2A), the refractive power of the first lens unit is reduced, and deterioration of the distortion and astigmatism is easily inhibited. Alternatively, the refractive power of the third lens unit is maintained, and the total length of the zoom lens system is easily reduced. It is further preferable that the upper limit value of the condition (2A) is set to 3.5 and/or the lower limit value is set to 2.0.

It is preferable that the above zoom lens system satisfies the following condition (3A):

$$-1.5 \leq f_{g2}/f_{g3} \leq -0.4 \quad (3A),$$

in which $f_{g2}$ is a focal length of the second lens unit, and $f_{g3}$ is a focal length of the third lens unit.

When the focal lengths of the second and third lens units are not above an upper limit value of the condition (3A), the third lens unit does not have an excessively large refractive power as compared with the second lens unit. The spherical aberration and the coma are easily corrected. When the focal length is not below a lower limit value of the condition (3A), the second lens unit does not have an excessively large refractive power as compared with the third lens unit. Therefore, the spherical aberration and the coma are easily corrected. Furthermore, the distortion and astigmatism in the wide-angle end are also easily corrected. It is further preferable that the upper limit value of the condition (3A) is set to −0.5 and/or the lower limit value is set to −1.2.

It is preferable that the above zoom lens system satisfies the following condition (4A):

$$0.1 \leq f_{g3}/f_{g4} \leq 1.2 \quad (4A),$$

in which $f_{g3}$ is a focal length of the third lens unit, and $f_{g4}$ is a focal length of the fourth lens unit.

When the focal lengths of the third and fourth lens units are not above an upper limit value of the condition (4A), a principal point of a composite lens system of the third and fourth lens units does not excessively shift toward the third lens unit. Therefore, a back focal length (a distance from a lens surface of the zoom lens system closest to an image side to an image surface) shortens, and the total length of the zoom lens system is easily reduced. When the focal lengths are not below a lower limit value of the condition (4A), the principal point of the composite lens system of the third and fourth lens units does not excessively shift toward the third lens unit. Therefore, an appropriate back focal length can be secured, and an incidence angle of an off-axial chief ray upon the image surface can be inhibited from being enlarged. A correction effect of the aberrations by the fourth lens unit can be maintained. It is further preferable that the upper limit value of the condition (4A) is set to 1.0 and/or the lower limit value is set to 0.2.

It is preferable that the above zoom lens system satisfies the following condition (5A):

$$1.2 \leq \beta_{2T}/\beta_{2W} \leq 5.0 \quad (5A),$$

in which $\beta_{2T}$ is a lateral magnification of the second lens unit in the telephoto end, and $\beta_{2W}$ is a lateral magnification of the second lens unit in the wide-angle end.

When the lateral magnification of the second lens unit is not above an upper limit value of the condition (5A), a magnification change effect of the second lens unit is appropriately suppressed, and aberration fluctuations due to the magnification change are easily reduced. When the lateral magnification is not below a lower limit value of the condition (5A), the magnification change effect of the second lens unit can be maintained. Therefore, a movement amount of another lens unit is easily reduced. When the condition is set as described above, the movement amounts of the lens units for the magnification change can easily be set to values close to each other. This is useful in setting thicknesses (lengths in an optical axis direction) of lens frames for moving the lens units to values close to each other, and the thickness of the zoom lens system when collapsed is easily reduced. It is further preferable that the upper limit value of the condition (5A) is set to 3.0 and/or the lower limit value is set to 1.5.

It is preferable that the above zoom lens system satisfies the following condition (6A):

$$1.2 \leq \beta_{3T}/\beta_{3W} \leq 5.0 \quad (6A),$$

in which $\beta_{3T}$ is a lateral magnification of the third lens unit in the telephoto end, and $\beta_{3W}$ is a lateral magnification of the third lens unit in the wide-angle end.

When the lateral magnification of the third lens unit is not above an upper limit value of the condition (6A), the magnification change effect of the third lens unit is appropriately suppressed, and the aberration fluctuations due to the magnification change are easily reduced. When the lateral magnification is not below a lower limit value of the condition (6A), the magnification change effect of the third lens unit can be maintained. Therefore, a movement amount of another lens unit is easily reduced. When the lateral magnification of the third lens unit is set in the above range, the movement amounts of the lens units for the magnification change can easily be set to values close to each other. This is useful in setting thicknesses (lengths in the optical axis direction) of lens frames for moving the lens units to values close to each other, and the thickness of the system when collapsed is easily reduced. It is further preferable that the upper limit value of the condition (6A) is set to 4.0 and/or the lower limit value is set to 1.5.

It is preferable that the above zoom lens system satisfies the following condition (7A):

$$0.1 \leq D_{g1}/D \leq 2.0 \quad (7A),$$

in which $D_{g1}$ is a movement amount of the first lens unit during the magnification change from the wide-angle end to the telephoto end, and D is a sum of axial distances from incidence surfaces to emission surfaces of the lens units. The sum of the axial distances from the incidence surfaces to the emission surfaces of the lens units is specifically a sum of thicknesses of the first, second, third and fourth lens units along an optical axis.

When a value of $D_{g1}/D$ is not above an upper limit value of the condition (7A), the movement amount of the first lens unit is easily reduced, and the total length of the zoom lens system in the telephoto end is easily reduced. When the value is not below a lower limit value of the condition (7A), the movement amount of the first lens unit can be secured, and the magnification change effect of the second lens unit disposed closer to the image side than the first lens unit is easily secured. Alternatively, the total length of the zoom lens system in the wide-angle end is easily reduced. It is further preferable that the upper limit value of the condition (7A) is set to 1.0 and/or the lower limit value is set to 0.2.

It is preferable that the above zoom lens system satisfies the following condition (8A):

$$0.1 \leq D_{g3}/D \leq 2.0 \quad (8A),$$

in which $D_{g3}$ is a movement amount of the third lens unit during the magnification change from the wide-angle end to the telephoto end, and D is a sum of axial distances from the incidence surfaces to the emission surfaces of the lens units.

When a value of $D_{g3}/D$ is not above an upper limit value of the condition (8A), the movement amount of the third lens unit is reduced. Therefore, the aberration fluctuations due to the magnification change are easily reduced, and the total length of the zoom lens system is easily reduced. When the value is not below a lower limit value of the condition (8A), the movement amount of the third lens unit is secured, and a magnification change function is easily secured. Therefore, since the burden of the magnification change function on the second lens unit disposed closer to the object side than the third lens unit is reduced, the total length of the zoom lens system is easily reduced. That is, when the value is set in the range of the condition, the total length of the zoom lens system is easily reduced. It is further preferable that the upper limit value of the condition (8A) is set to 1.0 and/or the lower limit value is set to 0.2.

It is preferable that the above zoom lens system satisfies the following condition (9A):

$$-0.7 \leq f_{g3L12}/f_{g3L3} \leq -0.02 \quad (9A),$$

in which $f_{g3L12}$ is a composite focal length of the first and second lenses of the third lens unit, and $f_{g3L3}$ is a focal length of the third lens of the third lens unit.

When each of the focal lengths of the lenses constituting the third lens unit is not above an upper limit value of the condition (9A), the refractive power of the third lens can be maintained, and the coma and the distortion are not easily undercorrected. Since the refractive powers of the first and second lenses are easily reduced, higher order aberrations is easily suppressed. When the focal lengths are not below a lower limit value of the condition (9A), the refractive power of the third lens is suppressed, and the coma and the distortion can be inhibited from being overcorrected. Since the powers of the first and second lenses are easily maintained, the total length of the zoom lens system is easily reduced. It is further preferable that the upper limit value of the condition (9A) is set to −1.0 and/or the lower limit value is set to −0.65.

It is preferable that the above zoom lens system satisfies the following condition (10A):

$$-1.5 \leq f_{g3L1}/f_{g3L2} \leq -0.2 \quad (10A),$$

in which $f_{g3L1}$ is a focal length of the first lens of the third lens unit, and $f_{g3L2}$ is a focal length of the second lens of the third lens unit.

When the focal length of each of the first and second lenses of the third lens unit is not above an upper limit value of the condition (10A), the refractive power of the second lens unit can be maintained, and the coma and the distortion are not easily undercorrected. Since the refractive power of the first lens unit can easily be suppressed, generation of the higher order aberrations is easily inhibited. When the focal lengths are not below a lower limit value of the condition (10A), the refractive power of the second lens can be suppressed, and the coma and the distortion can be inhibited from being overcorrected. Since the refractive power of the first lens is easily maintained, the total length of the zoom lens system is easily reduced. It is further preferable that the upper limit value of the condition (10A) is set to −0.4 and/or the lower limit value is set to −1.2.

It is preferable that the above zoom lens system satisfies the following condition (11A):

$$-0.9 < (r_{g3L2f} + r_{g3L2r})/(r_{g3L2f} - r_{g3L2r}) < 0.7 \quad (11A),$$

in which $r_{g3L2f}$ is a radius of curvature of an object-side surface of the second lens of the third lens unit, and $r_{g3L2r}$ is a radius of curvature of an image-side surface of the second lens of the third lens unit.

When the radii of curvatures of the second lens of the third lens unit are not above an upper limit value of the condition (11A), the object-side surface of the second lens of the third lens unit can maintain a diverging function. Therefore, the spherical aberration and the coma are easily corrected. Since the diverging function of the image-side surface is suppressed, the generation of the higher order aberrations is easily inhibited. When the radii of curvatures are not below a lower limit value of the condition (11A), the diverging function of the object-side surface is inhibited from being too large. Therefore, the higher order aberrations are easily inhibited from being generated. Since the diverging function of the image-side surface can be maintained, the spherical aberration, the astigmatism and the distortion are easily corrected. It is further preferable that the upper limit value of the condition (11A) is set to 0.5 and/or the lower limit value is set to −0.7. It is more preferable that the upper limit value of the condition (11A) is set to 0.2 and/or the lower limit value is set to −0.5.

It is preferable that the above zoom lens system satisfies the following condition (12A):

$$1.2 < (r_{g3L3f} + r_{g3L3r})/(r_{g3L3f} - r_{g3L3r}) < 12 \quad (12A),$$

in which $r_{g3L3f}$ is a radius of curvature of the object-side surface of the third lens of the third lens unit, and $r_{g3L3r}$ is a radius of curvature of the image-side surface of the third lens of the third lens unit.

When the radii of curvatures of the third lens of the third lens unit are not above an upper limit value of the condition (12A), the refractive power of the third lens unit can be secured, and the aberrations are easily corrected. When the radii of curvatures are not below a lower limit value of the condition (12A), a converging function of the object-side surface can be secured. Therefore, the astigmatism and the coma are not easily undercorrected. When the diverging function of the image-side surface is suppressed, the higher order aberrations are easily inhibited from being generated. It is further preferable that the upper limit value of the condition (12A) is set to 8 and/or the lower limit value is set to 1.5.

In the above zoom lens system, it is preferable that the second lens unit is constituted of two lenses including a negative lens and a positive lens in order from the object side.

In the above zoom lens system, a lens diameter of the second lens unit and a length of the lens unit in the optical axis direction are easily enlarged. A thickness of a camera at a time when the zoom lens system is collapsed is largely influenced by the number of the lenses constituting the zoom lens system. Therefore, when the second lens unit is constituted of two lenses including the negative lens and the positive lens in order from the object side in consideration of the correction of the chromatic aberration and the coma, the miniaturization is preferably well balanced with respect to a performance.

It is to be noted that when the number of the lenses constituting the lens unit is reduced, the principal point position of the lens unit is not easily controlled. Therefore, it is sometimes difficult to set a positional relation between the lens unit and another lens unit disposed closer to an image side so as to efficiently exhibit the magnification change effect. However, in the above zoom lens system, the principal point position of the third lens unit disposed closer to the image side than the second lens unit can easily shifted toward the second lens unit. Therefore, even if the number of the lenses constituting the second lens unit is reduced, the above difficulty does not easily occur. Therefore, even if the second lens unit is constituted of two lenses, the magnification change effect can be maintained.

It is to be noted that to shift the exit pupil away from the image side while miniaturizing the diameter of each of the first to fourth lens units, it is preferable that an aperture stop is disposed just before the third lens unit and moved integrally with the third lens unit during the magnification change.

In the above zoom lens system, it is more preferable that a plurality of conditions described above is simultaneously satisfied.

The above zoom lens system is preferable for use as a photographing lens of an image pickup apparatus. In general, when an incidence angle of an incident ray enlarges, brightness of an image is easily insufficient or reproduction of color is easily influenced. In the above zoom lens system, a ray emitted from the zoom lens system is easily brought into a state close to a parallel state with respect to the optical axis. Therefore, the zoom lens system is preferable in constituting an image pickup apparatus having a high zoom ratio and a high performance.

Next, numerical examples will be described.

In the following examples, R is a paraxial radius of curvature of each lens surface; D is a thickness of a lens or a space between the lenses; Nd is a refractive index of the lens for the d-line; and Vd is the Abbe number of the lens for the d-line. As the space between the lenses, a portion denoted with D3, D7 or the like instead of a numerical value indicates a variable space. Furthermore, Fno is the F-number, fL is a focal length of the zoom lens system, and 2ω is an angle of field (ω is a half angle of view). In addition, a unit of each of R, D and fL is mm. It is to be noted that "*" attached to a surface number means that the surface is an aspherical surface, "S" means that the surface is an aperture stop, and "P" means that the surface is an image surface, respectively. It is to be noted that a shape of the aspherical surface is represented by the following equation in a coordinate system in which an intersection between the aspherical surface and the optical axis is an origin, an optical axis is a z-axis, and a y-axis is set in a direction crossing the optical axis at right angles and passing though the origin:

$$z = (y^2/R)/\left[1 + \{1-(K+1)(y/R)^2\}^{1/2}\right] + A_4 \cdot y^4 + A_6 \cdot y^6 + A_8 \cdot y^8 + A_{10} \cdot y^{10} + A_{12} \cdot y^{12},$$

in which R is a paraxial radius of curvature, K is a conic constant, and $A_4, A_6, A_8, A_{10}$ and $A_{12}$ are 4-th, 6-th, 8-th, 10-th and 12-th order aspherical coefficients.

In a table of the zoom data, WE is the wide-angle end, ST1, ST2 and ST3 are states shown in FIGS. 1B, 1C and 1D, and TE is the telephoto end.

EXAMPLE 1

FIGS. 1A to 1E are sectional views of Example 1 an optical axis, FIG. 1A shows an arrangement of lens units in a wide-angle end, FIGS. 1B, 1C and 1D show arrangements of the lens units in three states between the wide-angle end and a telephoto end, and FIG. 1E shows an arrangement of the lens units in the telephoto end, respectively. FIGS. 2A to 2C are aberration diagrams showing a spherical aberration (SA), astigmatism (FC), distortion (DT) and chromatic aberration of magnification (CC) of Example 1 when focused on an infinite object, FIG. 2A shows the aberrations in the wide-angle end, FIG. 2B shows the aberrations in the state shown in FIG. 1C, and FIG. 2C shows the aberrations in the telephoto end.

As shown in FIGS. 1A to 1E, this zoom lens system is constituted of, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. On an image side of the fourth lens unit G4, a low pass filter LF coated with an IR cut coating and a CCD cover glass CG are arranged in order from the object side. It is to be noted that P is an image surface. When an optical image is received by an image pickup element such as a CCD image sensor, an image pickup surface of the image pickup element is disposed in a position of the image surface P.

The first lens unit G1 is constituted of a cemented lens including, in order from the object side, a negative meniscus lens L1 whose convex surface faces the object side and a double convex positive lens L2 having an image-side surface which is an aspherical surface. The second lens unit G2 is constituted of, in order from the object side, a double concave negative lens L3 having opposite surfaces which are aspherical surfaces and a positive meniscus lens L4 whose convex surface faces the object side. The third lens unit G3 is constituted of, in order from the object side, a cemented lens including a double convex positive lens L5 and a double concave negative lens L6 having an image-side surface which is an aspherical surface, and a negative meniscus lens L7 whose image-side surface is an aspherical surface and whose convex surface faces the object side. The fourth lens unit G4 is constituted of a double convex positive lens L8 having an object-side surface which is an aspherical surface.

During magnification change from the wide-angle end to the telephoto end, the first lens unit G1 moves toward the object side along an optical axis. The second lens unit G2 first moves toward the image side, and then reverses its movement direction in a telephoto side intermediate position (the state shown in FIG. 1D) to move toward the object side. The third lens unit G3 moves toward the object side. The fourth lens unit G4 first moves toward the object side, and then reverses its movement direction in the vicinity of the intermediate focal length state (the state shown in FIG. 1C) to move toward the image side.

Next, numerical data of the zoom lens system will be described. It is to be noted that an image height Ih is 3.8 (mm).

Numerical Data 1

| Surface number | R | D | Nd | Vd |
|---|---|---|---|---|
| 1 | 17.223 | 0.90 | 1.84666 | 23.78 |
| 2 | 14.176 | 3.30 | 1.49700 | 81.54 |
| 3* | −35.953 | D3 | | |
| 4* | −38.557 | 0.90 | 1.80610 | 40.88 |
| 5* | 4.580 | 1.29 | | |
| 6 | 7.019 | 1.84 | 1.92286 | 20.88 |
| 7 | 12.526 | D7 | | |
| 8(S) | ∞ | 0.10 | | |
| 9 | 4.493 | 4.30 | 1.77750 | 44.61 |
| 10 | −4.860 | 1.00 | 1.85147 | 25.34 |
| 11* | 10.916 | 0.92 | | |
| 12 | 20.071 | 1.20 | 1.88300 | 40.70 |
| 13* | 7.295 | D13 | | |
| 14* | 9.191 | 2.40 | 1.60696 | 34.07 |
| 15 | −71.206 | D15 | | |
| 16 | ∞ | 0.50 | 1.54771 | 62.84 |
| 17 | ∞ | 0.50 | | |
| 18 | ∞ | 0.50 | 1.51633 | 64.14 |
| 19 | ∞ | 0.59 | | |
| 20(P) | ∞ | | | |

TABLE 1-1

Aspherical Coefficient

| | Surface number | | | |
|---|---|---|---|---|
| | 3 | 4 | 5 | 11 |
| R | −35.953 | −38.557 | 4.580 | 10.916 |
| K | 0.000 | 0.000 | −0.189 | 0.000 |
| $A_4$ | $3.49833 \times 10^{-5}$ | $-6.79627 \times 10^{-4}$ | $-1.20535 \times 10^{-3}$ | $5.36678 \times 10^{-3}$ |
| $A_6$ | $3.98834 \times 10^{-8}$ | $3.88489 \times 10^{-5}$ | $-5.18870 \times 10^{-6}$ | $4.09335 \times 10^{-4}$ |
| $A_8$ | $-1.82376 \times 10^{-9}$ | $-9.82633 \times 10^{-7}$ | $2.25356 \times 10^{-6}$ | $4.72834 \times 10^{-5}$ |
| $A_{10}$ | $6.97442 \times 10^{-12}$ | $9.67102 \times 10^{-9}$ | $-1.29403 \times 10^{-7}$ | $7.84408 \times 10^{-6}$ |

TABLE 1-2

Aspherical Coefficient

| | Surface number | |
|---|---|---|
| | 13 | 14 |
| R | 7.295 | 9.191 |
| K | 0.000 | −2.346 |
| $A_4$ | $-5.36080 \times 10^{-4}$ | $4.58870 \times 10^{-4}$ |
| $A_6$ | $-2.27156 \times 10^{-4}$ | $-5.48752 \times 10^{-6}$ |
| $A_8$ | $2.87891 \times 10^{-5}$ | $1.83974 \times 10^{-7}$ |
| $A_{10}$ | $-3.15985 \times 10^{-6}$ | $-1.85925 \times 10^{-9}$ |

TABLE 2

Zoom Data

| | WE | ST1 | ST2 | ST3 | TE |
|---|---|---|---|---|---|
| fL(mm) | 6.81 | 10.55 | 16.87 | 22.98 | 32.71 |
| $F_{NO}$ | 3.28 | 3.67 | 4.12 | 4.34 | 5.02 |
| 2ω(°) | 61.74 | 38.72 | 24.67 | 18.1 | 12.77 |
| $D_3$ | 0.52 | 3.33 | 6.33 | 8.82 | 10.18 |
| $D_7$ | 11.86 | 7.91 | 4.54 | 3.15 | 1.2 |
| $D_{13}$ | 1.04 | 1.79 | 3.23 | 5.17 | 8.53 |
| $D_{15}$ | 2.56 | 3.39 | 4.06 | 3.11 | 2.05 |

EXAMPLE 2

Figure 3B:
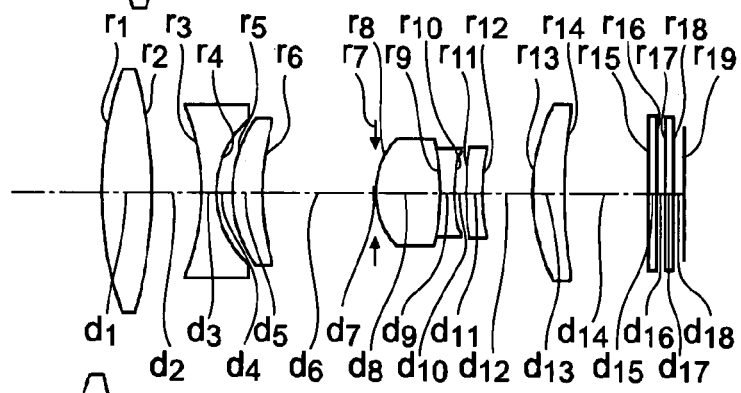
Figure 3C:
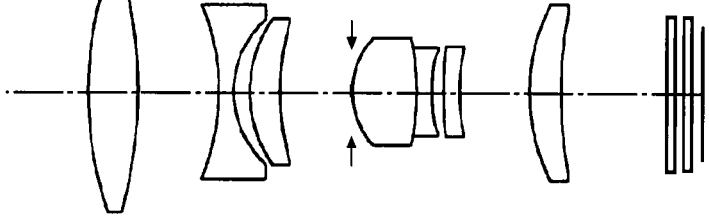
Figure 3D:
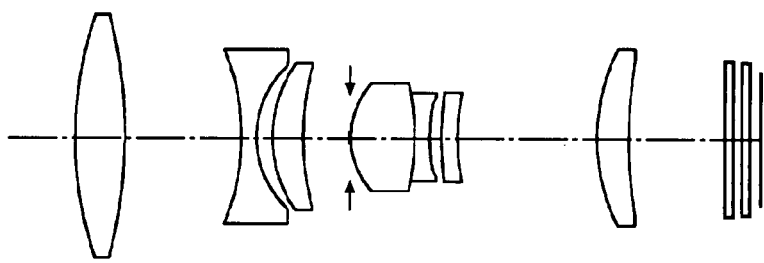
Figure 3E:
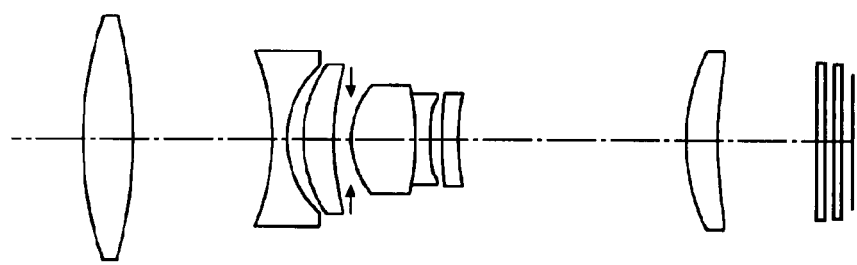
Figure 4A:
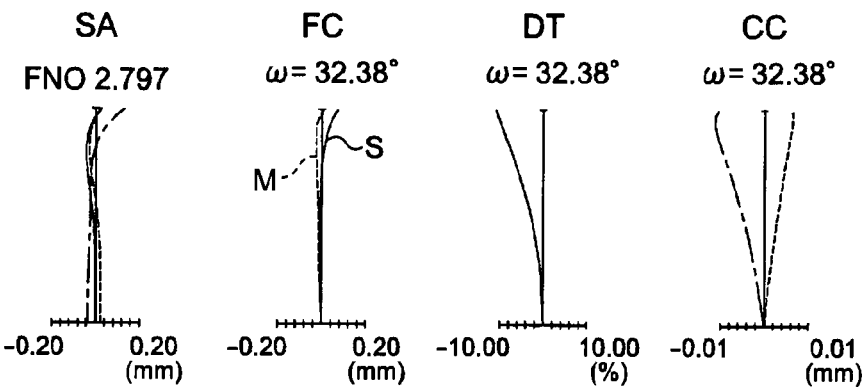
FIGS. 4A to 4C are aberration diagrams showing a spherical aberration (SA), astigmatism (FC), distortion (DT) and chromatic aberration of magnification (CC) of Example 2 when focused on an infinite object.
Figure 4B:
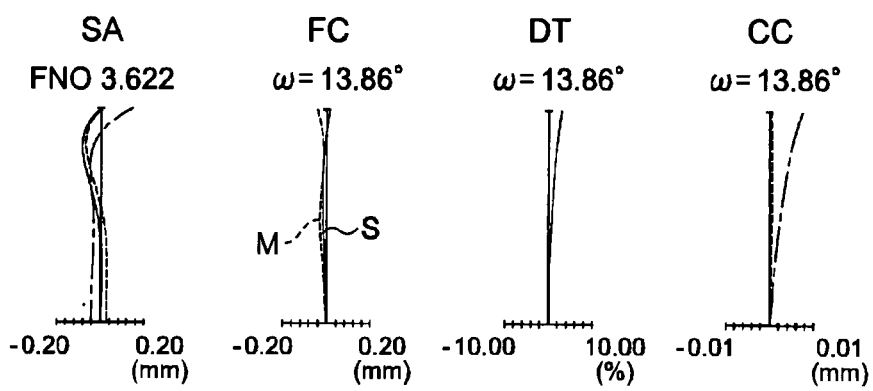
Figure 4C:
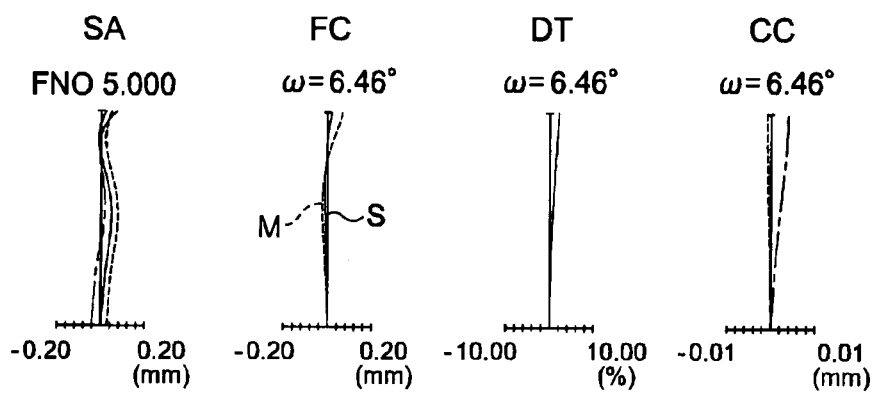

FIGS. 3A to 3E are sectional views of Example 2 along an optical axis, FIG. 3A shows an arrangement of lens units in a wide-angle end, FIGS. 3B, 3C and 3D show arrangements of the lens units in three states between the wide-angle end and a telephoto end, and FIG. 3E shows an arrangement of the lens units in the telephoto end, respectively. FIGS. 4A to 4C are aberration diagrams showing a spherical aberration (SA), astigmatism (FC), distortion (DT) and chromatic aberration of magnification (CC) of Example 2 when focused on an infinite object, FIG. 4A shows the aberrations in the wide-angle end, FIG. 4B shows the aberrations in the state shown in FIG. 3C, and FIG. 4C shows the aberrations in the telephoto end.

As shown in FIGS. 3A to 3E, this zoom lens system is constituted of, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. On an image side of the fourth lens unit G4, a low pass filter LF coated with an IR cut coating and a CCD cover glass CG are arranged in order from the object side. It is to be noted that P is an image surface. When an optical image is received by an image pickup element such as a CCD image sensor, an image pickup surface of the element is disposed in a position of the image surface P.

The first lens unit G1 is constituted of a double convex positive lens L1 having opposite surfaces which are aspherical surfaces. The second lens unit G2 is constituted of, in order from the object side, a double concave negative lens L2 having aspherical surfaces on the opposite surfaces and a positive meniscus lens L3 whose convex surface faces the object side. The third lens unit G3 is constituted of, in order from the object side, a cemented lens including a double convex positive lens L4 and a double concave negative lens L5 having an image-side surface which is an aspherical surface, and a negative meniscus lens L6 whose convex surface faces the object side. The fourth lens unit G4 is constituted of a positive lens L7 whose object-side surface is an aspherical surface and whose convex surface faces the object side.

During magnification change from the wide-angle end to the telephoto end, the first lens unit G1 moves toward the object side along an optical axis. The second lens unit G2 first moves toward the image side, and then reverses its movement direction in a wide-angle side intermediate position (the state shown in FIG. 3B) to move toward the object side. The third lens unit G3 moves toward the object side. The fourth lens unit G4 first moves toward the object side, then reverses its movement direction in the vicinity of an intermediate focal length state to move toward the image side, and again reverses its movement direction in the vicinity of a telephoto side intermediate position (the state shown in FIG. 3D) to move toward the object side. That is, the movement direction reverses twice. It is to be noted that the intermediate focal length state is a state in which the focal length has a geometrical average value of the focal length of the zoom lens system in the wide-angle end and the focal length of the zoom lens system in the telephoto end.

Next, numerical data of the zoom lens system will be described. It is to be noted that an image height Ih is 3.8 (mm).

Numerical Data 2

| Surface number | R | D | Nd | Vd |
|---|---|---|---|---|
| 1* | 24.417 | 3.00 | 1.497 | 81.54 |
| 2* | −22.1 | D2 | | |
| 3* | −9.247 | 0.90 | 1.8061 | 40.92 |
| 4* | 6.052 | 0.94 | | |
| 5 | 7.836 | 1.80 | 1.92286 | 18.9 |
| 6 | 16.764 | D6 | | |
| 7(S) | ∞ | 0.10 | | |
| 8 | 4.572 | 3.90 | 1.72916 | 54.68 |
| 9 | −14.332 | 0.90 | 1.84666 | 23.78 |

-continued

| Surface number | R | D | Nd | Vd |
|---|---|---|---|---|
| 10* | 12.814 | 0.70 | | |
| 11 | 26.959 | 1.02 | 1.84666 | 23.78 |
| 12 | 14.999 | D12 | | |
| 13* | 11.941 | 1.90 | 1.84666 | 23.78 |
| 14 | 28.471 | D14 | | |
| 15 | ∞ | 0.50 | 1.54771 | 62.84 |
| 16 | ∞ | 0.50 | | |
| 17 | ∞ | 0.50 | 1.51633 | 64.14 |
| 18 | ∞ | 0.60 | | |
| 19(P) | ∞ | | | |

TABLE 3-1

Aspherical Coefficient

| | Surface number | | | |
|---|---|---|---|---|
| | 1 | 2 | 3 | 4 |
| R | 24.417 | −22.100 | −9.247 | 6.052 |
| K | 4.100 | −11.082 | −16.614 | −0.771 |
| $A_4$ | $3.82385 \times 10^{-5}$ | $1.87893 \times 10^{-5}$ | $-4.34117 \times 10^{-4}$ | $2.02655 \times 10^{-3}$ |
| $A_6$ | $-1.77910 \times 10^{-6}$ | $-6.86108 \times 10^{-7}$ | $-9.15619 \times 10^{-6}$ | $-1.76117 \times 10^{-4}$ |
| $A_8$ | $5.04624 \times 10^{-8}$ | $2.91543 \times 10^{-8}$ | $1.71947 \times 10^{-6}$ | $1.00471 \times 10^{-5}$ |
| $A_{10}$ | $-6.87111 \times 10^{-10}$ | $-4.86383 \times 10^{-10}$ | $-5.96164 \times 10^{-8}$ | $-2.01162 \times 10^{-7}$ |
| $A_{12}$ | | | $6.34755 \times 10^{-10}$ | $-1.41873 \times 10^{-9}$ |

TABLE 3-2

Aspherical Coefficient

| | Surface number | |
|---|---|---|
| | 10 | 13 |
| R | 12.814 | 11.941 |
| K | 0.453 | 0.146 |
| $A_4$ | $3.65177 \times 10^{-3}$ | $-5.24908 \times 10^{-5}$ |
| $A_6$ | $1.05456 \times 10^{-4}$ | $2.38424 \times 10^{-6}$ |
| $A_8$ | $2.85132 \times 10^{-5}$ | $-9.36868 \times 10^{-8}$ |
| $A_{10}$ | $3.05422 \times 10^{-6}$ | $1.71014 \times 10^{-9}$ |

TABLE 4

Zoom Data

| | WE | ST1 | ST2 | ST3 | TE |
|---|---|---|---|---|---|
| fL(mm) | 6.72 | 10.10 | 14.95 | 22.07 | 32.86 |
| $F_{NO}$ | 2.80 | 3.18 | 3.62 | 4.17 | 5.00 |
| 2ω(°) | 64.75 | 40.96 | 27.71 | 18.93 | 12.93 |
| $D_2$ | 1.01 | 3.01 | 4.9 | 7.02 | 8.36 |
| $D_6$ | 10.05 | 6.77 | 4.3 | 2.76 | 1 |
| $D_{12}$ | 2.3 | 3.01 | 4.26 | 8.47 | 13.69 |
| $D_{14}$ | 3.98 | 5.22 | 6.5 | 5.95 | 6.11 |

EXAMPLE 3

Figure 5A:
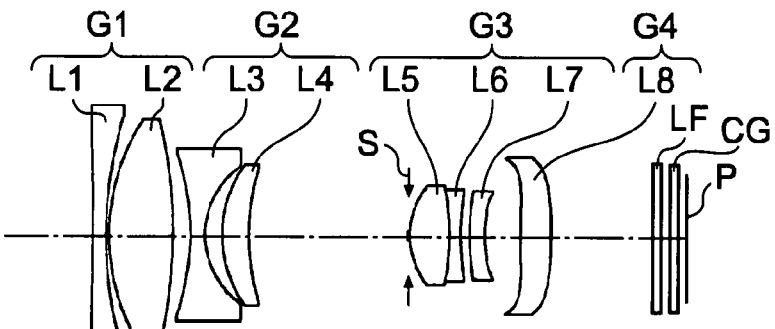
FIGS. 5A to 5E are sectional views of Example 3 of the present invention along an optical axis.
Figure 5B:
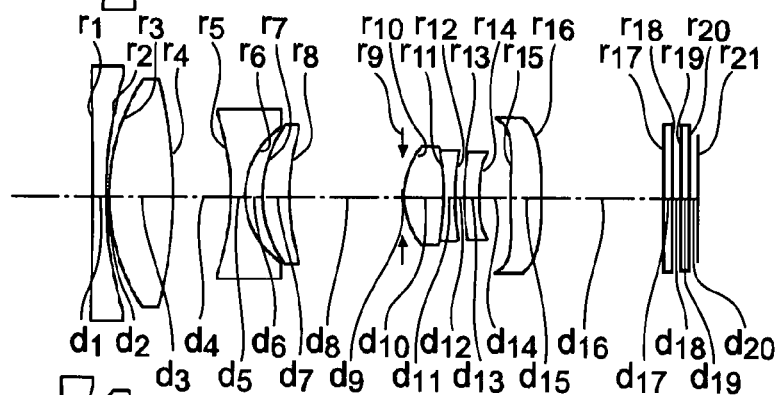
Figure 5C:
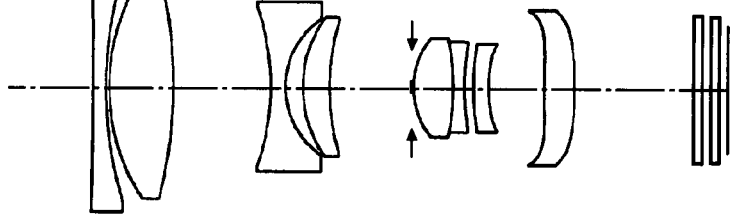
Figure 5D:
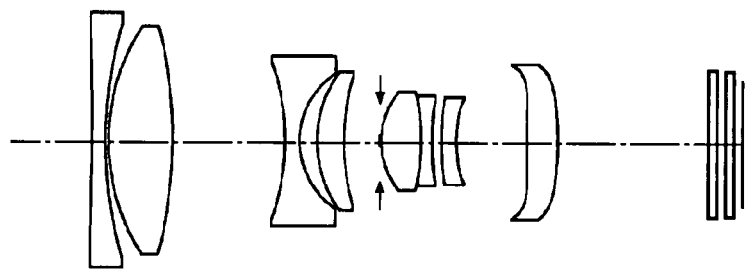
Figure 5E:
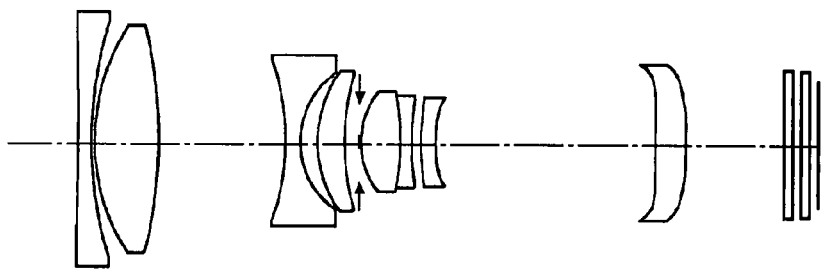
Figure 6A:
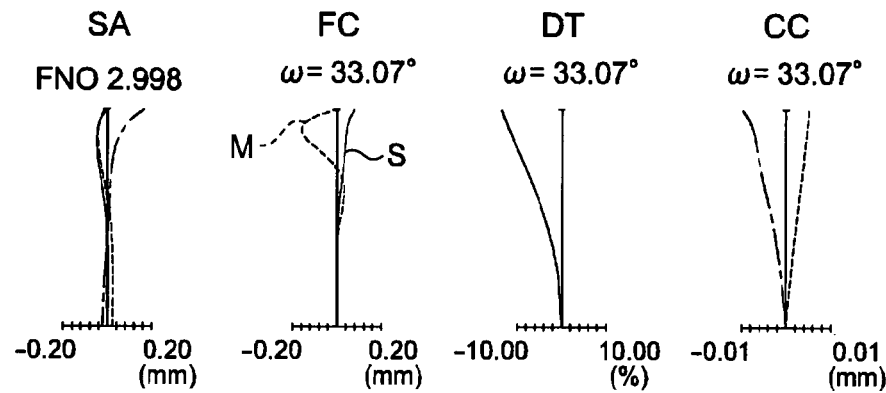
FIGS. 6A to 6C are aberration diagrams showing a spherical aberration (SA), astigmatism (FC), distortion (DT) and chromatic aberration of magnification (CC) of Example 3 when focused on an infinite object.
Figure 6B:
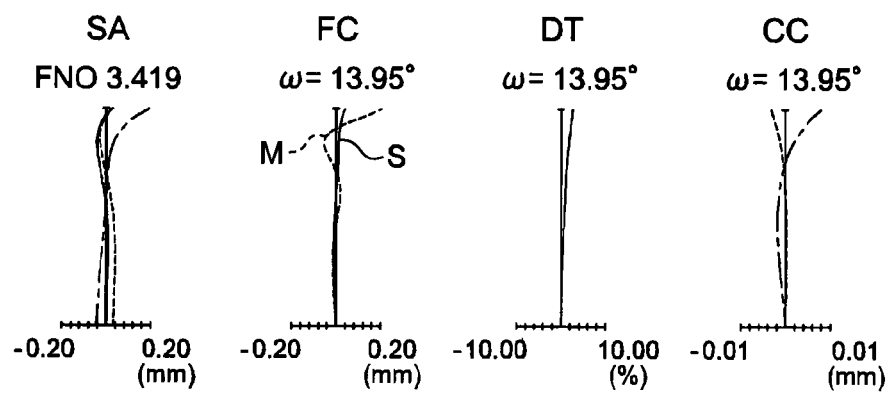
Figure 6C:
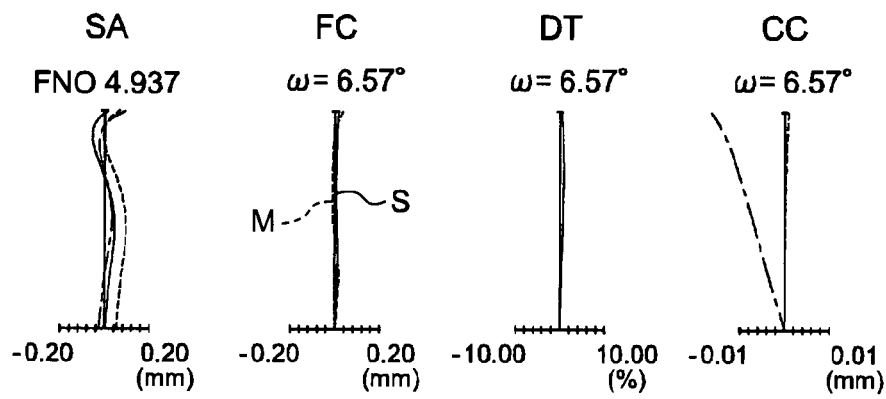

FIGS. 5A to 5E are sectional views of Example 3 along an optical axis, FIG. 5A shows an arrangement of lens units in a wide-angle end, FIGS. 5B, 5C and 5D show arrangements of the lens units in three states between the wide-angle end and a telephoto end, and FIG. 5E shows an arrangement of the lens units in the telephoto end, respectively. FIGS. 6A to 6C are aberration diagrams showing a spherical aberration (SA), astigmatism (FC), distortion (DT) and chromatic aberration of magnification (CC) of Example 3 when focused on an infinite object, FIG. 6A shows the aberrations in the wide-angle end, FIG. 6B shows the aberrations in the state shown in FIG. 5C, and FIG. 6C shows the aberrations in the telephoto end;

As shown in FIGS. 5A to 5E, this zoom lens system is constituted of, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. On an image side of the fourth lens unit G4, a low pass filter LF coated with an IR cut coating and a CCD cover glass CG are arranged in order from the object side. It is to be noted that P is an image surface. When an optical image is received by an image pickup element such as a CCD image sensor, an image pickup surface of the element is disposed in a position of the image surface P.

The first lens unit G1 is constituted of, in order from the object side, a double concave negative lens L1 and a double convex positive lens L2 having opposite surfaces which are aspherical surfaces. The second lens unit G2 is constituted of, in order from the object side, a double concave negative lens L3 having opposite surfaces which are aspherical surfaces and a positive meniscus lens L4 whose convex surface faces the object side. The third lens unit G3 is constituted of, in order from the object side, a cemented lens including a double convex positive lens L5 and a double concave negative lens L6 having an image-side surface which is an aspherical surface, and a negative meniscus lens L7 whose image-side surface is an aspherical surface and whose convex surface faces the object side. The fourth lens unit G4 is constituted of a double convex positive lens L8 having opposite surfaces which are aspherical surfaces.

During magnification change from the wide-angle end to the telephoto end, the first lens unit G1 moves toward the object side along an optical axis. The second lens unit G2 first moves toward the image side, and then reverses its movement direction in a wide-angle side intermediate position (the state shown in FIG. 5B) to move toward the object side. The third lens unit G3 moves toward the object side. The fourth lens unit G4 first moves toward the object side, then reverses its movement direction in the vicinity of the wide-angle side intermediate position (the state shown in FIG. 5B) to move toward the image side, again reverses its movement direction in the vicinity of an intermediate focal length state to move toward the object side, and further reverses its movement direction in an telephoto side intermediate position (the state shown in FIG. 5D) to move toward the image side. That is, the movement direction reverses three times.

Next, numerical data of the zoom lens system will be described. It is to be noted that an image height Ih is 3.8 (mm).

Numerical Data 3

| Surface number | R | D | Nd | Vd |
|---|---|---|---|---|
| 1 | −207.236 | 0.80 | 2.00069 | 25.46 |
| 2 | 26.58 | 0.20 | | |
| 3* | 12.563 | 4.00 | 1.7432 | 49.34 |
| 4* | −22.139 | D4 | | |
| 5* | −10.191 | 0.90 | 1.7725 | 49.6 |
| 6* | 4.658 | 1.07 | | |
| 7 | 7.375 | 1.70 | 1.92286 | 18.9 |
| 8 | 15.578 | D8 | | |
| 9(S) | ∞ | 0.10 | | |
| 10 | 4.901 | 2.50 | 1.72916 | 54.68 |
| 11 | −16.435 | 0.70 | 1.84666 | 23.78 |
| 12* | 18.98 | 0.57 | | |
| 13 | 18.09 | 1.00 | 1.84666 | 23.78 |
| 14* | 13.407 | D14 | | |
| 15* | 82.9 | 1.90 | 1.73077 | 40.51 |
| 16* | −29.635 | D16 | | |
| 17 | ∞ | 0.50 | 1.54771 | 62.84 |
| 18 | ∞ | 0.50 | | |
| 19 | ∞ | 0.50 | 1.51633 | 64.14 |
| 20 | ∞ | 0.60 | | |
| 21(P) | ∞ | | | |

TABLE 5-1

Aspherical Coefficient

| | Surface number | | | |
|---|---|---|---|---|
| | 3 | 4 | 5 | 6 |
| R | 12.563 | −22.139 | −10.191 | 4.658 |
| K | 0.021 | −9.819 | −12.890 | −2.045 |
| $A_4$ | $-1.64953 \times 10^{-6}$ | $3.43636 \times 10^{-5}$ | $-1.33301 \times 10^{-4}$ | $2.73519 \times 10^{-3}$ |
| $A_6$ | $-2.18106 \times 10^{-6}$ | $-2.17278 \times 10^{-6}$ | $-3.88146 \times 10^{-5}$ | $-1.56414 \times 10^{-4}$ |
| $A_8$ | $3.97851 \times 10^{-8}$ | $5.80156 \times 10^{-8}$ | $5.02008 \times 10^{-6}$ | $1.52452 \times 10^{-5}$ |
| $A_{10}$ | $-2.74721 \times 10^{-10}$ | $-4.92448 \times 10^{-10}$ | $-2.50613 \times 10^{-7}$ | $-9.82184 \times 10^{-7}$ |
| $A_{12}$ | | | $4.52217 \times 10^{-9}$ | $2.57069 \times 10^{-8}$ |

TABLE 5-2

Aspherical Coefficient

| | Surface number | | | |
|---|---|---|---|---|
| | 12 | 14 | 15 | 16 |
| R | 18.980 | 13.407 | 82.900 | −29.635 |
| K | −53.993 | 0.000 | −2810.300 | 7.021 |
| $A_4$ | $1.02050 \times 10^{-3}$ | $2.43305 \times 10^{-3}$ | $-2.09125 \times 10^{-4}$ | $-6.20436 \times 10^{-4}$ |
| $A_6$ | $-1.34485 \times 10^{-4}$ | $1.83327 \times 10^{-4}$ | $-4.66061 \times 10^{-5}$ | $-2.26702 \times 10^{-6}$ |
| $A_8$ | $9.98105 \times 10^{-6}$ | $8.10775 \times 10^{-6}$ | $2.11256 \times 10^{-6}$ | $-1.11042 \times 10^{-6}$ |
| $A_{10}$ | $2.87707 \times 10^{-8}$ | | $-1.51596 \times 10^{-7}$ | $-1.01627 \times 10^{-8}$ |

TABLE 6

Zoom Data

| | WE | ST1 | ST2 | ST3 | TE |
|---|---|---|---|---|---|
| fL(mm) | 6.75 | 10.10 | 14.89 | 22.16 | 32.87 |
| $F_{NO}$ | 3.00 | 3.21 | 3.42 | 3.92 | 4.94 |
| 2ω(°) | 66.15 | 41.59 | 27.9 | 19.06 | 13.14 |
| $D_4$ | 1.1 | 3.63 | 6.06 | 6.96 | 7.77 |

TABLE 6-continued

Zoom Data

| | WE | ST1 | ST2 | ST3 | TE |
|---|---|---|---|---|---|
| $D_8$ | 9.88 | 7.01 | 5.07 | 2.15 | 0.9 |
| $D_{14}$ | 2.3 | 2.03 | 3.5 | 4.4 | 13.69 |
| $D_{16}$ | 6.35 | 7.66 | 7.5 | 9.5 | 6.11 |

In the Examples, values corresponding to the above conditions are described below.

TABLE 7

| Condition | Example 1 | Example 2 | Example 3 |
|---|---|---|---|
| $Ih/f_{g3}$ | 0.41 | 0.44 | 0.42 |
| $f_{g1}/f_{g3}$ | 2.85 | 2.60 | 2.10 |
| $f_{g2}/f_{g3}$ | −0.84 | −0.72 | −0.63 |
| $f_{g3}/f_{g4}$ | 0.68 | 0.40 | 0.32 |
| $\beta_{2T}/\beta_{2W}$ | 2.59 | 1.94 | 2.19 |
| $\beta_{3T}/\beta_{3W}$ | 1.74 | 2.91 | 2.20 |
| $D_{g1}/D$ | 0.33 | 0.78 | 0.57 |
| $D_{g3}/D$ | 0.38 | 0.89 | 0.72 |
| $f_{g3L12}/f_{g3L3}$ | −0.59 | −0.21 | −0.13 |
| $f_{g3L1}/f_{g3L2}$ | −0.98 | −0.66 | −0.53 |

TABLE 7-continued

| Condition | Example 1 | Example 2 | Example 3 |
|---|---|---|---|
| $(r_{g3L2f} + r_{g3L2r})/(r_{g3L2f} - r_{g3L2r})$ | −0.38 | 0.06 | 0.07 |
| $(r_{g3L3f} + r_{g3L3r})/(r_{g3L3f} - r_{g3L3r})$ | 2.14 | 3.51 | 6.73 |

In the above zoom lens system, to cut unnecessary light such as ghost and flare, a flare stop may be disposed in addition to the aperture stop S. In each Example, the flare stop may be disposed in any of a position on the object side of the first lens unit, a position between the first lens unit and the second lens unit, a position between the second lens unit and the third lens unit, a position between the third lens unit and the fourth lens unit and a position between the fourth lens unit and the image surface. It may be constituted that a flare ray is cut by a frame which holds the lens, or another member may be disposed as the flare stop. A shield portion which functions as the flare stop may be disposed on the surface of an optical element such as the lens by a method such as printing or painting. Alternatively, a seal or the like may be bonded as the flare stop on the surface of the optical element. An opening of the flare stop may have any shape such as a circular shape, an elliptic shape, a rectangular shape, a polygonal shape or a shape of a region surrounded with function curves. Not only a harmful light flux but also a light flux such as coma flare in a periphery of the image surface may be cut.

Moreover, when the surface of each lens is coated with an anti-reflection coating, the ghost and flare can be reduced. When a multilayered thin film is used as the anti-reflection coating, the ghost and the flare can preferably effectively be reduced. The IR cut coating may be disposed on the surface of each lens and/or cover glass.

In the above zoom lens system, it is preferable that focusing is performed by moving the fourth lens unit. However, the present invention is not limited to this example. The focusing may be performed by moving the first, second and third lens units. A plurality of lens units may be moved to perform the focusing. The whole lens system may be moved to perform the focusing.

Furthermore, in a case where a CCD image sensor provided with a micro lens on an incidence side of a pixel is used as an image pickup element in an image pickup apparatus including the zoom lens system according to the present invention, a drop of brightness in a peripheral portion of an image can be reduced by shifting the micro lenses of the CCD image sensor. For example, design of the micro lens of the CCD image sensor can be changed depending on the incidence angle of a ray onto an image pickup surface at each image height. Alternatively, the drop of brightness in a peripheral portion of an image may be compensated by using image processing technique.

Furthermore, a distortion is intentionally generated in an optical system beforehand, and after photographing, image processing may be electrically performed to correct the distortion.

In the above zoom lens system, the third lens unit is constituted of three lenses. Next, a type in which the third lens unit is constituted of four lenses will be described.

As described above, a zoom lens system according to the present invention comprises, in order from an object side: a first lens unit having a positive refractive power; a second lens unit having a negative refractive power; a third lens unit having a positive refractive power; and a fourth lens unit having a positive refractive power. As compared with a wide-angle end, in a telephoto end, a space between the first lens unit and the second lens unit increases, and a space between the second lens unit and the third lens unit decreases. When the space between the lens units is changed in this manner, both of the second lens unit and the third lens unit share a magnification change function, a zoom ratio is secured and aberration fluctuations are reduced.

To miniaturize such a zoom lens system, it is effective to strengthen the power of the third lens unit having a large magnification change function. In this case, in order to prevent deterioration of a performance, the third lens unit needs to be constituted so that an amount of generated aberrations is easily suppressed, even if the power is strengthened.

Therefore, the third lens unit is constituted of four lenses including, in order from the object side, a first lens which is a positive lens, a second lens which is a negative lens, a third lens which is a positive lens and a fourth lens which is a negative lens. Since a converging function and a diverging function are alternately arranged in this manner, the aberrations can effectively be corrected, even if the power of the third lens unit is strengthened. Moreover, a principal point position can be shifted toward the object side to effectively exhibit the magnification change function of the third lens unit.

When the zoom ratio is increased, correction of a chromatic aberration is a problem. To solve the problem, it is preferable to dispose a cemented lens in the third lens unit. However, in the negative lenses of the third lens unit, if the fourth lens closest to an image side is cemented to the adjacent positive lens, it is difficult to impart a sufficient negative power. This is because, an object-side surface of the negative lens depends on a radius of curvature of an image-side surface of the positive lens.

When the third lens unit has a weak refractive power on the image side, it is difficult to impart a telephoto type characteristic to the third lens unit, and the ability to position a principal point of the third lens unit close to the object side deteriorates. To prevent this problem, the object-side surface or the image-side surface of the second lens of the third lens unit may be cemented to the adjacent positive lens. In this case, the ability to position the principal point of the third lens unit close to the object side is not impaired. Therefore, a high zoom ratio is easily obtained, and the total length of the zoom lens system is advantageously reduced.

Moreover, the generation of the chromatic aberration, which easily raises a problem at the high zoom ratio, can be inhibited. The second lens can be cemented to the positive lens in the third lens unit to thereby reduce the length of the third lens unit in an optical axis direction and achieve thinning of the lens system.

To position the principal point of the third lens unit closer to the object side, it is more preferable that an air space is disposed between the third lens and the fourth lens of the third lens unit. In consequence, the zoom ratio is easily secured, and the total length of the lens system when used can easily be reduced.

When the first to third lenses of the third lens unit are cemented to constitute a cemented triplet, the thickness of the zoom lens system when stored can be reduced.

Moreover, as described above, in the zoom lens system having a positive lens unit, a negative lens unit, a positive lens unit and a positive lens unit in order from the object side, when the power of the third lens unit is strengthened, the power of the positive lens of the third lens unit increases. Therefore, a constitution of the negative lens of the third lens unit is important for correcting the aberrations.

When the negative lens of the third lens unit is formed into a meniscus shape, the power of one surface remarkably increases, and higher order aberrations are generated. Therefore, the aberrations cannot be corrected with a good balance.

Moreover, when a curvature of the surface of each lens increases (an absolute value of a radius of curvature decreases), the lens surface largely protrudes in the optical axis direction in a position distant from an optical axis. Therefore, the negative lens enlarges in a thickness direction, and it is difficult to reduce the length of the third lens unit.

This is effectively prevented, when at least one of the second and fourth lenses which are the negative lenses of the third lens unit is a double concave lens. In this case, the opposite surfaces of the negative lens can share the negative refractive power to inhibit the generation of the higher order aberration. Moreover, the enlargement of the negative lens is inhibited, and miniaturization and high performance can simultaneously be achieved.

Moreover, in a constitution in which the fourth lens of the third lens unit is a double concave negative lens and an air space is disposed on the object side of this double concave negative lens, that is, the object-side surface is not cemented to another lens, the negative power can be secured without disposing a surface having a strong curvature on the fourth lens. Therefore, the telephoto type characteristic can be imparted to the third lens unit, and the principal point of the third lens unit can be positioned closer to the object side. This is advantageous in securing the zoom ratio and reducing the total length of the zoom lens system when used.

In the above zoom lens system, it is preferable that the first and third lens units are arranged closer to the object side in the telephoto end than in the wide-angle end.

When the first and third lens units are moved in this manner to positively impose a magnification change burden on the third lens unit, the high zoom ratio of the zoom lens system is advantageously achieved. It is advantageous to establish a satisfactory balance between contribution of the second and third lens units to the magnification change and the aberrations.

Moreover, it is preferable that the first lens unit is moved as described above to achieve both of the reduction of the total length of the zoom lens system in the wide-angle end and the securing of a focal length in the telephoto end.

To reduce the total length of the zoom lens system when collapsed, it is preferable that each of the first, second and fourth lens units is constituted of one or two lens elements.

This constitution also contributes to reduction of a diameter of each lens.

It is to be noted that in consideration of the correction of the chromatic aberration, the first lens unit is preferably constituted of two lenses including a positive lens and a negative lens. It is preferable that the second lens unit is also constituted of two lenses including the positive lens and the negative lens. Since a burden of an only small power may be imposed on the fourth lens unit, it is preferable that the fourth lens unit is constituted of one positive lens in order to minimize the zoom lens system when collapsed.

Moreover, the fourth lens unit can be moved to reduce a slight fluctuation of aberration (fluctuations of an astigmatism and a coma) during zooming and to adjust an exit pupil position. To perform such correction and adjustment, when the fourth lens unit is constituted of one lens, a burden to the lens driving mechanism is preferably reduced.

The above zoom lens system is preferable for use as a photographing lens of an image pickup apparatus. In general, when an incidence angle of an incident ray enlarges, brightness of an image may easily become insufficient or reproduction of color may be easily influenced. To prevent this problem, as described herein, it is preferable that the zoom lens system is constituted so as to have the positive lens unit, the negative lens unit, the positive lens unit and the positive lens unit in order from the object side, and a ray emitted from the zoom lens system is brought into a state close to a parallel state with respect to the optical axis.

When the above zoom lens system is constituted so as to satisfy the following constitutions and conditions, the miniaturization and the high zoom ratio are more effectively achieved.

It is preferable that the above zoom lens system satisfies the following condition:

$$0.3 < Ih/f_{g3} < 1.2 \quad (1B),$$

in which Ih is the maximum image height, and $f_{g3}$ is a focal length of the third lens unit.

When a value of $Ih/f_{g3}$ is not above an upper limit of this condition, the power of the third lens unit can be inhibited from being excessively strengthened, and a spherical aberration and the coma are advantageously corrected.

When the value is not below a lower limit, the total length of the zoom lens system is advantageously reduced while securing the power of the third lens unit. The power of the first lens unit or the second lens unit can be suppressed, and the aberrations of the first and second lens units can be suppressed with the small number of the lenses.

It is to be noted that it is more preferable to satisfy the following condition:

$$0.35 < Ih/f_{g3} < 0.7 \quad (1B\text{-}1).$$

It is preferable that the above zoom lens system satisfies the following condition:

$$2 < f_{g1}/f_{g3} < 7 \quad (2B),$$

in which $f_{g1}$ is a focal length of the first lens unit, and $f_{g3}$ is a focal length of the third lens unit.

When a value of $f_{g1}/f_{g3}$ is not above an upper limit of this condition, the power of the first lens unit is advantageously maintained and the total length of the zoom lens system is reduced. The power of the third lens unit can be inhibited from being excessively strengthened, and the spherical aberration and the coma are advantageously corrected.

On the other hand, when the value is not below a lower limit, the power of the first lens unit can be suppressed, and a distortion and the astigmatism are advantageously corrected. Alternatively, the power of the third lens unit can be secured, and the constitution is advantageous in reducing the total length of the zoom lens system.

It is preferable that the above zoom lens system satisfies the following condition:

$$-1.5 < f_{g2}/f_{g3} < -0.5 \quad (3B),$$

in which $f_{g2}$ is a focal length of the second lens unit, and $f_{g3}$ is a focal length of the third lens unit.

When a value of $f_{g2}/f_{g3}$ is not above an upper limit of this condition, the power of the third lens unit can be suppressed. This constitution is advantageous in correcting the spherical aberration and the coma which are easily generated in the third lens unit.

On the other hand, when the value is not below a lower limit, the power of the second lens unit can be suppressed. This constitution is advantageous in correcting the spherical aberration and the coma which are easily generated in the second lens unit. In addition, the constitution is also advantageous in correcting the distortion and the astigmatism in the wide-angle end.

It is to be noted that it is more preferable to satisfy the following condition:

$$-1.2 < f_{g2}/f_{g3} < -0.65 \quad (3B\text{-}1).$$

It is preferable that the above zoom lens system satisfies the following condition:

$$0.1 < f_{g3}/f_{g4} < 0.85 \quad (4B),$$

in which $f_{g3}$ is a focal length of the third lens unit, and $f_{g4}$ is a focal length of the fourth lens unit.

When a value of $f_{g3}/f_{g4}$ is not above an upper limit of this condition, a principal point of the zoom lens system can be inhibited from being excessively shifted toward the fourth lens unit. This constitution is advantageous in reducing a back focal length and reducing the total length of the zoom lens system.

On the other hand, when the value is not below a lower limit, a principal point of the zoom lens system can be inhibited from being excessively shifted toward the third lens unit. Therefore, the back focal length is secured, and an incidence angle of a chief ray upon an image surface can be inhibited from being excessively enlarged. An aberration correcting effect of the fourth lens unit is easily maintained.

It is to be noted that it is more preferable to satisfy the following condition:

$$0.2 < f_{g3}/f_{g4} < 0.6 \quad (4\text{B-1}).$$

If is preferable that the above zoom lens system satisfies the following condition:

$$1.2 < \beta_{2T}/\beta_{2W} < 5.0 \quad (5\text{B}),$$

in which $\beta_{2T}$ is a lateral magnification of the second lens unit in the telephoto end, and $\beta_{2W}$ is a lateral magnification of the second lens unit in the wide-angle end.

When a value of $\beta_{2T}/\beta_{2W}$ is not above an upper limit of this condition, a magnification change effect of the second lens unit can be inhibited from being excessively enlarged. This constitution is advantageous in suppressing the aberration fluctuation due to zooming.

On the other hand, when the value is not below a lower limit, the magnification change effect of the second lens unit can be secured. Since a movement amount of another lens unit is suppressed, the constitution is advantageous in reducing the total length of the zoom lens system.

It is to be noted that it is more preferable to satisfy the following condition:

$$1.35 < \beta_{2T}/\beta_{2W} < 3 \quad (5\text{B-1}).$$

It is preferable that the above zoom lens system satisfies the following condition:

$$1.5 < \beta_{3T}/\beta_{3W} < 5 \quad (6\text{B}),$$

in which $\beta_{3T}$ is a lateral magnification of the third lens unit in the telephoto end, and $\beta_{3W}$ is a lateral magnification of the third lens unit in the wide-angle end.

When a value of $\beta_{3T}/\beta_{3W}$ is not above an upper limit of this condition, the magnification change effect of the third lens unit can be inhibited from being excessively enlarged. This constitution is advantageous in suppressing the aberration fluctuation due to zooming.

On the other hand, when the value is not below an lower limit of this condition, the magnification change effect of the third lens unit can be maintained. Therefore, a movement amount of another lens unit is easily reduced. When the lateral magnification of the third lens unit is set in the above range, the movement amounts of the lens units for the magnification change can easily be set to values close to each other. This is useful in setting thicknesses (lengths in the optical axis direction) of lens frames for moving the lens units to values close to each other, and the thickness of the system when collapsed is easily reduced.

It is to be noted that it is more preferable to satisfy the following condition:

$$1.8 < \beta_{3T}/\beta_{3W} < 4 \quad (6\text{B-1}).$$

It is preferable that the above zoom lens system satisfies the following condition:

$$0.1 < D_{g1}/D < 2.0 \quad (7\text{B}),$$

in which $D_{g1}$ is a distance between a position of the first lens unit in the wide-angle end and a position of the first lens unit in the telephoto end, and D is a sum of axial distances between incidence surfaces and emission surfaces of the respective lens units.

When a value of $D_{g1}/D$ is not above an upper limit of this condition, a movement amount of the first lens unit can be inhibited from being excessively enlarged. The constitution is advantageous in reducing the total length of the zoom lens system in the telephoto end.

On the other hand, when the value is not below a lower limit, the movement amount of the first lens unit is secured, the magnification change effect of the second lens unit disposed on the image side of the first lens unit can be inhibited from being excessively enlarged, and the aberration fluctuation due to the zooming is easily suppressed. Alternatively, the constitution is advantageous in reducing the total length of the zoom lens system.

It is to be noted that it is more preferable to satisfy the following condition:

$$0.2 < D_{g1}/D < 1.0 \quad (7\text{B-1}).$$

It is preferable that the above zoom lens system satisfies the following condition:

$$0.1 < D_{g3}/D < 2.0 \quad (8\text{B}),$$

in which $D_{g3}$ is a distance between a position of the third lens unit in the wide-angle end and a position of the third lens unit in the telephoto end, and D is a sum of axial distances between incidence surfaces and emission surfaces of the lens units.

When a value of $D_{g3}/D$ is not above an upper limit of this condition, a movement amount of the third lens unit can be suppressed. The constitution is advantageous in reducing the total length of the zoom lens system and reducing the aberration fluctuation due to the zooming.

On the other hand, when the value is not below a lower limit, the movement amount of the third lens unit can be secured to inhibit the magnification change effect of the second lens unit disposed on the object side from being excessively enlarged. The constitution is advantageous in reducing the total length of the zoom lens system. The aberration correction is easily balanced between the second lens unit and the third lens unit.

It is to be noted that it is more preferable to satisfy the following condition:

$$0.2 < D_{g3}/D < 1.0 \quad (8\text{B-1}).$$

It is preferable that the above zoom lens system satisfies the following condition:

$$-1.5 < f_{g3L123}/f_{g3L4} < -0.7 \quad (9\text{B}),$$

in which $f_{g3L123}$ is a composite focal length of the first to third lenses of the third lens unit, and $f_{g3L4}$ is a focal length of the fourth lens of the third lens unit.

When $f_{g3L123}/f_{g3L4}$ is not above an upper limit of this condition, the power of the fourth lens can be maintained to secure a telephoto effect in the third lens unit, and a space between the principal points of the second lens unit and the third lens unit can be reduced. This is advantageous in miniaturizing the zoom lens system and achieving a high zoom ratio. Alternatively, the power of a composite optical system constituted of the first to third lens unit can be inhibited from being excessively strengthened. This constitution is advantageous in inhibiting generation of the higher order aberration.

On the other hand, when $f_{g3L123}/f_{g3L4}$ is not below a lower limit, the power of the fourth lens is suppressed, and the coma and the distortion are inhibited from being overcorrected. Alternatively, the power of the composite optical system constituted of the first to third lens units is secured to advantageously reduce the total length of the zoom lens system.

It is to be noted that it is more preferable to satisfy the following condition:

$$-1.2 < f_{g3L123}/f_{g3L4} < -0.8 \quad (9\text{B-1}).$$

It is preferable that the above zoom lens system satisfies the following condition:

$$-1.25 < (r_{g3L1f} + r_{g3L1r})/(r_{g3L1f} - r_{g3L1r}) < -0.15 \quad (10\text{B}),$$

in which $r_{g3L1f}$ is a radius of curvature of an object-side surface of the first lens of the third lens unit, and $r_{g3L1r}$ is a radius of curvature of an image-side surface of the first lens of the third lens unit.

When the radii of curvatures of the first lens of the third lens unit are not above an upper limit of this condition, the spherical aberration and coma generated on the object-side surface of the first lens of the third lens unit can effectively be corrected on the image side. The constitution is advantageous in securing a performance.

On the other hand, when the radii of curvatures are not below a lower limit, curvatures of the opposite surfaces of the first lens of the third lens unit are not values close to each other. Therefore, the constitution is advantageous in securing the power of the first lens.

It is to be noted that it is more preferable to satisfy the following condition:

$$-1.15 < (r_{g3L1f} + r_{g3L1r})/(r_{g3L1f} - r_{g3L1r}) < -0.4 \quad (10\text{B-1}),$$

It is preferable that the above zoom lens system satisfies the following condition:

$$-1.15 < (r_{g3L2f} + r_{g3L2r})/(r_{g3L2f} - r_{g3L2r}) < 3 \quad (11\text{B}),$$

in which $r_{g3L2f}$ is a radius of curvature of the object-side surface of the second lens of the third lens unit, and $r_{g3L2r}$ is a radius of curvature of the image-side surface of the second lens of the third lens unit.

When the radii of curvatures are not below a lower limit, curvatures of the opposite surfaces of the second lens of the third lens unit are not values close to each other. Therefore, the constitution is advantageous in securing the power of the second lens and also in reducing the total length of the zoom lens system. Alternatively, the curvature of the image-side surface of the second lens of the third lens unit becomes small. This constitution is advantageous in miniaturizing the thickness of the zoom lens system and reducing generation of the higher order aberrations.

It is to be noted that it is more preferable to satisfy the following condition:

$$-1.15 < (r_{g3L2f} + r_{g3L2r})/(r_{g3L2f} - r_{g3L2r}) < 2.5 \quad (11\text{B-1}),$$

It is to be noted that it is more preferable to satisfy the following condition:

$$-0.5 < (r_{g3L2f} + r_{g3L2r})/(r_{g3L2f} - r_{g3L2r}) < 2 \quad (11\text{B-2}).$$

It is preferable that the above zoom lens system satisfies the following condition:

$$-0.8 < (r_{g3L4f} + r_{g3L4r})/(r_{g3L4f} - r_{g3L4r}) < 1.5 \quad (12\text{B}),$$

in which $r_{g3L4f}$ is a radius of curvature of the object-side surface of the fourth lens of the third lens unit, and $r_{g3L4r}$ is a radius of curvature of the image-side surface of the fourth lens of the third lens unit.

When the radii of curvatures of the fourth lens of the third lens unit are not above an upper limit of this condition, values of curvatures of the opposite surfaces are not excessively close to each other. Therefore, the constitution is advantageous in securing the power of the fourth lens and reducing the total length of the zoom lens system. Alternatively, the curvature of the image-side surface is suppressed. The constitution is advantageous in miniaturizing the fourth lens in the thickness direction and reducing the higher order aberration.

On the other hand, when the radii of curvatures are not below a lower limit value, the curvature of the image-side surface of the fourth lens can be secured to secure the aberration correcting effect. Alternatively, the constitution is advantageous in suppressing the curvature of the object-side surface to reduce the higher order aberration.

It is to be noted that it is more preferable to satisfy the following condition:

$$-0.4 < (r_{g3L4f} + r_{g3L4r})/(r_{g3L4f} + r_{g3L4r}) < 1.2 \quad (12\text{B-1}),$$

In the above zoom lens system, it is preferable that the second lens unit is constituted of a negative lens and a positive lens in order from the object side.

A thickness of a camera at a time when the zoom lens system is stored depends on the number of the lenses used in the zoom lens system. Therefore, when the number of the lenses is reduced as much as possible, the camera can be thinned. Among the lens units of the zoom lens system, the second lens unit has a large lens diameter, and a length of the lens unit tends to increase. However, when the second lens unit is constituted of two lenses including a negative lens and a positive lens, the miniaturization and a performance of correction of the chromatic aberration, the coma and the like are balanced. However, when the number of the lenses is reduced, a principal point position of the second lens unit is not easily controlled, and it is difficult to impart an appropriate magnification change effect to the second and third lens units.

However, when the third lens unit is constituted of, in order from the object side, the positive lens as the first lens, the negative lens as the second lens, the positive lens as the third lens and the negative lens as the fourth lens, it is easy to shift the principal point position of the third lens unit toward the second lens unit. Therefore, the above difficulty can be reduced. Even when the second lens unit is constituted of two lenses, the magnification change effect can be maintained. Therefore, to efficiently achieve the miniaturization and a high performance in combination of the second lens unit and the third lens unit, it is preferable that the second lens unit is constituted of two lenses including the negative lens and the positive lens in order from the object side.

It is preferable that the above zoom lens system includes an aperture stop between the second lens unit and the third lens unit.

When the aperture stop is disposed in this position to limit a diameter of a light flux, a diameter of the third lens unit is advantageously reduced.

Moreover, since the diameter of the third lens unit is reduced, the constitution is advantageous in securing the power of the third lens unit and reducing the zoom lens system in the thickness direction.

In the above zoom lens system, it is preferable that the third lens unit is disposed closer to the object side in the telephoto end than in the wide-angle end and that the aperture stop is also disposed closer to the object side in the telephoto end than in the wide-angle end.

Such a constitution is advantageous in securing a space for moving the third lens unit, and advantageous in miniaturizing the zoom lens system and achieving the high zoom ratio.

It is preferable that the above zoom lens system satisfies the following condition:

$$3.5 < f_T/f_W \qquad (13B),$$

in which $f_T$ is a focal length of the zoom lens system in the telephoto end, and $f_W$ is a focal length of the zoom lens system in the wide-angle end.

When a value of $f_T/f_W$ is not below a lower limit of this condition, a zoom lens system having a high zoom ratio is obtained. When this zoom lens system is used in an electronic camera or the like using optical zooming and electronic zooming together, the high zoom ratio is obtained in the optical zooming. Therefore, even when the electronic zooming is used, image quality is inhibited from being deteriorated.

It is to be noted that it is more preferable to satisfy the following condition:

$$4.0 < f_T/f_W \qquad (13B\text{-}1).$$

It is more preferable to satisfy the following condition:

$$4.5 < f_T/f_W \qquad (13B\text{-}2).$$

In the above description, a broad condition and a narrow condition are set to the same parameter (e.g., $Ih/f_{g3}$). However, for example, the lower limit value of the broad condition may be combined with the upper limit value of the narrow condition. Thus, the upper limit values and the lower limit values of a plurality of conditions for the same parameter may be combined to set a new condition.

It is preferable to satisfy a plurality of constitutions and conditions described above. When the plurality of constitutions and conditions described above are simultaneously satisfied, the miniaturization, the high zoom ratio and the high performance are advantageously achieved.

It is to be noted that the above zoom lens system does not exclude a case where an additional lens unit is disposed in addition to the above-described four lens units. However, when the system is constituted as a four-unit zoom lens system, the miniaturization and the performance are preferably balanced.

Next, numerical examples will be described.

In the following examples, R is a paraxial radius of curvature of each lens surface, D is a thickness of each lens or a space between the lenses, Nd is a refractive index of each lens for the d-line, and Vd is the Abbe number of each lens for the d-line. As the space between the lenses, a portion denoted with D3, D7 or the like instead of a numerical value indicates a variable space. Furthermore, Fno is the F-number, fL is a focal length of the zoom lens system, and 2ω is an angle of field (ω is a half angle of view). In addition, a unit of each of R, D and fL is mm. It is to be noted that "*" attached to a surface number means that the surface is an aspherical surface, "S" means that the surface is an aperture stop, and "P" means that the surface is an image surface, respectively. It is to be noted that a shape of the aspherical surface is represented by the following equation in a coordinate system in which an intersection between the aspherical surface and the optical axis is an origin, an optical axis is a z-axis, and a y-axis is set in a direction crossing the optical axis at right angles and passing though the origin:

$$z = (y^2/R)/\left[1 + \{1 - (K+1)(y/R)^2\}^{1/2}\right] + A_4 \cdot y^4 + A_6 \cdot y^6 + A_8 \cdot y^8 + A_{10} \cdot y^{10} + A_{12} \cdot y^{12},$$

in which R is a paraxial radius of curvature, K is a conic constant, and $A_4, A_6, A_8, A_{10}$ and $A_{12}$ are 4-th, 6-th, 8-th, 10-th and 12-th order aspherical coefficients.

Among the aspherical coefficients, for example, a value of the aspherical coefficient $A_4$ of the fourth surface of Example 4 is 3.81503e-05, but this means $3.81503 \times 10^{-5}$. It is to be noted that these symbols are common to numerical data of examples described later.

EXAMPLE 4

Figure 7A:
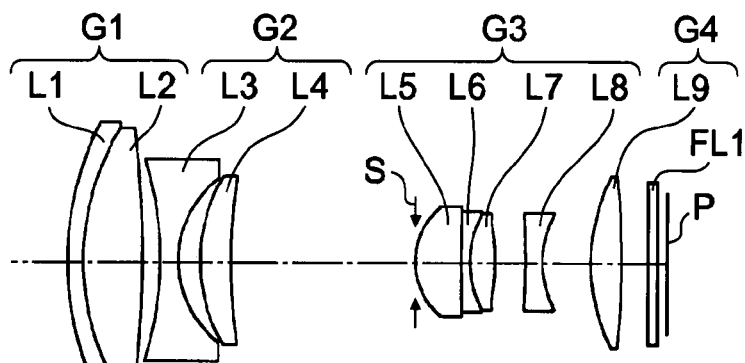
FIGS. 7A to 7E are sectional views of Example 4 of the present invention along an optical axis.
Figure 7B:
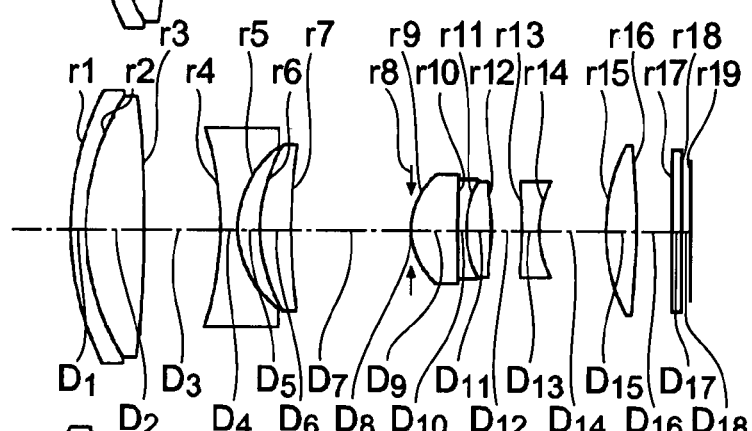
Figure 7C:
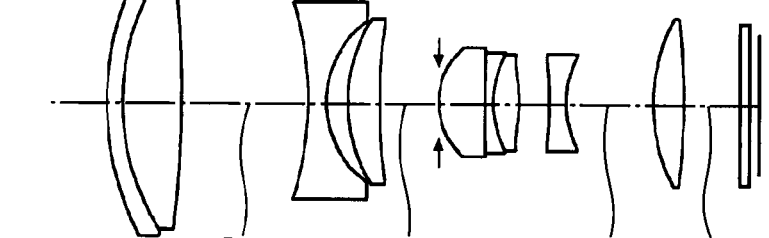
Figure 7D:
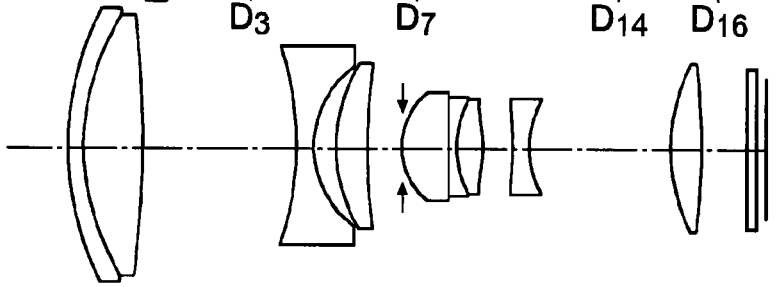
Figure 7E:
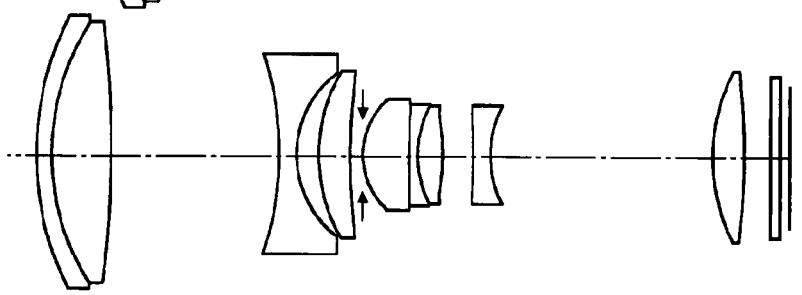

FIGS. 7A to 7E are sectional views of Example 4 along an optical axis, FIG. 7A shows an arrangement of lens units in a wide-angle end, FIGS. 7B, 7C and 7D show arrangements of the lens units in three states between the wide-angle end and a telephoto end, and FIG. 7E shows an arrangement of the lens units in the telephoto end. A focal length increases in order from FIGS. 7A, 7B, 7C, 7D and 7E.

Figure 8A:
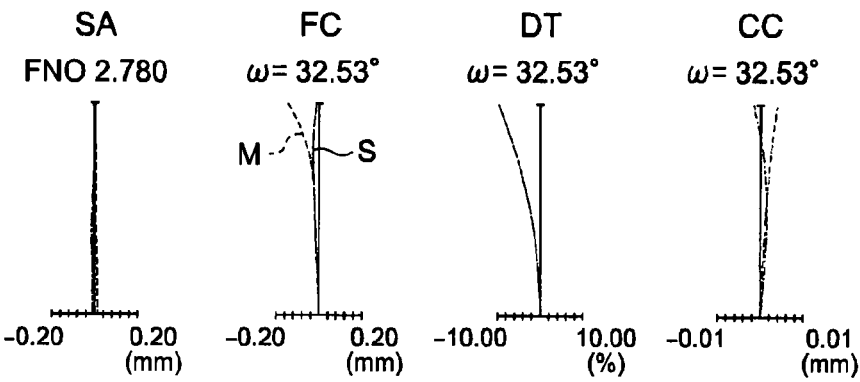
FIGS. 8A to 8C are aberration diagrams showing a spherical aberration (SA), astigmatism (FC), distortion (DT) and chromatic aberration of magnification (CC) of Example 4 when focused on an infinite object.
Figure 8B:
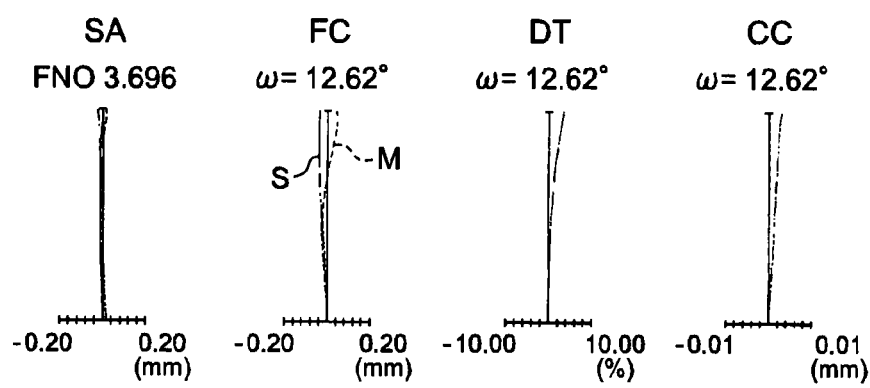
Figure 8C:
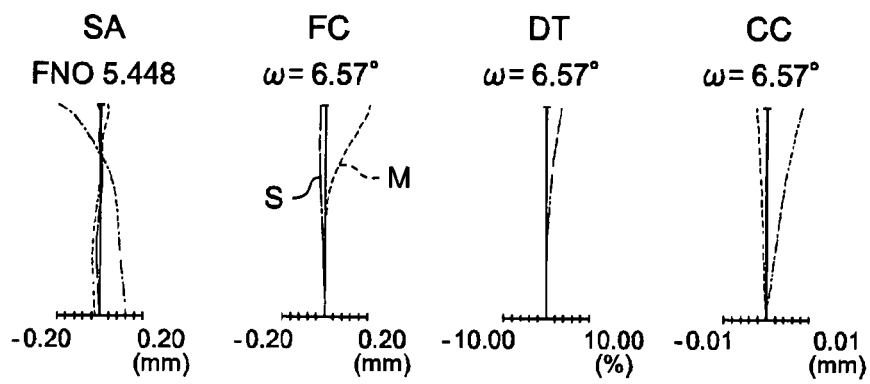

FIGS. 8A to 8C are aberration diagrams showing a spherical aberration (SA), astigmatism (FC), distortion (DT) and chromatic aberration of magnification (CC) of Example 4 when focused on an infinite object, FIG. 8A shows the aberrations in the wide-angle end, FIG. 8B shows the aberrations in the state shown in FIG. 7C, and FIG. 8C shows the aberrations in the telephoto end;

As shown in FIGS. 7A to 7E, this zoom lens system is constituted of, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. A plane parallel plate FL1 is disposed on an image side of the fourth lens unit G4. Moreover, P is an image surface. When an optical image is received by an image pickup element such as a CCD image sensor, an image pickup surface of the image pickup element is disposed in a position of the image surface P.

The first lens unit G1 is constituted of, in order from the object side, a negative meniscus lens L1 whose convex surface faces the object side and a double convex positive lens L2, and the lenses L1 and L2 are cemented. The second lens unit G2 is constituted of a double concave negative lens L3 having opposite surfaces which are aspherical surfaces and a positive meniscus lens L4 whose convex surface faces the object side. The third lens unit G3 is constituted of a positive meniscus lens L5 whose object-side surface is an aspherical surface and whose convex surface faces the object side, a negative meniscus lens L6 whose convex surface faces the object side, a double convex positive lens L7 having an image-side surface which is an aspherical surface and a double concave negative lens L8 having opposite surfaces which are both aspherical surfaces. The lenses L5, L6 and L7 are cemented. The fourth lens unit G4 is constituted of a double convex positive lens L9 having an image-side surface which is an aspherical surface. The plane parallel plate FL1 is a cover glass which protects a light receiving surface of the CCD image sensor, but may be a low pass filter coated with an infrared cut coating.

During magnification change from the wide-angle end to the telephoto end, the first lens unit G1 moves toward the object side. The second lens unit G2 once moves toward the image side, and then reverses its movement direction in the vicinity of an intermediate focal length state to move toward the object side. The third lens unit G3 moves toward the object side. The fourth lens unit G4 once moves toward the object side, and then reverses its movement direction in the vicinity of the intermediate focal length state to move toward the image side. It is to be noted that the intermediate focal length state is a state in which the focal length has a geometrical average value of the focal length of the zoom lens system in the wide-angle end and the focal length of the zoom lens system in the telephoto end.

In Example 4, an image height Ih is 3.8 mm, a focal length is in a range of 6.60 to 10.20 to 16.40 to 22.69 to 31.85 mm, and Fno is in a range of 2.78 to 3.17 to 3.70 to 4.35 to 5.45.

Next, numerical data of Example 4 will be described.

Numerical Data 4

| Surface number | R | D | Nd | Vd |
|---|---|---|---|---|
| 1 | 17.105 | 0.90 | 1.84666 | 23.78 |
| 2 | 13.55 | 3.40 | 1.497 | 81.54 |
| 3 | −65.008 | D3 | | |
| 4* | −13.94 | 1.00 | 1.8061 | 40.92 |
| 5* | 5.016 | 1.25 | | |
| 6 | 8.993 | 1.80 | 1.92286 | 20.88 |
| 7 | 33.594 | D7 | | |
| 8 (S) | ∞ | 0.00 | | |
| 9* | 3.837 | 2.64 | 1.497 | 81.54 |
| 10 | 197.151 | 0.50 | 1.6727 | 32.1 |
| 11 | 5.421 | 1.50 | 1.58913 | 61.14 |
| 12* | −8.056 | 1.75 | | |
| 13* | −45.923 | 1.00 | 1.6935 | 53.21 |
| 14* | 4.948 | D14 | | |
| 15 | 10.719 | 1.80 | 1.48749 | 70.41 |
| 16* | −65.649 | D16 | | |
| 17 | ∞ | 0.53 | 1.51633 | 64.14 |
| 18 | ∞ | 0.60 | | |
| 19 (P) | ∞ | | | |

TABLE 8-1

Aspherical Coefficient

| | Surface number | | | |
|---|---|---|---|---|
| | 4 | 5 | 9 | 12 |
| R | −13.940 | 5.016 | 3.837 | −8.056 |
| K | −1.734 | 0.000 | 0.000 | 0.000 |
| $A_4$ | 3.81503e−05 | −8.22923e−04 | −1.04110e−03 | 4.69718e−03 |
| $A_6$ | 1.13065e−05 | −1.09424e−05 | −8.07966e−07 | −8.50261e−06 |
| $A_8$ | −4.06931e−07 | 2.08584e−07 | −4.43569e−06 | −1.73554e−05 |
| $A_{10}$ | 5.57665e−09 | −5.80955e−08 | 8.64254e−08 | 4.19191e−06 |

TABLE 8-2

Aspherical Coefficient

| | Surface number | | |
|---|---|---|---|
| | 13 | 14 | 16 |
| R | −45.923 | 4.948 | −65.649 |
| K | −2317.509 | 0.000 | 0.000 |
| $A_4$ | −1.85235e−04 | 5.23559e−04 | −3.35014e−04 |
| $A_6$ | −9.09826e−05 | −7.73655e−04 | 4.74160e−06 |
| $A_8$ | −2.32982e−04 | −1.30728e−05 | 4.18422e−07 |
| $A_{10}$ | 2.86280e−05 | 9.38150e−06 | −1.57103e−08 |

TABLE 9

Zoom Data

| | WE | ST1 | ST2 | ST3 | TE |
|---|---|---|---|---|---|
| fL(mm) | 6.6 | 10.2 | 16.4 | 22.69 | 31.85 |
| $F_{NO}$ | 2.78 | 3.17 | 3.7 | 4.35 | 5.45 |
| 2ω(°) | 65.06 | 40.03 | 25.24 | 18.38 | 13.15 |
| $D_3$ | 1.08 | 4.28 | 7.25 | 8.78 | 9.51 |
| $D_7$ | 10.5 | 6.85 | 3.38 | 1.94 | 0.7 |
| $D_{14}$ | 2.8 | 3.84 | 4.94 | 8.01 | 12.64 |
| $D_{16}$ | 1.46 | 2 | 3.24 | 2.59 | 1.48 |

EXAMPLE 5

Figure 9A:
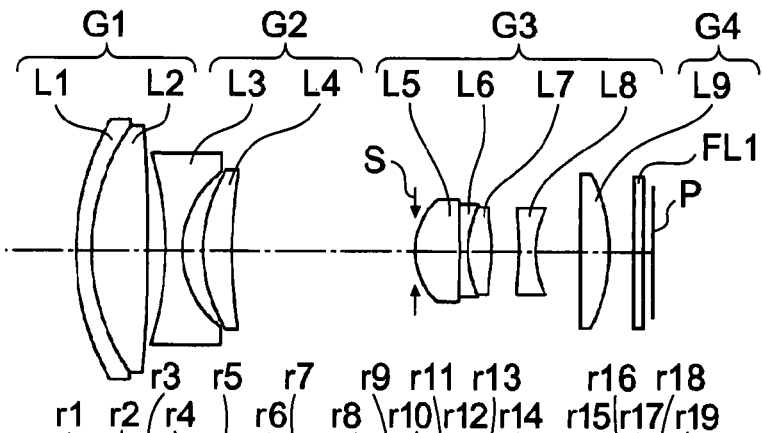
FIGS. 9A to 9E are sectional views of Example 5 of the present invention along an optical axis.
Figure 9B:
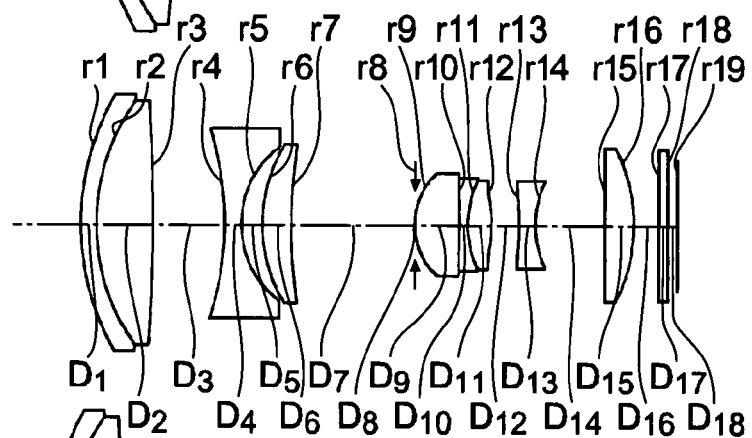
Figure 9C:
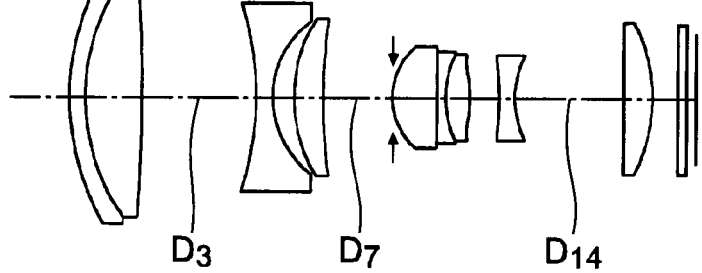
Figure 9D:
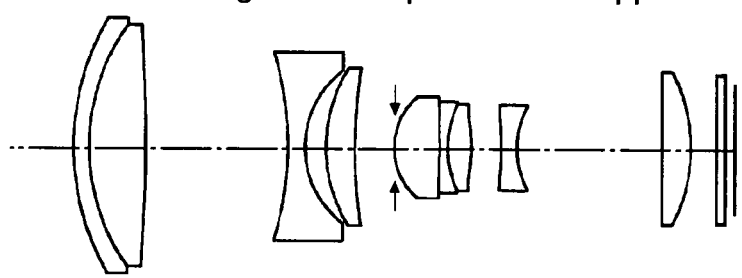
Figure 9E:
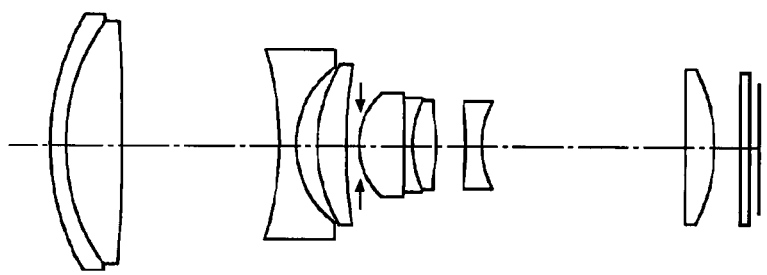

FIGS. 9A to 9E are sectional views of Example 5 along an optical axis, FIG. 9A shows an arrangement of lens units in a wide-angle end, FIGS. 9B, 9C and 9D show arrangements of the lens units in three states between the wide-angle end and a telephoto end, and FIG. 9E shows an arrangement of the lens units in the telephoto end. A focal length increases in order from FIGS. 9A, 9B, 9C, 9D and 9E.

Figure 10A:
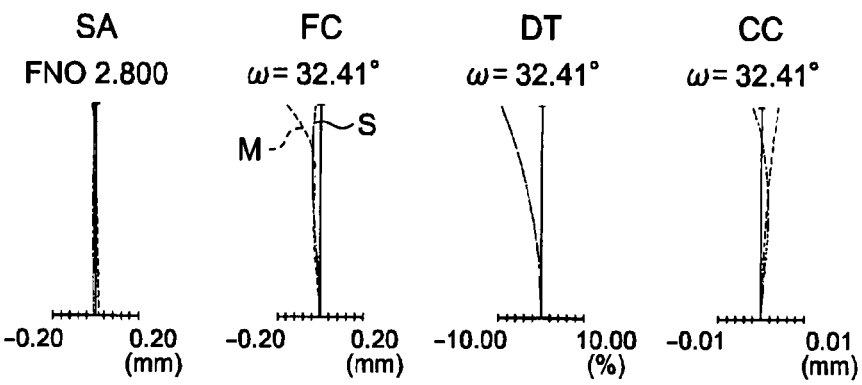
FIGS. 10A to 10C are aberration diagrams showing a spherical aberration (SA), astigmatism (FC), distortion (DT) and chromatic aberration of magnification (CC) of Example 5 when focused on an infinite object.
Figure 10B:
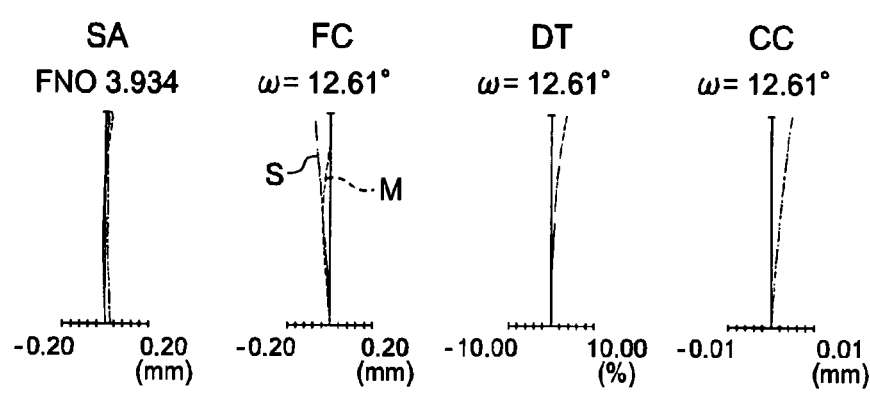
Figure 10C:
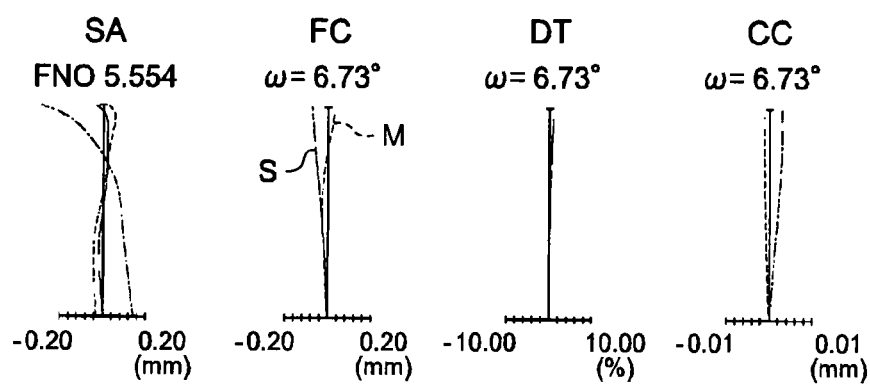

FIGS. 10A to 10C are aberration diagrams showing a spherical aberration (SA), astigmatism (FC), distortion (DT) and chromatic aberration of magnification (CC) of Example 5 when focused on an infinite object, FIG. 10A shows the aberrations in the wide-angle end, FIG. 10B shows the aberrations in the state shown in FIG. 9C, and FIG. 10C shows the aberrations in the telephoto end.

As shown in FIGS. 9A to 9E, this zoom lens system is constituted of, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. A plane parallel plate FL1 is disposed on an image side of the fourth lens unit G4. Moreover, P is an image surface. When an optical image is received by an image pickup element such as a CCD image sensor, an image pickup surface of the image pickup element is disposed in a position of the image surface P.

The first lens unit G1 is constituted of, in order from the object side, a negative meniscus lens L1 whose convex surface faces the object side and a double convex positive lens L2, and the lenses L1 and L2 are cemented. The second lens unit G2 is constituted of a double concave negative lens L3 having opposite surfaces which are aspherical surfaces and a positive meniscus lens L4 whose convex surface faces the object side. The third lens unit G3 is constituted of a double convex positive lens L5 having an object-side surface which is an aspherical surface, a double concave negative lens L6, a double convex positive lens L7 having an image-side surface which is an aspherical surface and a double concave negative lens L8 having opposite surfaces which are both aspherical surfaces. The lenses L5, L6 and L7 are cemented. The fourth lens unit G4 is constituted of a double convex positive lens L9. The plane parallel plate FL1 is a cover glass which protects a light receiving surface of the CCD image sensor, but may be a low pass filter coated with an infrared cut coating.

During magnification change from the wide-angle end to the telephoto end, the first lens unit G1 moves toward the object side. The second lens unit G2 once moves toward the image side, and then reverses its movement direction in the vicinity of an intermediate focal length state to move toward the object side. The third lens unit G3 moves toward the object side. The fourth lens unit G4 is fixed during the magnification change.

In Example 5, an image height Ih is 3.8 mm, a focal length is in a range of 6.60 to 10.20 to 16.41 to 22.69 to 31.91 mm, and Fno is in a range of 2.80 to 3.24 to 3.93 to 4.54 to 5.55.

Numerical Data 5

| Surface number | R | D | Nd | Vd |
|---|---|---|---|---|
| 1 | 15.992 | 0.90 | 1.84666 | 23.78 |
| 2 | 12.619 | 3.40 | 1.497 | 81.54 |
| 3 | −117.88 | D3 | | |
| 4* | −15.197 | 1.00 | 1.8061 | 40.92 |
| 5* | 4.971 | 1.30 | | |
| 6 | 8.781 | 1.80 | 1.92286 | 20.88 |
| 7 | 29.416 | D7 | | |
| 8 (S) | ∞ | 0.00 | | |
| 9* | 3.859 | 2.80 | 1.497 | 81.54 |
| 10 | −93.989 | 0.50 | 1.6727 | 32.1 |
| 11 | 6.025 | 1.50 | 1.58913 | 61.14 |
| 12* | −8.038 | 1.72 | | |
| 13* | −43.943 | 1.00 | 1.6935 | 53.21 |
| 14* | 5.308 | D14 | | |
| 15 | 489.427 | 1.80 | 1.48749 | 70.41 |
| 16 | −9.935 | 1.50 | | |
| 17 | ∞ | 0.53 | 1.51633 | 64.14 |
| 18 | ∞ | 0.60 | | |
| 19 (P) | ∞ | | | |

TABLE 10-1

Aspherical Coefficient

| | Surface number | | | |
|---|---|---|---|---|
| | 4 | 5 | 9 | 12 |
| R | −15.197 | 4.971 | 3.859 | −8.038 |
| K | −2.064 | 0.000 | 0.000 | 0.000 |
| $A_4$ | 1.94094e−05 | −8.11256e−04 | −1.00753e−03 | 4.69780e−03 |
| $A_6$ | 1.16844e−05 | −8.10969e−06 | 4.09967e−08 | −4.89948e−06 |
| $A_8$ | −3.83705e−07 | 3.79322e−07 | −4.44294e−06 | −1.77698e−05 |
| $A_{10}$ | 4.75767e−09 | −7.17961e−08 | 9.40707e−08 | 4.35255e−06 |

TABLE 10-2

Aspherical Coefficient

| | Surface number | |
|---|---|---|
| | 13 | 14 |
| R | −43.943 | 5.308 |
| K | −2092.754 | 0.000 |
| $A_4$ | −2.81666e−04 | 8.47602e−04 |
| $A_6$ | −9.50198e−05 | −7.58376e−04 |
| $A_8$ | −2.35970e−04 | −1.96245e−05 |
| $A_{10}$ | 3.17349e−05 | 1.18487e−05 |

TABLE 11

Zoom Data

| | WE | ST1 | ST2 | ST3 | TE |
|---|---|---|---|---|---|
| fL(mm) | 6.6 | 10.2 | 16.41 | 22.69 | 31.91 |
| $F_{NO}$ | 2.8 | 3.24 | 3.93 | 4.54 | 5.55 |
| 2ω(°) | 64.81 | 40.18 | 25.23 | 18.51 | 13.46 |
| $D_3$ | 1.1 | 4.33 | 6.92 | 8.55 | 9.45 |
| $D_7$ | 11.12 | 7.48 | 4.21 | 2.37 | 0.7 |
| $D_{14}$ | 2.78 | 4.33 | 6.80 | 8.98 | 12.49 |

EXAMPLE 6

Figure 11A:
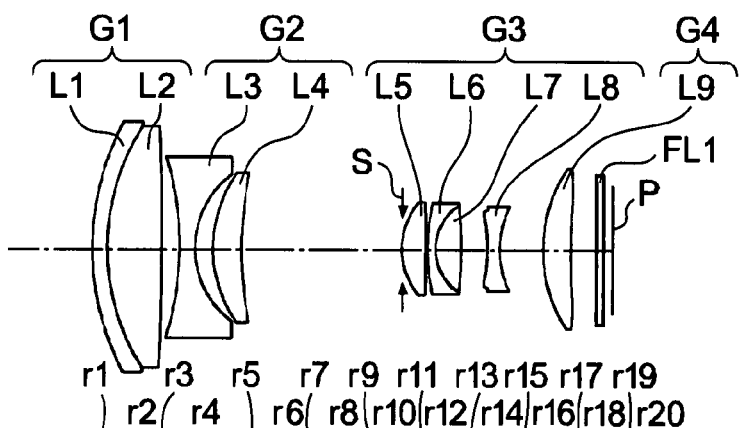
FIGS. 11A to 11E are sectional views of Example 6 of the present invention along an optical axis.
Figure 11B:
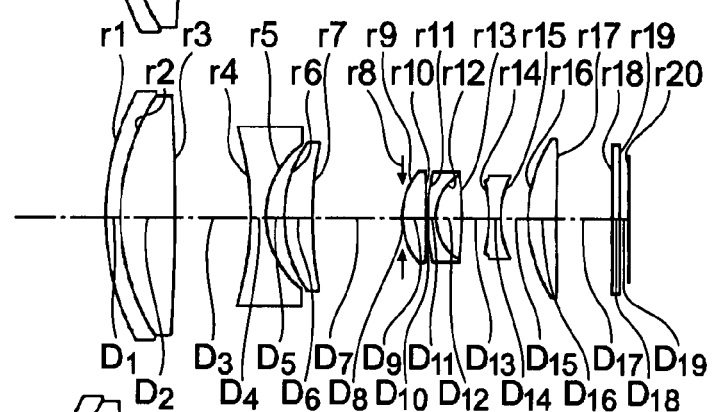
Figure 11C:
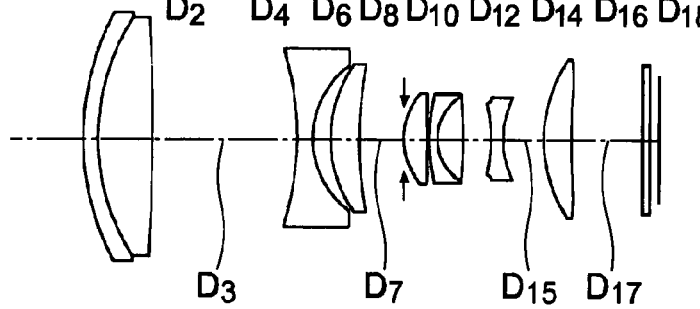
Figure 11D:
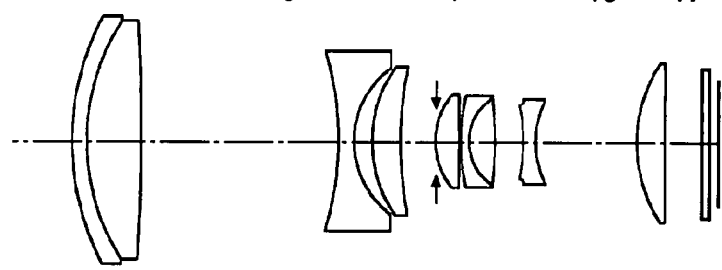
Figure 11E:
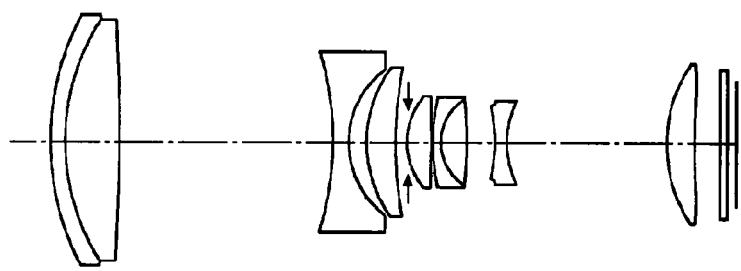

FIGS. 11A to 11E are sectional views of Example 6 along an optical axis, FIG. 11A shows an arrangement of lens units in a wide-angle end, FIGS. 11B, 11C and 11D show arrangements of the lens units in three states between the wide-angle end and a telephoto end, and FIG. 11E shows an arrangement of the lens units in the telephoto end. A focal length increases in order from FIGS. 11A, 11B, 11C, 11D and 11E.

Figure 12A:
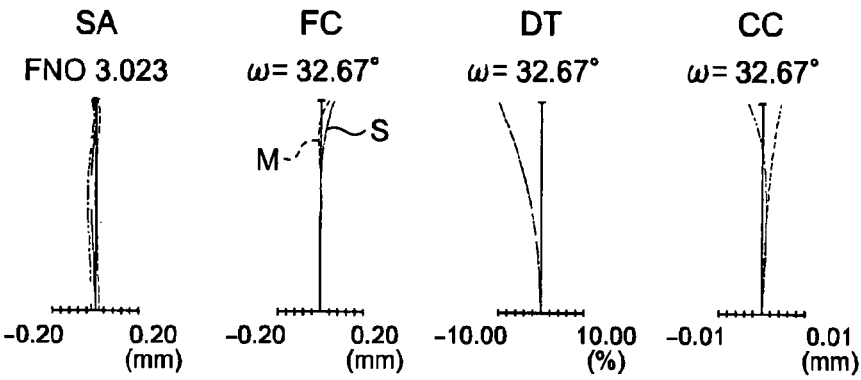
FIGS. 12A to 12C are aberration diagrams showing a spherical aberration (SA), astigmatism (FC), distortion (DT) and chromatic aberration of magnification (CC) of Example 6 when focused on an infinite object.
Figure 12B:
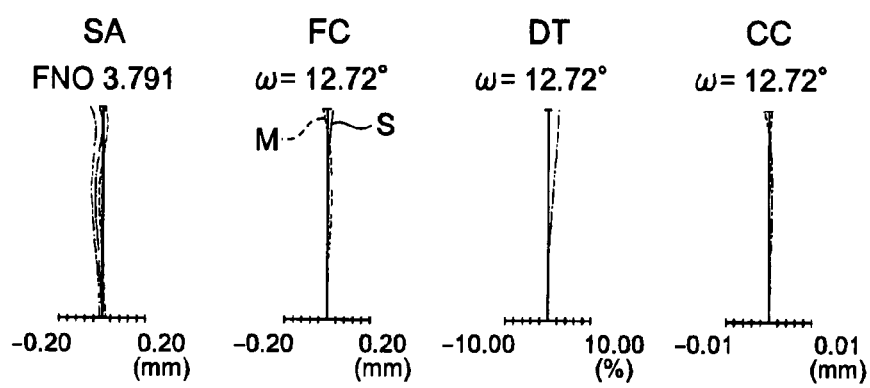
Figure 12C:
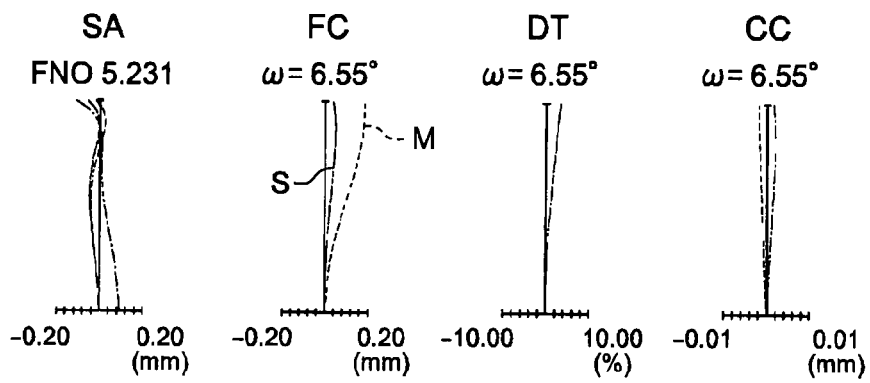

FIGS. 12A to 12C are aberration diagrams showing a spherical aberration (SA), astigmatism (FC), distortion (DT) and chromatic aberration of magnification (CC) of Example 6 when focused on an infinite object, FIG. 12A shows the aberrations in the wide-angle end, FIG. 12B shows the aberrations in the state shown in FIG. 11C, and FIG. 12C shows the aberrations in the telephoto end.

As shown in FIGS. 11A to 11E, this zoom lens system is constituted of, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. A plane parallel plate FL1 is disposed on an image side of the fourth lens unit G4. Moreover, P is an image surface. When an optical image is received by an image pickup element such as a CCD image sensor, an image pickup surface of the image pickup element is disposed in a position of the image surface P.

The first lens unit G1 is constituted of, in order from the object side, a negative meniscus lens L1 whose convex surface faces the object side and a double convex positive lens L2, and the lenses L1 and L2 are cemented. The second lens unit G2 is constituted of a double concave negative lens L3 having opposite surfaces which are aspherical surfaces and a positive meniscus lens L4 whose convex surface faces the object side. The third lens unit G3 is constituted of a double convex positive lens L5 having opposite surfaces which are aspherical surfaces, a negative meniscus lens L6 whose convex surface faces the object side, a double convex positive lens L7 and a double concave negative lens L8 having opposite surfaces which are both aspherical surfaces. The lenses L6 and L7 are cemented. The fourth lens unit G4 is constituted of a positive meniscus lens L9 whose image-side surface is an aspherical surface and whose convex surface faces the object side. The plane parallel plate FL1 is a cover glass which protects a light receiving surface of the CCD image sensor, but may be a low pass filter coated with an infrared cut coating.

During magnification change from the wide-angle end to the telephoto end, the first lens unit G1 moves toward the object side. The second lens unit G2 once moves toward the image side, and then reverses its movement direction in the vicinity of an intermediate focal length state to move toward the object side. The third lens unit G3 moves toward the object side. The fourth lens unit G4 once moves toward the object side, and then reverses its movement direction in the vicinity of the intermediate focal length state to move toward the image side.

In Example 6, an image height is 3.8 mm, a focal length is in a range of 6.58 to 10.20 to 16.41 to 22.70 to 31.96 mm, and Fno is in a range of 3.02 to 3.32 to 3.79 to 4.28 to 5.23.

Numerical Data 6

| Surface number | R | D | Nd | Vd |
|---|---|---|---|---|
| 1 | 17.082 | 0.90 | 1.84666 | 23.78 |
| 2 | 13.655 | 3.40 | 1.497 | 81.54 |
| 3 | −139.714 | D3 | | |
| 4* | −17.102 | 1.00 | 1.8061 | 40.92 |
| 5* | 4.974 | 1.11 | | |
| 6 | 8.009 | 1.80 | 1.92286 | 20.88 |
| 7 | 22.1 | D7 | | |
| 8 (S) | ∞ | 0.00 | | |
| 9* | 4.114 | 1.50 | 1.52249 | 59.84 |
| 10* | −78.26 | 0.10 | | |
| 11 | 13.279 | 0.50 | 1.6668 | 33.05 |
| 12 | 3.029 | 1.70 | 1.60311 | 60.64 |
| 13 | −23.913 | 1.67 | | |
| 14* | −27.589 | 0.80 | 1.6935 | 53.21 |
| 15* | 5.047 | D15 | | |
| 16 | 8.929 | 1.80 | 1.6228 | 57.05 |
| 17* | 46.438 | D17 | | |
| 18 | ∞ | 0.53 | 1.51633 | 64.14 |
| 19 | ∞ | 0.60 | | |
| 20 (P) | ∞ | | | |

TABLE 12-1

Aspherical Coefficient

| | Surface number | | | |
|---|---|---|---|---|
| | 4 | 5 | 9 | 10 |
| R | −17.102 | 4.974 | 4.114 | −78.260 |
| K | 0.462 | 0.000 | 0.000 | −858.800 |
| $A_4$ | 1.57936e−05 | −7.43812e−04 | −9.77640e−04 | 2.33917e−04 |
| $A_6$ | 1.18959e−05 | −5.73906e−06 | −5.31689e−05 | 1.30319e−05 |
| $A_8$ | −4.27812e−07 | −6.46247e−07 | −7.30852e−06 | −1.13148e−05 |
| $A_{10}$ | 6.30369e−09 | −3.83737e−08 | 3.86874e−07 | 8.11961e−07 |

TABLE 12-2

Aspherical Coefficient

| | Surface number | | |
|---|---|---|---|
| | 14 | 15 | 17 |
| R | −27.589 | 5.047 | 46.438 |
| K | 148.407 | 0.000 | 0.000 |
| $A_4$ | −4.59299e−03 | −2.18686e−03 | −1.43002e−04 |
| $A_6$ | −2.84914e−05 | −3.81331e−08 | −1.66900e−05 |
| $A_8$ | −3.88470e−05 | 4.84203e−05 | 1.80760e−07 |
| $A_{10}$ | 1.24819e−05 | −4.19607e−06 | 3.97325e−09 |

TABLE 13

Zoom Data

| | WE | ST1 | ST2 | ST3 | TE |
|---|---|---|---|---|---|
| fL(mm) | 6.58 | 10.2 | 16.41 | 22.7 | 31.96 |
| $F_{NO}$ | 3.02 | 3.32 | 3.79 | 4.28 | 5.23 |
| 2ω(°) | 65.34 | 40.66 | 25.44 | 18.37 | 13.1 |
| $D_3$ | 1.08 | 4.68 | 8.95 | 12.21 | 13.22 |
| $D_7$ | 10.06 | 5.62 | 2.76 | 2.19 | 0.7 |
| $D_{15}$ | 2.8 | 1.82 | 2.69 | 6.52 | 10.17 |
| $D_{17}$ | 1.49 | 3.52 | 4.43 | 2.27 | 1.5 |

EXAMPLE 7

Figure 13A:
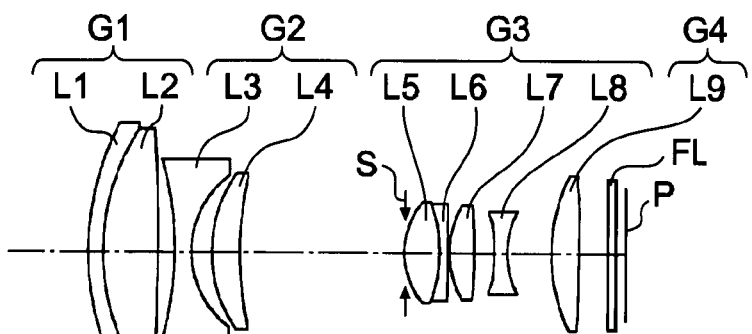
FIGS. 13A to 13E are sectional views of Example 7 of the present invention along an optical axis.
Figure 13B:
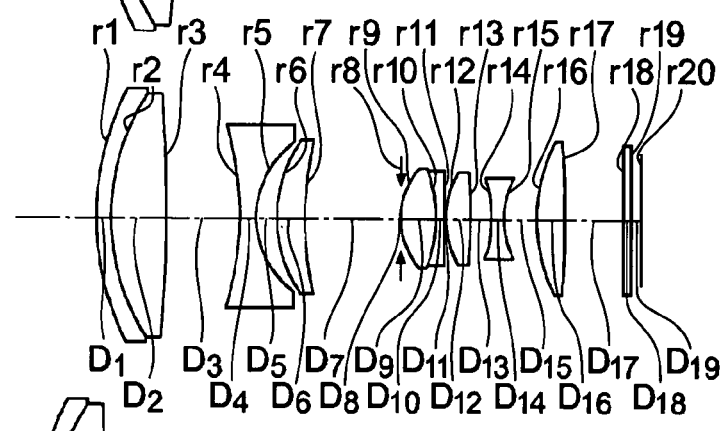
Figure 13C:
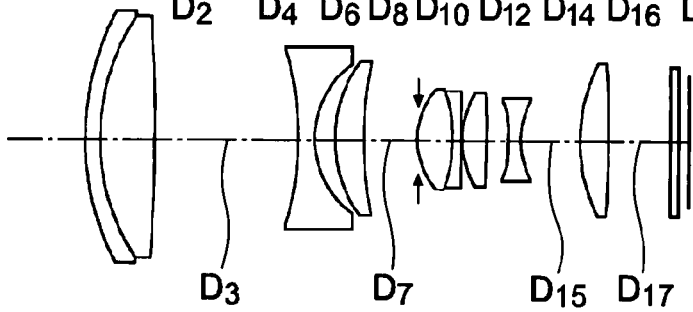
Figure 13D:
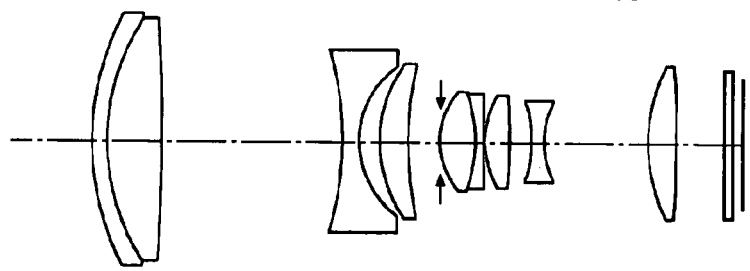
Figure 13E:
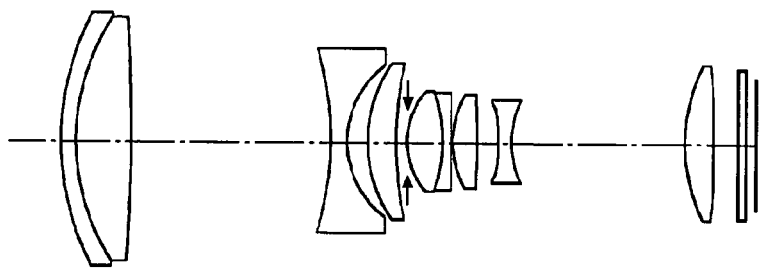

FIGS. 13A to 13E are sectional views of Example 7 along an optical axis, FIG. 13A shows an arrangement of lens units in a wide-angle end, FIGS. 13B, 13C and 13D show arrangements of the lens units in three states between the wide-angle end and a telephoto end, and FIG. 13E shows an arrangement of the lens units in the telephoto end. A focal length increases in order from FIGS. 13A, 13B, 13C, 13D and 13E.

Figure 14A:
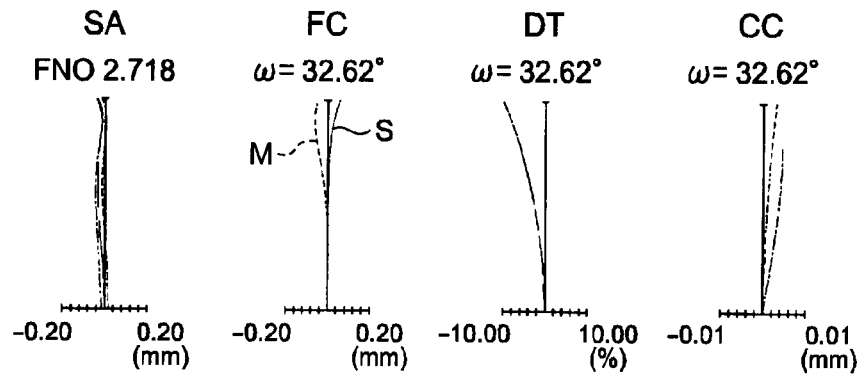
FIGS. 14A to 14C are aberration diagrams showing a spherical aberration (SA), astigmatism (FC), distortion (DT) and chromatic aberration of magnification (CC) of Example 7 when focused on an infinite object.
Figure 14B:
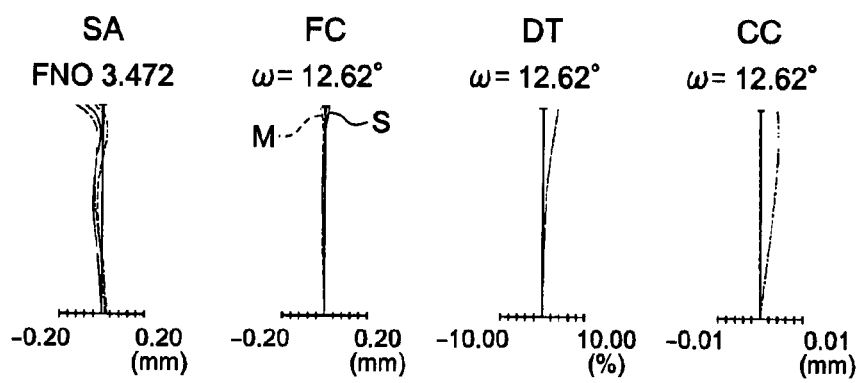
Figure 14C:
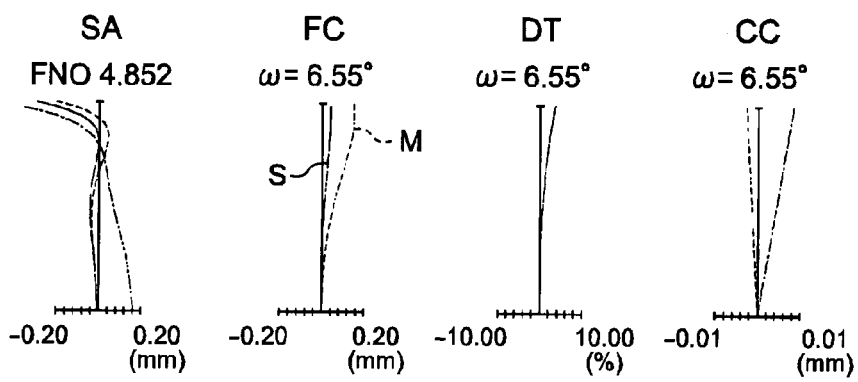

FIGS. 14A to 14C are aberration diagrams showing a spherical aberration (SA), astigmatism (FC), distortion (DT) and chromatic aberration of magnification (CC) of Example 7 when focused on an infinite object, FIG. 14A shows the aberrations in the wide-angle end, FIG. 14B shows the aberrations in the state shown in FIG. 13C, and FIG. 14C shows the aberrations in the telephoto end.

This zoom lens optical system is constituted of, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. A plane parallel plate FL1 is disposed on an image side of the fourth lens unit G4. Moreover, P is an image surface. When an optical image is received by an image pickup element such as a CCD image sensor, an image pickup surface of the image pickup element is disposed in a position of the image surface P.

The first lens unit G1 is constituted of, in order from the object side, a negative meniscus lens L1 whose convex surface faces the object side and a double convex positive lens L2, and the lenses L1 and L2 are cemented. The second lens unit G2 is constituted of a double concave negative lens L3 having opposite surfaces which are aspherical surfaces and a positive meniscus lens L4 whose convex surface faces the object side. The third lens unit G3 is constituted of a double convex positive lens L5 having an object-side surface which is an aspherical surface, a negative meniscus lens L6 whose convex surface faces the image side, a double convex positive lens L7 having an image-side surface which is an aspherical surface and a double concave negative lens L8 having opposite surfaces which are both aspherical surfaces. The lenses L5 and L6 are cemented. The fourth lens unit G4 is constituted of a positive meniscus lens L9 whose image-side surface is an aspherical surface and whose convex surface faces the object side. The parallel flat plate FL1 is a cover glass which protects a light receiving surface of the CCD image sensor, but may be a low pass filter coated with an infrared cut coating.

During magnification change from the wide-angle end to the telephoto end, the first lens unit G1 moves toward the object side. The second lens unit G2 once moves toward the image side, and then reverses its movement direction in the vicinity of an intermediate focal length state to move toward the object side. The third lens unit G3 moves toward the object side. The fourth lens unit G4 once moves toward the object side, and then reverses its movement direction in the vicinity of the intermediate focal length state to move toward the image side.

In Example 7, an image height is 3.8 mm, a focal length is in a range of 6.58 to 10.20 to 16.40 to 22.69 to 31.99 mm, and Fno is in a range of 2.72 to 3.02 to 3.47 to 3.96 to 4.85.

Numerical Data 7

| Surface number | R | D | Nd | Vd |
|---|---|---|---|---|
| 1 | 17.095 | 0.90 | 1.84666 | 23.78 |
| 2 | 13.518 | 3.40 | 1.497 | 81.54 |
| 3 | −101.177 | D3 | | |
| 4* | −16.982 | 1.00 | 1.8061 | 40.92 |
| 5* | 4.929 | 1.27 | | |
| 6 | 8.068 | 1.80 | 1.92286 | 20.88 |
| 7 | 21.452 | D7 | | |
| 8 (S) | ∞ | 0.00 | | |
| 9* | 4.501 | 2.20 | 1.51633 | 64.14 |
| 10 | −9.014 | 0.50 | 1.7552 | 27.51 |
| 11 | −292.165 | 0.10 | | |
| 12 | 5.626 | 1.54 | 1.64 | 60.08 |
| 13* | −89.546 | 1.28 | | |
| 14* | −20.73 | 0.80 | 1.762 | 40.1 |
| 15* | 4.852 | D15 | | |
| 16 | 10.169 | 1.80 | 1.51823 | 58.9 |
| 17* | 189.133 | D17 | | |
| 18 | ∞ | 0.53 | 1.51633 | 64.14 |
| 19 | ∞ | 0.60 | | |
| 20 (P) | ∞ | | | |

TABLE 14-1

Aspherical Coefficient

| | Surface number | | | |
|---|---|---|---|---|
| | 4 | 5 | 9 | 13 |
| R | −16.982 | 4.929 | 4.501 | −89.546 |
| K | −0.946 | 0.000 | 0.000 | 0.000 |
| $A_4$ | 4.84159e−05 | −6.13111e−04 | −2.91618e−04 | 4.46072e−04 |
| $A_6$ | 9.45464e−06 | −1.65534e−05 | −2.81730e−05 | −5.02786e−05 |
| $A_8$ | −4.44388e−07 | 8.42860e−08 | 2.58747e−07 | −1.55359e−05 |
| $A_{10}$ | 6.75559e−09 | −7.94179e−08 | −1.14929e−07 | 7.63152e−07 |

TABLE 14-2

Aspherical Coefficient

| | Surface number | | |
|---|---|---|---|
| | 14 | 15 | 17 |
| R | −20.730 | 4.852 | 189.133 |
| K | −40.532 | 0.000 | 0.000 |
| $A_4$ | −5.23184e−03 | −8.21368e−05 | −5.92248e−04 |
| $A_6$ | −5.37771e−04 | −3.72623e−04 | 2.07817e−05 |
| $A_8$ | −7.03569e−05 | 4.36786e−06 | −1.00456e−06 |
| $A_{10}$ | 1.52760e−05 | 6.53299e−06 | 1.94084e−08 |

TABLE 15

Zoom Data

| | WE | ST1 | ST2 | ST3 | TE |
|---|---|---|---|---|---|
| fL(mm) | 6.58 | 10.2 | 16.4 | 22.69 | 31.99 |
| $F_{NO}$ | 2.72 | 3.02 | 3.47 | 3.96 | 4.85 |
| 2ω(°) | 65.25 | 40.34 | 25.24 | 18.48 | 13.1 |
| $D_3$ | 1.05 | 4.58 | 8.85 | 11.09 | 12.28 |
| $D_7$ | 10.16 | 5.92 | 3.32 | 1.97 | 0.7 |
| $D_{15}$ | 2.8 | 2.06 | 3.71 | 6.49 | 10.81 |
| $D_{17}$ | 1.74 | 3.64 | 3.89 | 3.03 | 1.5 |

Numerical data according to the conditions will be described below.

TABLE 16

| | Example | | | |
|---|---|---|---|---|
| | 4 | 5 | 6 | 7 |
| $Ih/f_{g3}$ | 0.50 | 0.50 | 0.52 | 0.51 |
| $f_{g1}/f_{g3}$ | 4.01 | 4.22 | 4.66 | 4.46 |
| $f_{g2}/f_{g3}$ | −0.99 | −1.00 | −1.05 | −1.03 |
| $f_{g3}/f_{g4}$ | 0.42 | 0.40 | 0.44 | 0.38 |
| $\beta_{2T}/\beta_{2W}$ | 1.69 | 1.62 | 2.03 | 1.95 |
| $\beta_{2T}/\beta_{2W}$ | 2.86 | 2.99 | 2.39 | 2.45 |
| $D_{g1}/D$ | 0.48 | 0.43 | 0.62 | 0.57 |
| $D_{g3}/D$ | 0.56 | 0.55 | 0.45 | 0.47 |
| $f_{g3L123}/f_{g3L4}$ | −0.95 | −0.91 | −0.94 | −1.03 |
| $(r_{g3L1f}+r_{g3L1r})/(r_{g3L1f}-r_{g3L1r})$ | −1.04 | −0.92 | −0.90 | −0.33 |
| $(r_{g3L2f}+r_{g3L2r})/(r_{g3L2f}-r_{g3L2r})$ | 1.06 | 0.88 | 1.59 | −1.06 |
| $(r_{g3L4f}+r_{g3L4r})/(r_{g3L4f}-r_{g3L4r})$ | 0.81 | 0.78 | 0.69 | 0.62 |

In the above zoom lens system, to cut unnecessary light such as ghost and flare, a flare stop may be disposed in addition to the aperture stop S. In each Example, the flare stop may be disposed in any of a position on the object side of the first lens unit, a position between the first lens unit and the second lens unit, a position between the second lens unit and the third lens unit, a position between the third lens unit and the fourth lens unit and a position between the fourth lens unit and the image surface. It may be constituted that a flare ray is cut by a frame which holds the lens, or another member may be disposed as the flare stop. A shield portion which functions as the flare stop may be disposed on the surface of an optical element such as the lens by a method such as printing or painting. Alternatively, a seal or the like may be bonded as the flare stop on the surface of the optical element. An opening of the flare stop may have any shape such as a circular shape, an elliptic shape, a rectangular shape, a polygonal shape or a shape of a region surrounded with function curves. Not only a harmful light flux but also a light flux such as coma flare in a periphery of the image surface may be cut.

Moreover, when the surface of each lens is coated with an anti-reflection coating, the ghost and flare can be reduced. When a multilayered thin film is used as the anti-reflection coating, the ghost and the flare can preferably effectively be reduced. The IR cut coating may be disposed on the surface of each lens and/or cover glass.

In the above zoom lens system, it is preferable that focusing is performed by moving the fourth lens unit. However, the present invention is not limited to this example. The focusing may be performed by moving the first, second and third lens units. A plurality of lens units may be moved to perform the focusing. The whole lens system may be moved to perform the focusing.

Furthermore, in a case where a CCD image sensor provided with a micro lens on an incidence side of a pixel is used as an image pickup element in an image pickup apparatus including the zoom lens system according to the present invention, a drop of brightness in a peripheral portion of an image can be reduced by shifting the micro lenses of the CCD image sensor. For example, design of the micro lens of the CCD image sensor can be changed depending on the incidence angle of a ray onto an image pickup surface at each image height. Alternatively, the drop of brightness in a peripheral portion of an image may be compensated by using image processing technique.

Furthermore, a distortion is intentionally generated in an optical system beforehand, and after photographing, image processing may be electrically performed to correct the distortion.

Next, a type in which the third lens unit is constituted of one or two positive lenses and one negative lens will be described.

As described above, a zoom lens system according to the present invention comprises, in order from an object side: a first lens unit having a positive refractive power; a second lens unit having a negative refractive power; a third lens unit having a positive refractive power; and a fourth lens unit having a positive refractive power. As compared with a wide-angle end, in a telephoto end, a space between the first lens unit and the second lens unit increases, and a space between the second lens unit and the third lens unit decreases. In addition, it is preferable that a space between the third lens unit and the fourth lens unit changes during magnification change from the wide-angle end to a telephoto end.

A magnification change function during zooming can be imparted to the second lens unit having the negative refractive power and the third lens unit having the positive refractive power due to the power layout and the form of movement of the lens units for the zooming described above. An off-axial ray emitted from the third lens unit can be refracted by the fourth lens unit having the positive refractive power so as to become nearly perpendicular to an image surface.

In such a type of zoom lens system, diameters of the first and second lens units tend to increase. Therefore, when the number of the lenses included in these lens units is reduced, a thickness of the zoom lens system when collapsed and a cost are effectively reduced.

In consideration of this, it is preferable that the first lens unit is constituted of one positive lens and that the second lens unit is constituted of two lenses including a negative lens and a positive lens in order from the object side. In consequence, effective diameters of the first and second lens units can be reduced. The constitution is advantageous in reducing the diameter and thinning the zoom lens system when collapsed.

In this case, when the negative lens of the second lens unit is a double concave negative lens, the negative power of the second lens unit is advantageously maintained. In a case where an object-side surface of the negative lens of the second lens unit is a concave surface, when the first lens unit disposed on the object side of the second lens unit comes close to the second lens unit, the first lens unit can be positioned close to the image surface. This is advantageous in reducing the total length of the zoom lens system in the wide-angle end.

It is to be noted that in a case where an image-side surface of the first lens unit is a convex surface facing an image side, the constitution is advantageous in correcting an off-axial aberration generated in an incidence surface of the second lens unit in the wide-angle end. This is also advantageous in miniaturizing the size of the system when collapsed.

It is preferable that the third lens unit is constituted of three lenses including a positive lens, a positive lens and a negative lens in order from the object side.

The second lens unit is constituted of two lenses. Therefore, when the second and third lens units perform a main magnification change function, the third lens unit is preferably constituted to have the magnification change function and sufficiently correct the aberration. Therefore, the third lens unit may be constituted of three lenses including a positive lens, a positive lens and a negative lens in order from the object side. When two positive lenses on the object side converge an axial light flux and the negative lens is disposed after the positive lenses, amounts of a spherical aberration and a coma to be generated can be reduced. A principal point of the third lens unit is disposed close to the object side, a principal point of the second lens unit can come close to that of the third lens unit in the telephoto end, and the constitution is advantageous in increasing a zoom ratio.

Moreover, to reduce the total length of the zoom lens system in the telephoto end, it is preferable to set a negative composite focal length of the second and third lens units in the telephoto end. According to such a constitution, a composite system of the first, second and third lens units has a telephoto type characteristic. The constitution is advantageous in reducing the total length of the zoom lens system at the high zoom ratio.

Regarding movement of the lens units during zooming, it is preferable that during the zooming from the wide-angle end to the telephoto end, the first, second and third lens units move along an optical axis. The fourth lens unit also moves along the optical axis and the movement track of the fourth lens unit from the wide-angle end to the telephoto end comprises a portion which is convex toward the object side. Therefore, on the portion of the movement track, the fourth lens unit once moves toward the object side and then moves toward the image side.

When the first and second lens units are constituted of the small number of the lenses, the aberration sometimes remains. However, by using a constitution in which the first to fourth lens units are moved during the zooming from the wide-angle end to the telephoto end, aberration fluctuations during the zooming are easily reduced. Especially, such a constitution is advantageous for correction of the remaining astigmatism and distortion that the fourth lens unit draws a movement track once to move toward the object side and then to move toward the image side.

It has been described above that the third lens unit is constituted of three lenses. However, the third lens unit may be constituted of two lenses including a positive lens and a negative lens in order from the object side.

When the third lens unit is constituted of two lenses including the positive lens and the negative lens in order from the object side, a thickness of the zoom lens system when collapsed can be reduced as much as a thickness of one lens. That is, this constitution is more advantageous for the miniaturization.

Moreover, since the second lens unit largely contributes to the magnification change, a strong power is required for the miniaturization. Therefore, as described above, it is preferable that the negative lens of the second lens unit is a double concave negative lens. This constitution is advantageous in maintaining the negative power of the second lens unit. When a diverging function is imparted to the opposite surfaces of the negative lens to divide the power, the generation of a higher order aberration can be inhibited. In consequence, even at the high zoom ratio, the astigmatism can satisfactorily be corrected.

Furthermore, in a case where the object-side surface of the negative lens of the second lens unit is a concave surface, when the first lens unit comes close to the second lens unit, the first lens unit can be positioned close to the image surface. In consequence, the constitution is advantageous in reducing the total length of the zoom lens system in the wide-angle end.

In addition, it is to be noted that, when the image-side surface of the first lens unit is a convex surface facing the image side, the off-axial aberration generated in the incidence surface of the second lens unit in the wide-angle end is advantageously corrected. This is also advantageous in miniaturizing the lens system when collapsed.

The third lens unit is constituted so as to largely contribute to the magnification change in the same manner as the second lens unit. Furthermore, since the third lens unit has a positive refractive power, the unit has a large influence on image formation.

However, the lens bearing the positive refractive power of the third lens unit is only one positive lens. Therefore, when this positive lens has a large refractive power, a large aberration is easily generated.

To avoid this, it is preferable that the negative lens of the third lens unit is a double concave negative lens whose opposite surfaces have the diverging function. In consequence, the aberration of the third lens unit can satisfactorily be corrected. Even at the high zoom ratio, the spherical aberration and the coma can satisfactorily be corrected.

That is, in a case where the negative lens is formed into a meniscus shape whose concave surface having a large curvature faces the image side, the negative lens has a negative power on the only image-side surface. At this time, since the axial light flux has a low ray height on the image-side surface, the negative lens needs to have a concave surface having a small radius of curvature in order to correct the spherical aberration. However, in this case, the off-axial aberration is easily generated in the peripheral portion of the image-side surface.

When the opposite surfaces of the negative lens are concave surfaces, the surface having a negative refractive power can be disposed in a position where an incidence height of the axial light flux does not excessively decrease. In consequence, a radius of curvature of the concave surface on the image side is easily increased, and the spherical aberration and the coma are easily corrected. A function of positioning the principal point of the third lens unit closer to the object side can preferably be maintained.

Moreover, it is preferable that the positive lens of the third lens unit is a double convex lens. In a case where the opposite surfaces share a positive power (refractive power), the higher order aberration is easily suppressed while securing the positive refractive power required for the third lens unit.

Furthermore, it is preferable that the positive lens and the negative lens of the third lens unit are cemented. Each lens of the third lens unit easily has a large refractive power. Therefore, the system is easily influenced by eccentricity. When the positive lens and the negative lens of the third lens unit are cemented, the influence of the eccentricity is easily suppressed.

In addition, it is preferable that this cemented surface is a refractive surface having a negative refractive power. In consequence, the curvature of an emission-side surface, of the cemented lens, having a negative refractive power is easily reduced. The constitution is advantageous in correcting the aberration.

As described above, in order to reduce the total length of the zoom lens system in the telephoto end, it is effective that the composite focal length of the second and third lens units in the telephoto end is constituted to be negative.

Moreover, in order to suppress the aberration fluctuation during the magnification change more easily, it is effective that the first, second and third lens units are moved along the optical axis, and the fourth lens unit also moves along the optical axis so as to draw a movement track from the wide-angle end to the telephoto end which comprises a portion being convex toward the object side, that is, the fourth lens unit moves toward the object side and then moves toward the image side.

In the above zoom lens system, it is preferable that an aperture stop is disposed just before the third lens unit.

According to the above constitution, it is possible to appropriately suppress ray heights in the first and second lens units in the wide-angle end. An exit pupil is easily disposed away from an image surface.

It is to be noted that in the above zoom lens system, the number of the lens units may further be increased, but it is preferable that the zoom lens system is constituted as a four-unit zoom lens system constituted of four lens units. This constitution is advantageous in miniaturizing the lens system when collapsed while securing a zoom ratio.

Regarding the fourth lens unit, it is preferable that the fourth lens unit is constituted of one positive lens.

The fourth lens unit mainly has a function of disposing the exit pupil away from the image surface, and burdens of the refractive power and the magnification change function are small as compared with the second and third lens units. Therefore, when the fourth lens unit is constituted of one positive lens, the constitution can be simplified, and is advantageous in miniaturizing the lens system when collapsed.

The constitution of each lens unit of the zoom lens system and the mode of the movement of each lens unit for the zooming have been described above in detail, but it is more preferable to satisfy any of the following conditions.

$$0.5 < f_T/f_{g1} < 2.5 \tag{1C},$$

in which $f_T$ is a focal length of the zoom lens system in the telephoto end, and $f_{g1}$ is a focal length of the first lens unit.

When a value of $f_T/f_{g1}$ is not above an upper limit of the condition (1C), the refractive power of the first lens unit can be suppressed. The constitution is advantageous in correcting the spherical aberration and the coma especially in the telephoto end.

When the value of $f_T/f_{g1}$ is not below a lower limit of the condition (1C), the power of the first lens unit can be secured. The constitution is advantageous in reducing the total length of the zoom lens system in the telephoto end to minimize the lens system.

It is to be noted that it is more preferable to satisfy the following condition:

$$0.8 < f_T/f_{g1} < 2.0 \tag{1C-1}.$$

It is more preferable to satisfy the following condition:

$$1.0 < f_T/f_{g1} < 1.5 \tag{1C-2}.$$

It is preferable that the above zoom lens system satisfies the following condition:

$$-7 < f_T/f_{g2} < -2 \tag{2C},$$

in which $f_T$ is a focal length of the zoom lens system in the telephoto end, and $f_{g2}$ is a focal length of the second lens unit.

When a value of $f_T/f_{g2}$ is not above an upper limit of the condition (2C), the power of the second lens unit can be secured, and an increase of the total length of the zoom lens system can be suppressed.

When the value of $f_T/f_{g2}$ is not below a lower limit of the condition (2C), the power of the second lens unit can appropriately be suppressed, and the generation of the distortion and the astigmatism in the wide-angle end and the generation of the spherical aberration and the coma in the telephoto end can be reduced.

It is to be noted that it is more preferable to satisfy the following condition:

$$-6 < f_T/f_{g2} < -3 \tag{2C-1}.$$

It is more preferable to satisfy the following condition:

$$-5.5 < f_T/f_{g2} < -3.5 \tag{2C-2}.$$

It is preferable that the above zoom lens system satisfies the following condition:

$$1.8 < f_T/f_{g3} < 6 \quad (3C),$$

in which $f_T$ is a focal length of the zoom lens system in the telephoto end, and $f_{g3}$ is a focal length of the third lens unit.

When a value of $f_T/f_{g3}$ is not above an upper limit of the condition (3C), the power of the third lens unit can be suppressed. The constitution is advantageous in correcting the spherical aberration and the coma especially in the telephoto end.

When the value of $f_T/f_{g3}$ is not below a lower limit of the condition (3C), the power of the third lens unit can appropriately be secured. The constitution is advantageous in reducing the total length of the zoom lens system.

It is to be noted that it is more preferable to satisfy the following condition:

$$2.0 < f_T/f_{g3} < 4.5 \quad (3C\text{-}1).$$

It is more preferable to satisfy the following condition:

$$2.5 < f_T/f_{g3} < 3.5 \quad (3C\text{-}2).$$

It is preferable that the above zoom lens system satisfies the following condition:

$$1.5 < f_{g1}/f_{g3} < 3.0 \quad (4C),$$

in which $f_{g1}$ is a focal length of the first lens unit, and $f_{g3}$ is a focal length of the third lens unit.

When a value of $f_{g1}/f_{g3}$ is not above an upper limit of the condition (4C), an appropriate power of the first lens unit can be secured, and the total length of the zoom lens system in the wide-angle end can be reduced. An aberration correcting effect of the first lens unit is secured, an amount of the aberration in the third lens unit is easily reduced, and especially the spherical aberration and the coma is easily corrected.

When the value $f_{g1}/f_{g3}$ is not below a lower limit of the condition (4C), a back focal length can be secured. The amounts of the spherical aberration, the coma and the like to be generated in the first lens unit can be reduced. Moreover, the magnification change function of the third lens unit can be secured.

It is to be noted that it is more preferable to satisfy the following condition:

$$2.0 < f_{g1}/f_{g3} < 2.8 \quad (4C\text{-}1).$$

It is preferable that the above zoom lens system satisfies the following condition:

$$1.0 < f_{g1}/f_{g4} < 3.0 \quad (5C),$$

in which $f_{g1}$ is a focal length of the first lens unit, and $f_{g4}$ is a focal length of the fourth lens unit.

When a value of $f_{g1}/f_{g4}$ is not above an upper limit of the condition (5C), the power of the fourth lens unit can relatively be secured. The distortion and a chromatic aberration of magnification are easily inhibited from being undercorrected in the first lens unit.

When the value of $f_{g1}/f_{g4}$ is not below a lower limit of the condition (5C), the power of the fourth lens unit can be inhibited from being relatively excessively strong. The distortion and the chromatic aberration of magnification are easily inhibited from being overcorrected in the first lens unit.

It is to be noted that it is more preferable to satisfy the following condition:

$$1.2 < f_{g1}/f_{g4} < 2.5 \quad (5C\text{-}1).$$

It is preferable that the above zoom lens system satisfies the following condition:

$$-0.7 < f_{g2}/f_{g4} < -0.1 \quad (6C),$$

in which $f_{g2}$ is a focal length of the second lens unit, and $f_{g4}$ is a focal length of the fourth lens unit.

When a value of $f_{g2}/f_{g4}$ is not above an upper limit of the condition (6C), the power of the fourth lens unit is secured. The constitution is advantageous in securing the aberration correcting effect. The power of the second lens unit can be suppressed to reduce the amount of the aberration to be generated. Especially, the astigmatism, the distortion and the chromatic aberration of magnification are easily balanced, When the value of $f_{g2}/f_{g4}$ is not below a lower limit of the condition (6C), the power of the fourth lens unit can be inhibited from being excessively strengthened, and the generation of the aberration in the fourth lens unit is easily inhibited. The constitution is advantageous in securing the power of the second lens unit, achieving the miniaturization of the zoom lens system and securing the zoom ratio.

It is to be noted that it is more preferable to satisfy the following condition:

$$-0.6 < f_{g2}/f_{g4} < -0.25 \quad (6C\text{-}1).$$

As described above, it is advantageous that the composite system constituted of the second and third lens units has a negative composite focal length in the telephoto end. In this regards, it is more preferable that the composite system of the second and third lens units has a positive composite focal length in the wide-angle end and has a negative composite focal length in the telephoto end, and further the following condition is satisfied:

$$-2.5 < f_{g23W}/f_{g23T} < -0.1 \quad (7C),$$

in which $f_{g23W}$ is a composite focal length of the second and third lens units in the wide-angle end, and $f_{g23T}$ is a composite focal length of the second and third lens units in the telephoto end.

When a value of $f_{g23W}/f_{g23T}$ is not above an upper limit of the condition (7C), a positive power of a composite system of the second and third lens units in the wide-angle end is appropriately suppressed, and the astigmatism and the distortion are easily suppressed. When the negative power of the composite system of the second and third lens units in the telephoto end is secured, the constitution is advantageous in reducing the total length of the zoom lens system in the telephoto end.

When the value of $f_{g23W}/f_{g23T}$ is not below a lower limit of the condition (7C), the positive power of the composite system of the second and third lens units in the wide-angle end is appropriately secured, and the increases of the total length of the zoom lens system and the back focal length in the wide-angle end are easily suppressed. In addition, the negative power of the composite system of the second and third lens units in the telephoto end is suppressed, and the spherical aberration and the coma are easily reduced.

It is to be noted that it is more preferable to satisfy the following condition:

$$-2.0 < f_{g23W}/f_{g23T} < -0.28 \quad (7C\text{-}1).$$

It is more preferable to satisfy the following condition:

$$-1.5 < f_{g23W}/f_{g23T} < -0.35 \quad (7C\text{-}2).$$

It is preferable that the above zoom lens system satisfies the following condition:

$$-2.5 < f_{g1}/f_{g23T} < -0.5 \quad (8C),$$

in which $f_{g1}$ is a focal length of the first lens unit, and $f_{g23T}$ is a composite focal length of the second and third lens units in the telephoto end.

When a value of $f_{g1}/f_{g23T}$ is not above an upper limit of the condition (8C), the first to third lens unit can have a telephoto effect. The constitution is advantageous in reducing the total length of the zoom lens system in the telephoto end.

When the value of $f_{g1}/f_{g23T}$ is not below a lower limit of the condition (8C), the negative power of the composite system of the second and third lens units can be inhibited from being excessively strengthened. The constitution is advantageous in correcting the spherical aberration, the coma and the astigmatism.

It is to be noted that it is more preferable to satisfy the following condition:

$$-2.0 < f_{g1}/f_{g23T} < -0.8 \quad (8C-1).$$

It is more preferable to satisfy the following condition:

$$-1.8 < f_{g1}/f_{g23T} < -0.9 \quad (8C-2).$$

It is preferable that the above zoom lens system satisfies the following condition:

$$1.8 < \beta_{2T}/\beta_{2W} < 4.0 \quad (9C),$$

in which $\beta_{2T}$ is a lateral magnification of the second lens unit in the telephoto end, and $\beta_{2W}$ is a lateral magnification of the second lens unit in the wide-angle end.

When a value of $\beta_{2T}/\beta_{2W}$ is not above an upper limit of the condition (9C), the burden of the magnification change function on the second lens unit can be suppressed, and the aberration fluctuation due to the zooming is easily suppressed.

When the value of $\beta_{2T}/\beta_{2W}$ is not below a lower limit of the condition (9C), the constitution is advantageous in securing the magnification change function of the second lens unit and reducing the total length of the zoom lens system.

It is to be noted that it is more preferable to satisfy the following condition:

$$2.0 < \beta_{2T}/\beta_{2W} < 3.0 \quad (9C-1).$$

It is preferable that the above zoom lens system satisfies the following condition:

$$1.2 < \beta_{3T}/\beta_{3W} < 3.0 \quad (10C),$$

in which $\beta_{3T}$ is a lateral magnification of the third lens unit in the telephoto end, and $\beta_{3W}$ is a lateral magnification of the third lens unit in the wide-angle end.

When a value of $\beta_{3T}/\beta_{3W}$ is not above the condition (10C), the burden of the magnification change function on the third lens unit can be suppressed, and the aberration fluctuation due to the zooming is easily suppressed.

When the value of $\beta_{3T}/\beta_{3W}$ is not below a lower limit of the condition (10C), the constitution is advantageous in securing the magnification change effect and reducing the total length of the zoom lens system.

It is to be noted that it is more preferable to satisfy the following condition:

$$1.35 < \beta_{3T}/\beta_{3W} < 2.5 \quad (10C-1).$$

It is preferable that the above zoom lens system satisfies the following condition:

$$0.85 < \beta_{4T}/\beta_{4W} < 2.0 \quad (11C),$$

in which $\beta_{4T}$ is a lateral magnification of the fourth lens unit in the telephoto end, and $\beta_{4W}$ is a lateral magnification of the fourth lens unit in the wide-angle end.

When a value of $\beta_{4T}/\beta_{4W}$ is not above an upper limit of the condition (11C), the burden of the magnification change function on the fourth lens unit can be suppressed. The constitution is advantageous in reducing the aberration fluctuation due to the zooming.

When a value of $\beta_{4T}/\beta_{4W}$ is not below a lower limit of the condition (11C), the fourth lens unit has a function of reducing the magnification to thereby reduce the burden of the magnification change function on the other lens units. The constitution is advantageous in reducing a movement amount of each lens unit and the total length of the zoom lens system.

It is to be noted that it is more preferable to satisfy the following condition:

$$0.9 < \beta_{4T}/\beta_{4W} < 1.5 \quad (11C-1).$$

In the above zoom lens system, it is preferable that the first lens unit is disposed closer to the object side in the telephoto end than in the wide-angle end and that the following condition is satisfied:

$$0.5 < D_{g1}/D < 2.0 \quad (12C),$$

in which $D_{g1}$ is a distance between a position of the first lens unit in the wide-angle end and a position of the first lens unit in the telephoto end, and D is a sum of axial distances between incidence surfaces and emission surfaces of the respective lens units.

When a value of $D_{g1}/D$ is not above an upper limit of the condition (12C), a movement amount of the first lens unit can be suppressed. The constitution is advantageous in reducing the total length of the zoom lens system in the telephoto end.

When the value of $D_{g1}/D$ is not below a lower limit of the condition (12C), it is possible to secure a function of suppressing the aberration fluctuation due to the movement of the first lens unit during the zooming. The magnification change burden is easily imposed on the second lens unit while suppressing the refractive power of the second lens unit. The constitution is advantageous for the high zoom ratio. The total length of the lens system in the wide-angle end is relatively shorter than that in the telephoto end. The constitution is advantageous in reducing the diameter of the zoom lens system.

It is to be noted that it is more preferable to satisfy the following condition:

$$0.8 < D_{g1}/D < 1.5 \quad (12C-1).$$

In the above zoom lens system, it is preferable that the third lens unit is disposed closer to the object side in the telephoto end than in the wide-angle end and that the following condition is satisfied.

$$0.65 < D_{g3}/D < 1.5 \quad (13C),$$

in which $D_{g3}$ is a distance between a position of the third lens unit in the wide-angle end and a position of the third lens unit in the telephoto end, and D is a sum of axial distances between incidence surfaces and emission surfaces of the lens units.

When a value of $D_{g3}/D$ is not above an upper limit of the condition (13C), the movement amount of the third lens unit can appropriately be suppressed. The constitution is advantageous in reducing the total length of the zoom lens system. The aberration fluctuation due to the zooming is easily suppressed.

When the value of $D_{g3}/D$ is not below a lower limit of the condition (13C), the movement amount of the third lens unit can appropriately be secured. The magnification change effect of the second lens unit disposed on the object side of the third lens unit can be inhibited from being excessively enlarged. The constitution is advantageous in reducing the total length of the zoom lens system. The aberration corrections of the second and third lens units are easily balanced.

It is to be noted that it is more preferable to satisfy the following condition:

$$0.75 < D_{g3}/D < 1.2 \quad (13C\text{-}1).$$

In the above zoom lens system, it is preferable that the negative lens of the second lens unit is a double concave lens and that the following condition is satisfied:

$$-7 < r_{2f}/r_{2r} < -0.5 \quad (14C),$$

in which $r_{2f}$ is a paraxial radius of curvature of an object-side surface of the negative lens of the second lens unit, and $r_{2r}$ is a paraxial radius of curvature of an image-side surface of the negative lens of the second lens unit.

When a value of $r_{2f}/r_{2r}$ is not above an upper limit of the condition (14C), the curvature of the object-side surface can be inhibited from being excessively enlarged, and the distortion and the astigmatism are inhibited from being excessively generated. The curvature of the image-side surface can be secured, and it is easy to maintain an effect of correcting various aberrations.

When the value of $r_{2f}/r_{2r}$ is not below a lower limit of the condition (14C), the curvature of the object-side surface can be inhibited from being excessively reduced, and an effect of correcting the axial aberration can be kept. The curvature of the image-side surface can be suppressed, and the generation of the higher order aberration can easily be inhibited.

It is to be noted that it is more preferable to satisfy the following condition:

$$-5 < r_{2f}/r_{2r} < -1 \quad (14C\text{-}1).$$

It is more preferable to satisfy the following condition:

$$-4 < r_{2f}/r_{2r} < -1.5 \quad (14C\text{-}2).$$

In the above zoom lens system, it is preferable that the negative lens of the third lens unit is a double concave lens and that the following condition is satisfied:

$$-4 < r_{3f}/r_{3r} < -0.1 \quad (15C),$$

in which $r_{3f}$ is an object-side radius of curvature of the negative lens of the third lens unit, and $r_{3r}$ is an image-side radius of curvature of the negative lens of the third lens unit.

When a value of $r_{3f}/r_{3r}$ is not above an upper limit of the condition (15C), the curvature of the object-side surface can be suppressed, and the spherical aberration and the coma are easily inhibited from being overcorrected. Since an appropriate curvature of the image-side surface is secured, an effect of correcting the astigmatism and the coma is easily obtained.

When the value of $r_{3f}/r_{3r}$ is not below a lower limit of the condition (15C), an appropriate curvature of the object-side surface can be secured, and the spherical aberration and the coma are easily inhibited from being undercorrected. The curvature on the image side can be inhibited from being excessively enlarged. The constitution is advantageous in correcting the astigmatism, the coma and the distortion with a good balance.

It is to be noted that it is more preferable to satisfy the following condition:

$$-2.8 < r_{3f}/r_{3r} < -0.2 \quad (15C\text{-}1).$$

It is more preferable to satisfy the following condition:

$$-2.5 < r_{3f}/r_{3r} < -0.3 \quad (15C\text{-}2).$$

In the above zoom lens system, when the third lens unit is constituted of three lenses, it is preferable to satisfy the following condition:

$$4.0 < f_T/f_W < 10.0 \quad (16C),$$

in which $f_T$ is a focal length of the zoom lens system in the telephoto end, and $f_W$ is a focal length of the zoom lens system in the wide-angle end.

When the third lens unit is constituted of three lenses, the constitution is advantageous in increasing the zoom ratio. Therefore, it is more preferable to set the zoom ratio of the zoom lens system to be larger than 4.0. It is more preferable that the zoom ratio is not above an upper limit of 10.0 of the condition (16C) and that the aberration fluctuation and the total length of the lens system are inhibited from being enlarged.

In the above zoom lens-system, when the third lens unit is constituted of two lenses, it is preferable to satisfy the following condition:

$$2.7 < f_T/f_W < 7.0 \quad (16C\text{-}1),$$

in which $f_T$ is a focal length of the zoom lens system in the telephoto end, and $f_W$ is a focal length of the zoom lens system in the wide-angle end.

When the third lens unit is constituted of two lenses, the constitution is advantageous in miniaturizing the lens system when collapsed. In this case, it is preferable to set a lower limit of the zoom ratio to 2.7 or more as generally demanded and to set an upper limit of 7.0. In consequence, the constitution is advantageous in suppressing the enlargement of the aberration fluctuation and the total length and miniaturizing a lens barrel when collapsed.

Regarding the mode of movement of the fourth lens unit, it is preferable that the fourth lens unit is disposed closer to the object side in an intermediate focal length state than in the wide-angle end and the telephoto end and that the following condition is satisfied:

$$0.1 < (D_{g4s} - D_{g4max})/Ih < 1.5 \quad (17C),$$

in which $D_{g4s}$ is a distance from the image surface of the zoom lens system to the fourth lens unit in the intermediate focal length state, $D_{g4max}$ is a larger value of distances from the image surface of the zoom lens system to the fourth lens unit in the wide-angle end and the telephoto end, and Ih is the maximum image height. Here, the intermediate focal length state is a state in which the focal length of the zoom lens system has a geometrical average value of the focal length of the zoom lens system in the wide-angle end and the focal length of the zoom lens system in the telephoto end.

When the condition (17C) is satisfied, the corrections of the astigmatism and the distortion and the miniaturization are satisfactorily easily balanced. It is preferable that a value of $(D_{g4s} - D_{g4max})/Ih$ is not above an upper limit of the condition (17C). In consequence, the movement amount of the fourth lens unit is appropriately suppressed, and the enlargement of the zoom lens system is inhibited.

It is preferable that the value of $(D_{g4s} - D_{g4max})/Ih$ is not below a lower limit of the condition (17C). In consequence, the movement amount of the fourth lens unit is appropriately secured, and the aberration fluctuation during zooming is suppressed.

It is to be noted that it is preferable to satisfy the following condition:

$$0.15 < (D_{g4s} - D_{g4max})/Ih < 1.2 \quad (17C\text{-}1).$$

It is to be noted that the following condition is preferably satisfied:

$$0.2 < (D_{g4s} - D_{g4max})/Ih < 0.9 \quad (17C\text{-}2).$$

The above zoom lens system is preferable for use as a photographing lens of an image pickup apparatus. In general, when an incidence angle of a ray upon an image pickup surface of an electronic image pickup element, phenomena such as an insufficient quantity of light and false color (wrong color reproduction) easily occur. The above constitution of the zoom lens system is preferable in disposing an exit pupil away from the image surface. Therefore, the system is preferable for use in the image pickup apparatus including the electronic image pickup element which converts an image formed by the zoom lens system into an electric signal.

A plurality of constitutions and conditions described above can simultaneously be satisfied.

Moreover, in the above description, a broad condition and a narrow condition are set to the same parameter (e.g., $f_T/f_{g1}$). However, for example, the lower limit value of the broad condition may be combined with the upper limit value of the narrow condition. Thus, the upper limit values and the lower limit values of a plurality of conditions for the same parameter may be combined to set a new condition.

Next, numerical examples will be described.

FIGS. 15A to 19C are sectional views of Examples 8 to 12 when focused on an infinite object along an optical axis. In these drawings, FIGS. 15, 16A . . . show lens sectional views in a wide-angle end; FIGS. 15B, 16B show the views in a first middle state; FIGS. 15C, 16C . . . show the views in a second middle state; FIGS. 15D, 16D . . . show the views in a third middle state; and FIGS. 15E, 16E . . . show the views in a telephoto end. In FIGS. 15A to 19C, G1 is a first lens unit, G2 is a second lens unit, S is an aperture stop, G3 is a third lens unit, G4 is a fourth lens unit, F is a plane parallel plate which is a low pass filter coated with a wavelength band restrictive coating to limit an infrared ray, C is a plane parallel plate which is a cover glass of an electronic image pickup element and I is an image surface. It is to be noted that the surface of the cover glass C may be coated with a multilayered thin film for limiting a wavelength band. The cover glass C may have a low pass filter function.

EXAMPLE 8

Figure 15A:
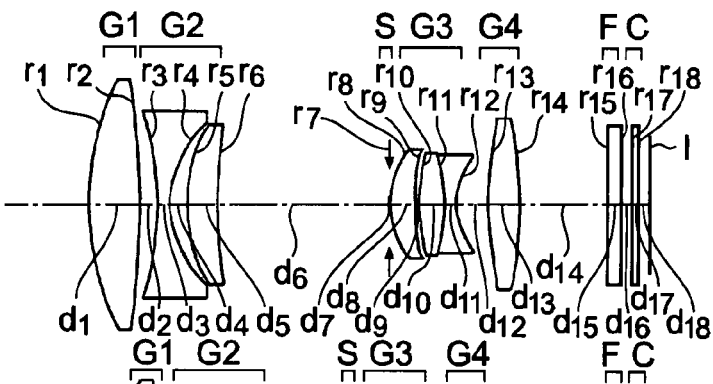
FIGS. 15A to 15E are sectional views of Example 8 of the present invention along an optical axis.
Figure 15B:
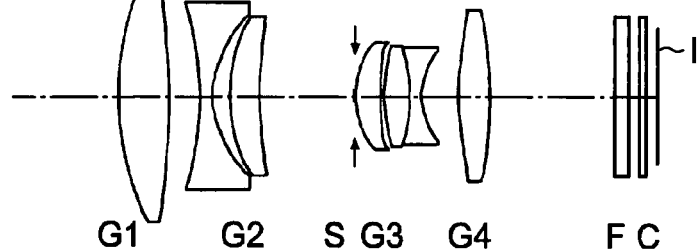
Figure 15C:
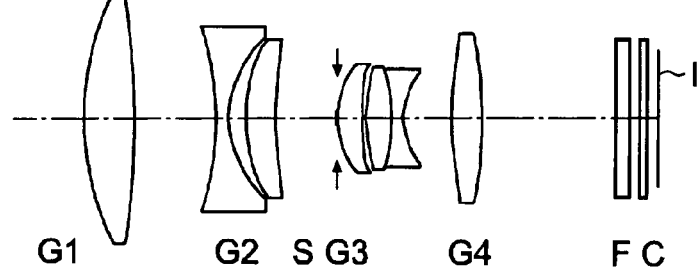
Figure 15D:
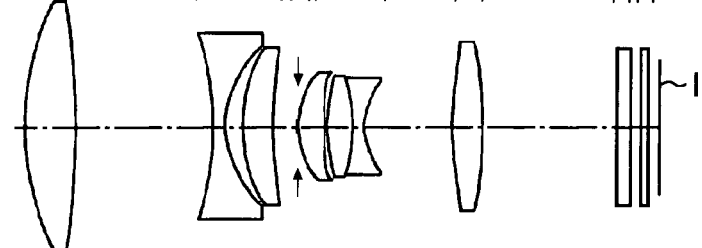
Figure 15E:
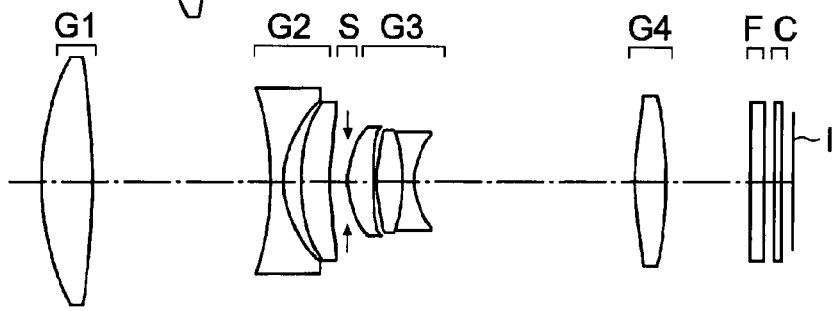

FIGS. 15A to 15E are sectional views of Example 8 along an optical axis, FIG. 15A shows an arrangement of lens units in a wide-angle end, FIGS. 15B, 15C and 15D show arrangements of the lens units in three states between the wide-angle end and a telephoto end, and FIG. 15E shows an arrangement of the lens units in the telephoto end. A focal length increases in order from FIGS. 15A, 15B, 15C, 15D and 15E.

Figure 16A:
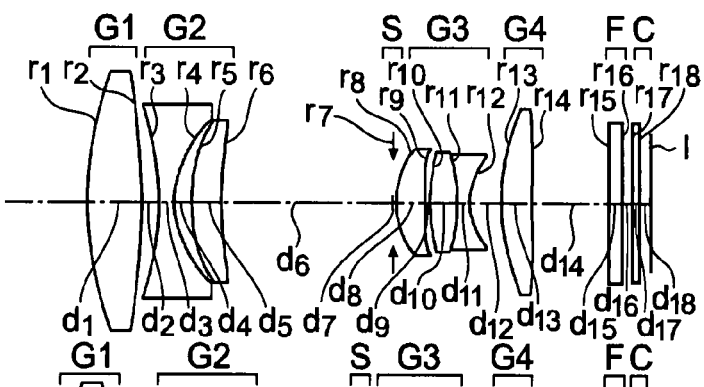
FIGS. 16A to 16E are sectional views of Example 9 of the present invention along an optical axis.

As shown in FIG. 16A, this zoom lens system includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from the wide-angle end to the telephoto end, the first lens unit G1 once moves toward an image side, and then reverses its movement direction in the wide-angle side of an intermediate focal length state (before reaching the intermediate focal length state) to move toward the object side. The second lens unit G2 once moves toward the image side, and then reverses its movement direction in the vicinity of the intermediate focal length state to move toward the object side. The third lens unit G3 moves toward the object side. The fourth lens unit G4 once moves toward the object side, and then reverses its movement direction in the telephoto side of the intermediate focal length state (after passing the intermediate focal length state) to move toward the image side.

It is to be noted that the intermediate focal length state is a state in which the focal length has a geometrical average value of focal lengths in the wide-angle end and the telephoto end.

The first lens unit G1 is constituted of a first double convex positive lens. The second lens unit G2 is constituted of, in order from the object side, a second double concave negative lens and a third positive meniscus lens whose convex surface faces the object side. The third lens unit G3 is constituted of, in order from the object side, a fourth double convex positive lens, a fifth double convex positive lens and a sixth double concave negative lens. The fifth double convex positive lens is cemented to the sixth double concave negative lens. The fourth lens unit G4 is constituted of a seventh double convex positive lens having opposite surfaces which are aspherical surfaces.

Aspherical surfaces are used on seven surfaces including an object-side surface of the first double convex positive lens, the opposite surfaces of the second double concave negative lens, the opposite surfaces of the fourth double convex positive lens and the opposite surfaces of the seventh double convex positive lens.

An image height is 3.8 mm. The focal lengths are 6.46, 9.33, 14.00, 20.85 and 30.96 mm in order from the wide-angle end, a first middle state, a second middle state, a third middle state and the telephoto end, and Fno are 2.8, 3.27, 3.43, 3.56 and 4.11 in order from the wide-angle end, the first middle state, the second middle state, the third middle state and the telephoto end.

EXAMPLE 9

Figure 16B:
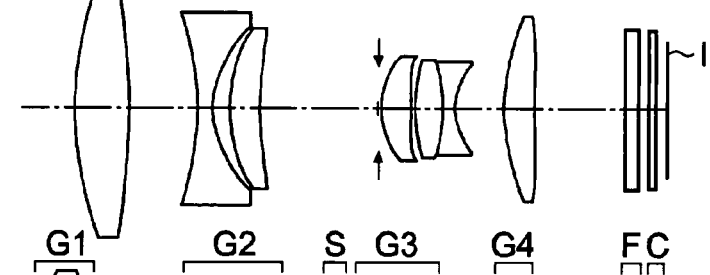
Figure 16C:
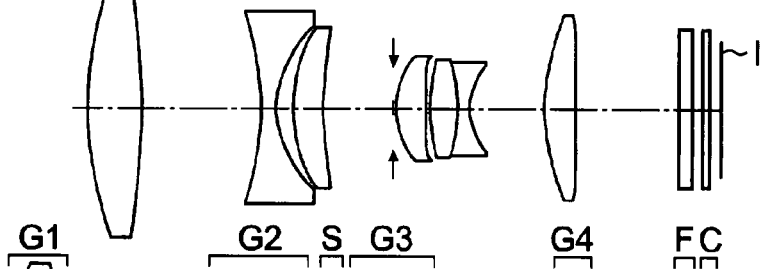
Figure 16D:
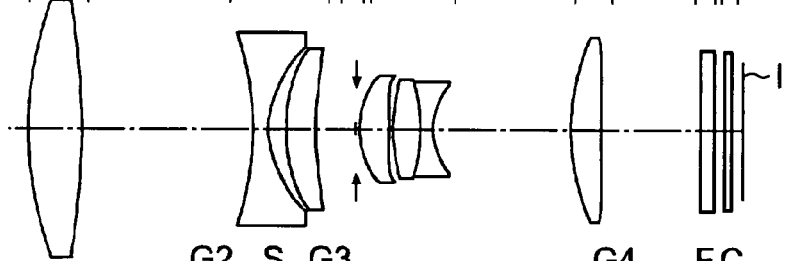
Figure 16E:
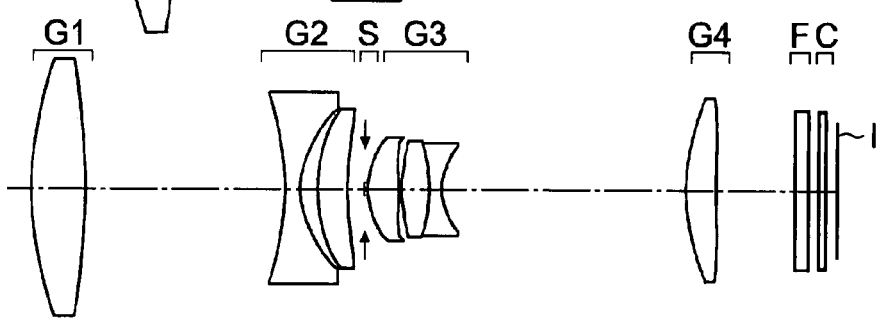

FIGS. 16A to 16E are sectional views of Example 9 along an optical axis, FIG. 16A shows an arrangement of lens units in a wide-angle end, FIGS. 16B, 16C and 16D show arrangements of the lens units in three states between the wide-angle end and a telephoto end, and FIG. 16E shows an arrangement of the lens units in the telephoto end. A focal length increases in order from FIGS. 16A, 16B, 16C, 16D and 16E.

As shown in FIG. 16A, this zoom lens system includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from the wide-angle end to the telephoto end, the first lens unit G1 moves toward the object side. The second lens unit G2 once moves toward an image side, and then reverses its movement direction in the vicinity of the intermediate focal length state to move toward the object side. The third lens unit G3 moves toward the object side. The fourth lens unit G4 once moves toward the object side, and then reverses its movement direction in the vicinity of the intermediate focal length state to move toward the image side.

The first lens unit G1 is constituted of a first double convex positive lens. The second lens unit G2 is constituted of, in order from the object side, a second double concave negative lens and a third positive meniscus lens whose convex surface faces the object side. The third lens unit G3 is constituted of, in order from the object side, a fourth double convex positive lens, a fifth double convex positive lens and a sixth double concave negative lens. The fifth double convex positive lens is cemented to the sixth double concave negative lens. The fourth lens unit G4 is constituted of a seventh double convex positive lens.

Aspherical surfaces are used on eight surfaces including the opposite surfaces of the first double convex positive lens, the opposite surfaces of the second double concave negative lens, the opposite surfaces of the fourth double convex positive lens and the opposite surfaces of the seventh double convex positive lens.

An image height is 3.8 mm. The focal lengths are 6.45, 9.55, 14.13, 20.91 and 30.83 mm in order from the wide-angle end, a first middle state, a second middle state, a third middle state and the telephoto end, and Fno are 2.99, 3.31, 3.65, 4.05 and 4.9 in order from the wide-angle end, the first middle state, the second middle state, the third middle state and the telephoto end.

EXAMPLE 10

Figure 17A:
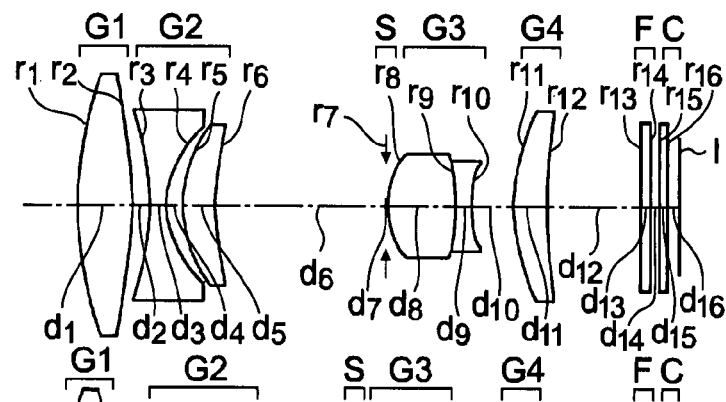
FIGS. 17A to 17E are sectional views of Example 10 of the present invention along an optical axis.
Figure 17B:
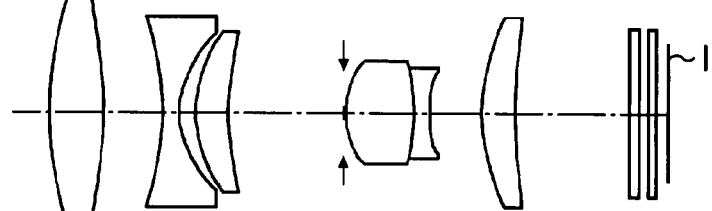
Figure 17C:
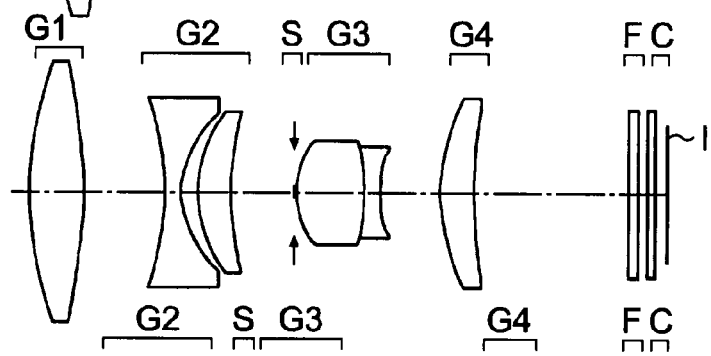
Figure 17D:
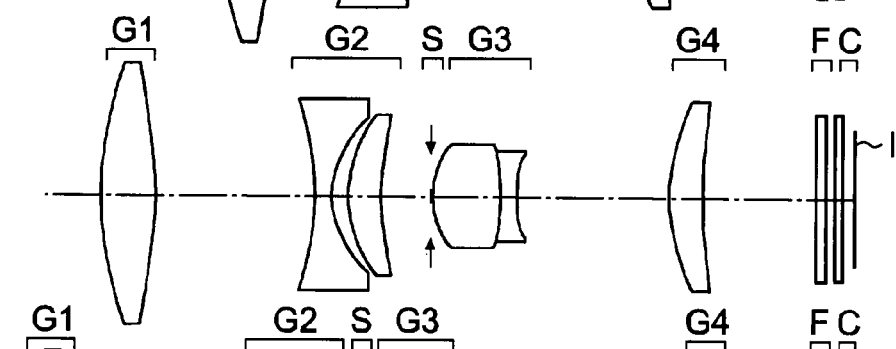
Figure 17E:
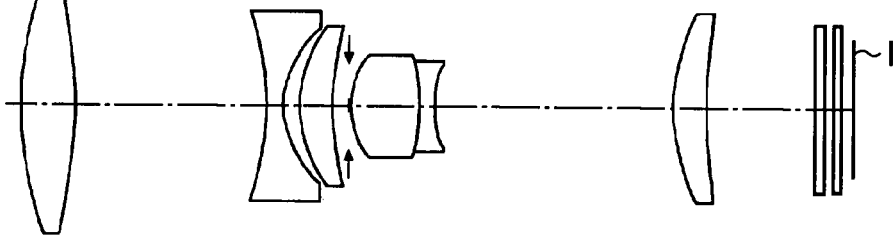

FIGS. 17A to 17E are sectional views of Example 10 along an optical axis, FIG. 17A shows an arrangement of lens units in a wide-angle end, FIGS. 17B, 17C and 17D show arrangements of the lens units in three states between the wide-angle end and a telephoto end, and FIG. 17E shows an arrangement of the lens units in the telephoto end. A focal length increases in order from FIGS. 17A, 17B, 17C, 17D and 17E.

As shown in FIG. 17A, this zoom lens system includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from the wide-angle end to the telephoto end, the first lens unit G1 moves toward the object side. The second lens unit G2 once moves toward an image side, and then reverses its movement direction in the vicinity of an intermediate focal length state to move toward the object side. The third lens unit G3 moves toward the object side. The fourth lens unit G4 once moves toward the object side, and then reverses its movement direction in the vicinity of the intermediate focal length state to move toward the image side.

The first lens unit G1 is constituted of a first double convex positive lens. The second lens unit G2 is constituted of, in order from the object side, a second double concave negative lens and a third positive meniscus lens whose convex surface faces the object side. The third lens unit G3 is constituted of, in order from the object side, a fourth double convex positive lens and a fifth double concave negative lens. The fourth double convex positive lens is cemented to the fifth double concave negative lens. The fourth lens unit G4 is constituted of a sixth positive meniscus lens whose opposite surfaces are aspherical surfaces and whose convex surface faces the object side.

Aspherical surfaces are used on seven surfaces including the opposite surfaces of the first double convex positive lens, the opposite surfaces of the second double concave negative lens, an image-side surface of the fifth double concave negative lens and the opposite surfaces of the sixth positive meniscus lens.

An image height is 3.8 mm. The focal lengths are 6.72, 10.1, 15.07, 22.12 and 33.05 mm in order from the wide-angle end, a first middle state, a second middle state, a third middle state and the telephoto end, and Fno are 3.15, 3.53, 4.11, 4.33 and 5 in order from the wide-angle end, the first middle state, the second middle state, the third middle state and the telephoto end.

EXAMPLE 11

Figure 18A:
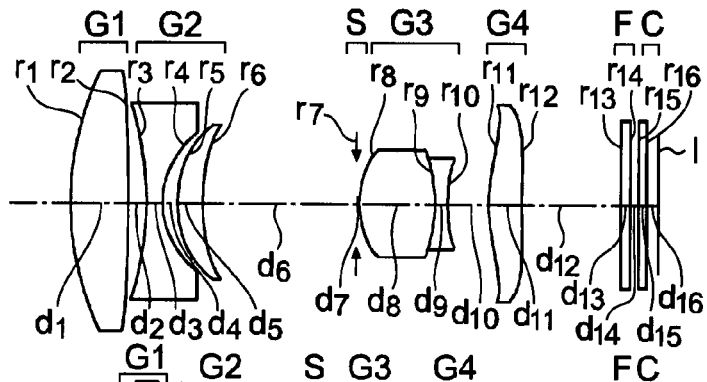
FIGS. 18A to 18E are sectional views of Example 11 of the present invention along an optical axis.
Figure 18B:
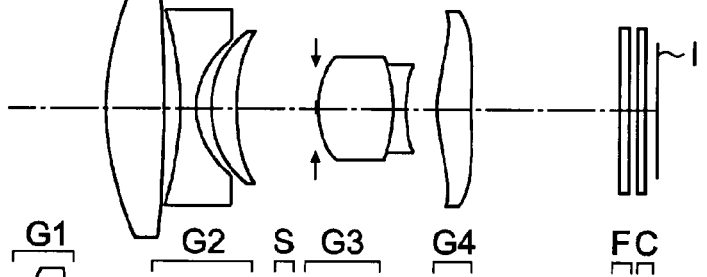
Figure 18C:
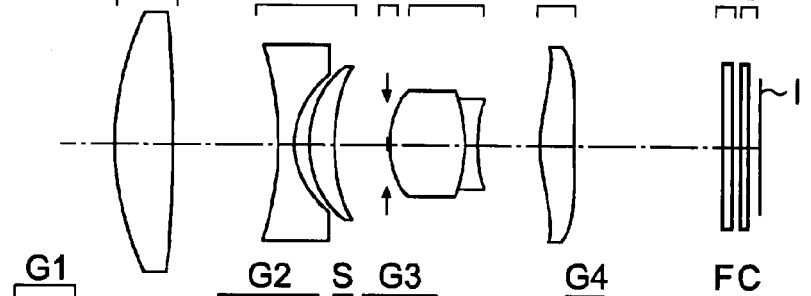
Figure 18D:
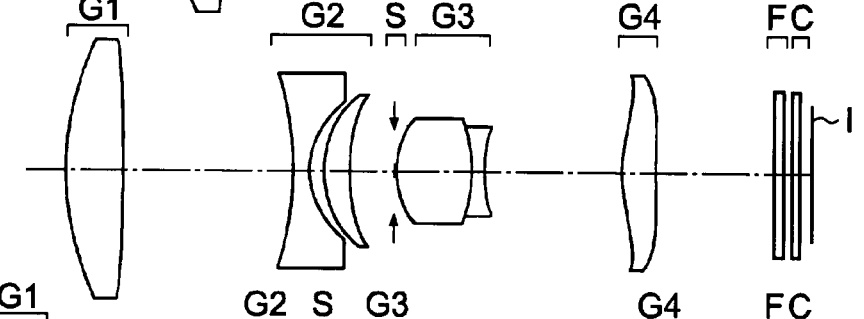
Figure 18E:
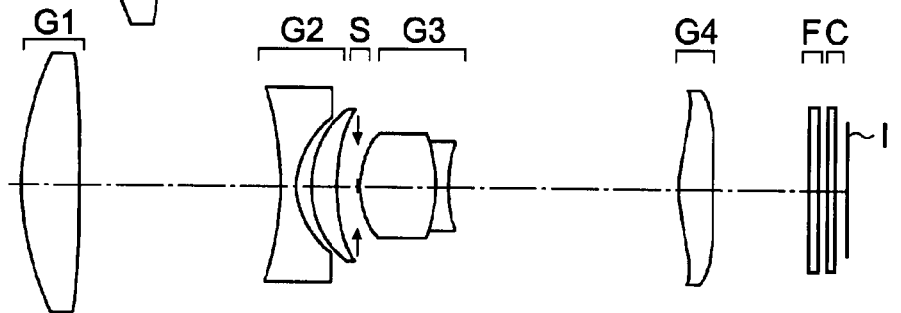

FIGS. 18A to 18E are sectional views of Example 11 along an optical axis, FIG. 18A shows an arrangement of lens units in a wide-angle end, FIGS. 18B, 18C and 18D show arrangements of the lens units in three states between the wide-angle end and a telephoto end, and FIG. 18E shows an arrangement of the lens units in the telephoto end. A focal length increases in order from FIGS. 18A, 18B, 18C, 18D and 18E.

As shown in FIG. 18A, this zoom lens system includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from the wide-angle end to the telephoto end, the first lens unit G1 moves toward an image side, and then reverses its movement direction in the wide-angle side of an intermediate focal length state to move toward the object side. The second lens unit G2 once moves toward the image side, and then reverses its movement direction in the wide-angle side of the intermediate focal length state to move toward the object side. The third lens unit G3 moves toward the object side. The fourth lens unit G4 once moves toward the object side, and then reverses its movement direction in the wide-angle side of the intermediate focal length state to move toward the image side.

The first lens unit G1 is constituted of a first double convex positive lens. The second lens unit G2 is constituted of, in order from the object side, a second double concave negative lens and a third positive meniscus lens whose convex surface faces the object side. The third lens unit G3 is constituted of, in order from the object side, a fourth double convex positive lens and a fifth double concave negative lens. The fourth double convex positive lens is cemented to the fifth double concave negative lens. The fourth lens unit G4 is constituted of a sixth double convex positive lens.

Aspherical surfaces are used on eight surfaces including an object-side surface of the first double convex positive lens, the opposite surfaces of the second double concave negative lens, the opposite surfaces of the third positive meniscus lens, an image-side surface of the fifth double concave negative lens and the opposite surfaces of the sixth double convex positive lens.

An image height is 3.8 mm. The focal lengths are 6.85, 10.09, 15.26, 22.13 and 32.77 mm in order from the wide-angle end, a first middle state, a second middle state, a third middle state and the telephoto end, and Fno are 2.81, 3.3, 3.41, 3.6 and 4.14 in order from the wide-angle end, the first middle state, the second middle state, the third middle state and the telephoto end.

EXAMPLE 12

Figure 19A:
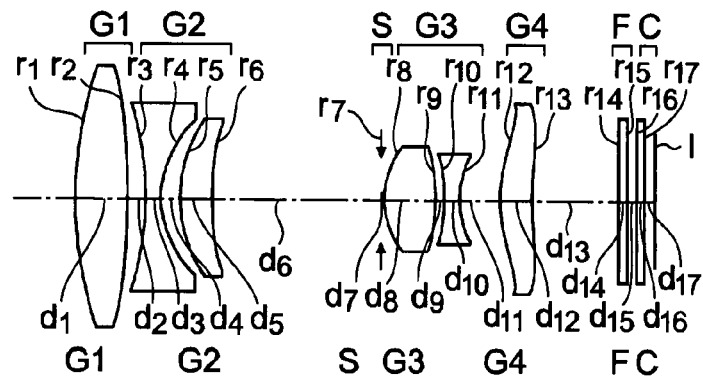
FIGS. 19A to 19E are sectional views of Example 12 of the present invention along an optical axis.
Figure 19B:
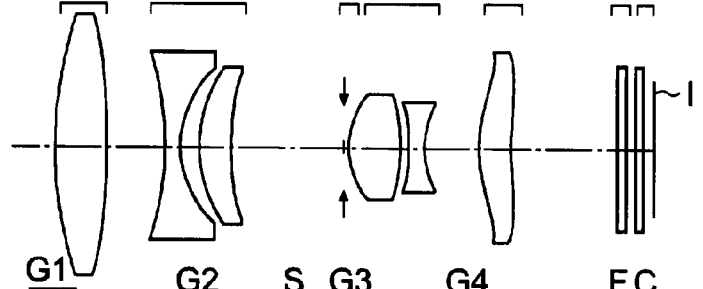
Figure 19C:
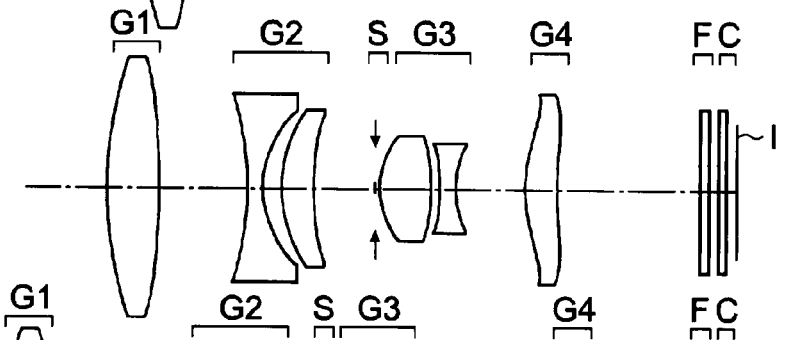
Figure 19D:
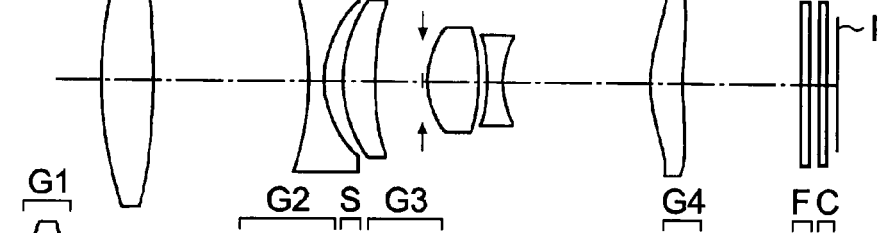
Figure 19E:
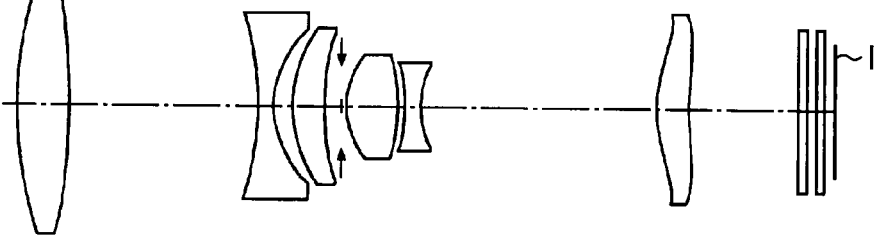
Figure 20A:
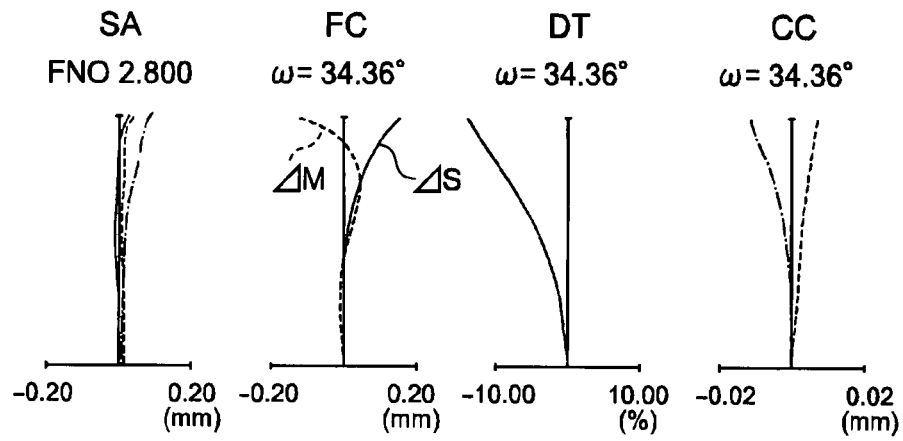
FIGS. 20A to 20C are aberration diagrams showing a spherical aberration (SA), astigmatism (FC), distortion (DT) and chromatic aberration of magnification (CC) of Example 8 when focused on an infinite object.
Figure 20B:
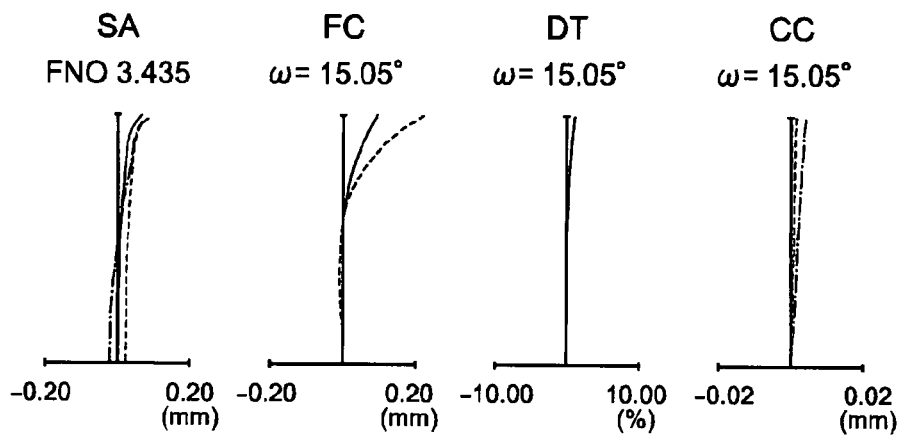
Figure 20C:
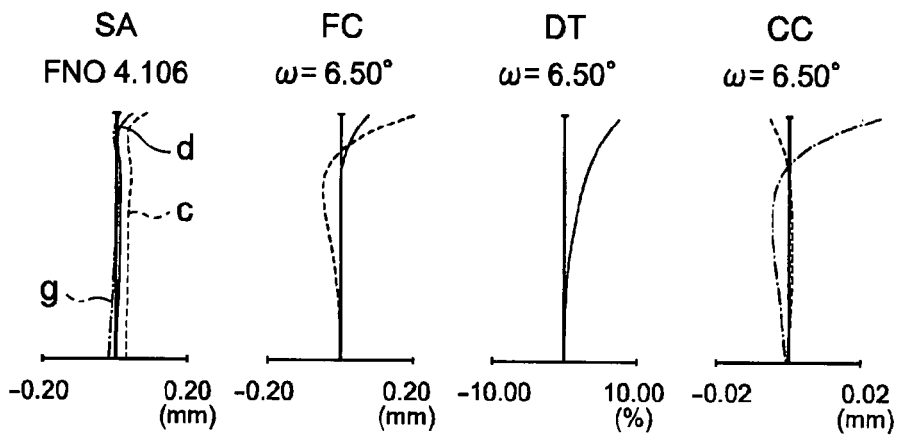
Figure 21A:
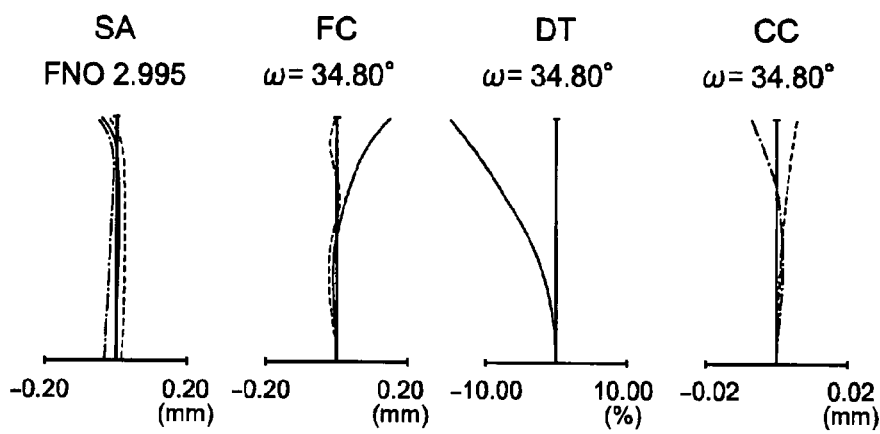
FIGS. 21A to 21C are aberration diagrams showing a spherical aberration (SA), astigmatism (FC), distortion (DT) and chromatic aberration of magnification (CC) of Example 9 when focused on an infinite object.
Figure 21B:
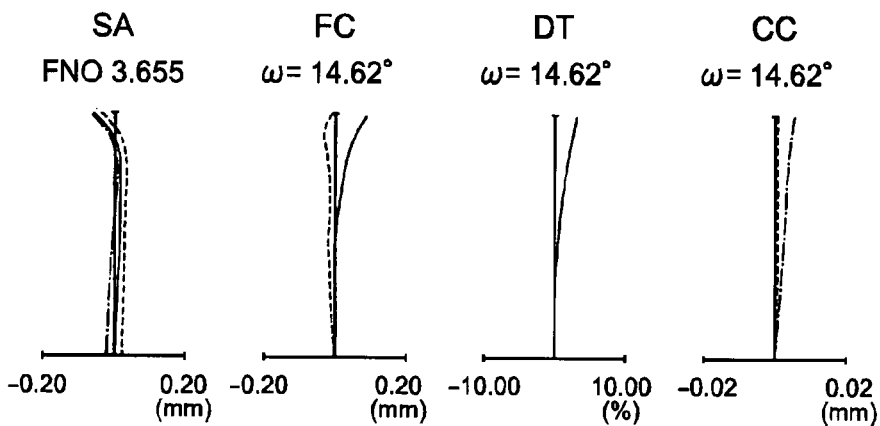
Figure 21C:
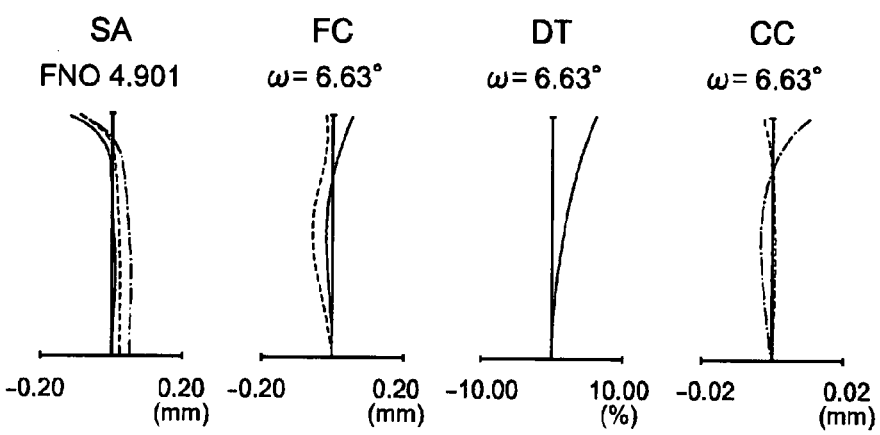
Figure 22A:
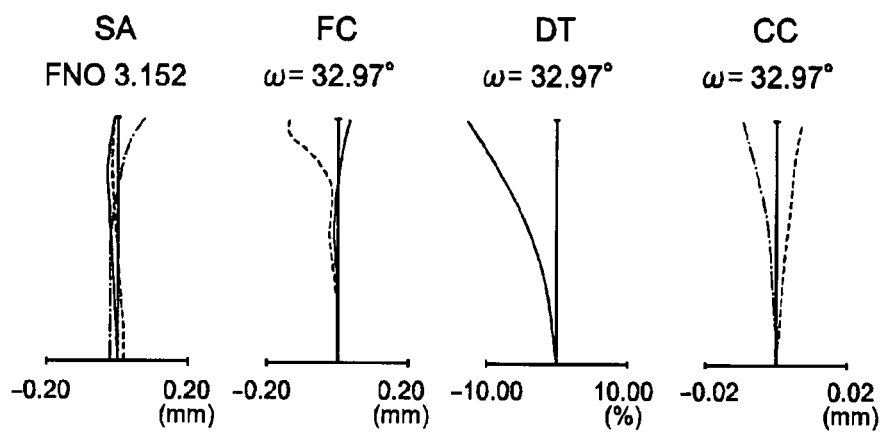
FIGS. 22A to 22C are aberration diagrams showing a spherical aberration (SA), astigmatism (FC), distortion (DT) and chromatic aberration of magnification (CC) of Example 10 when focused on an infinite object.
Figure 22B:
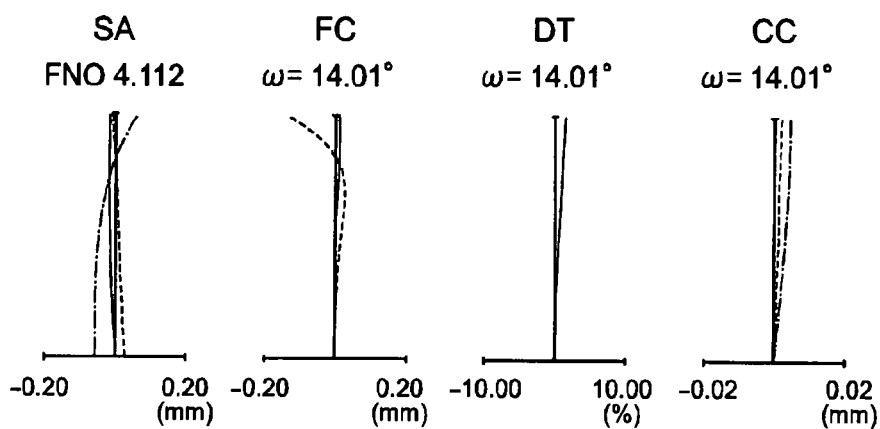
Figure 22C:
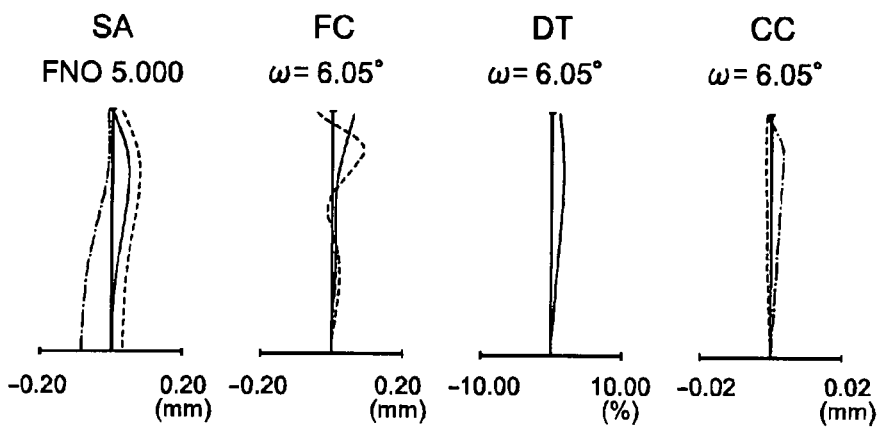
Figure 23A:
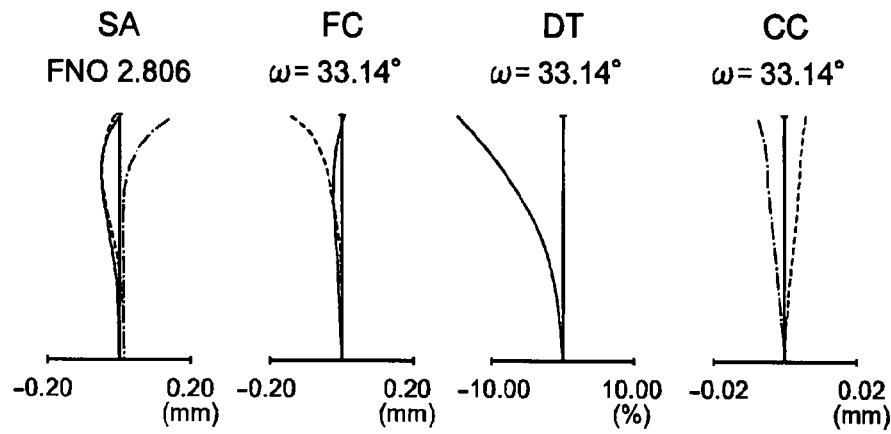
FIGS. 23A to 23C are aberration diagrams showing a spherical aberration (SA), astigmatism (FC), distortion (DT) and chromatic aberration of magnification (CC) of Example 11 when focused on an infinite object.
Figure 23B:
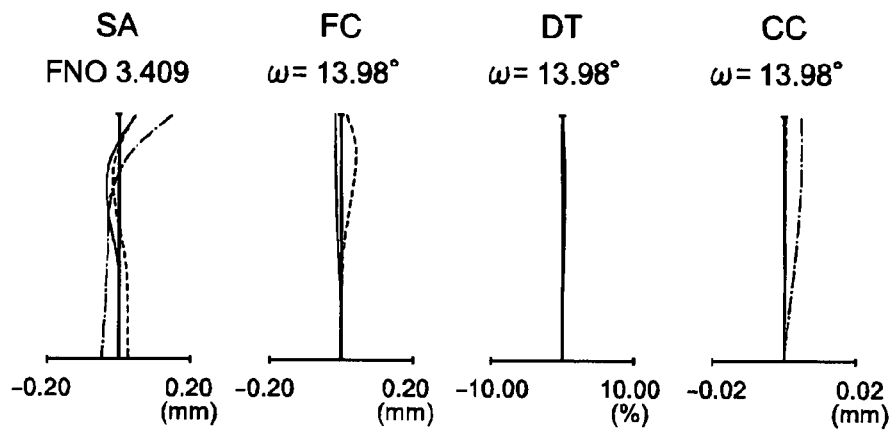
Figure 23C:
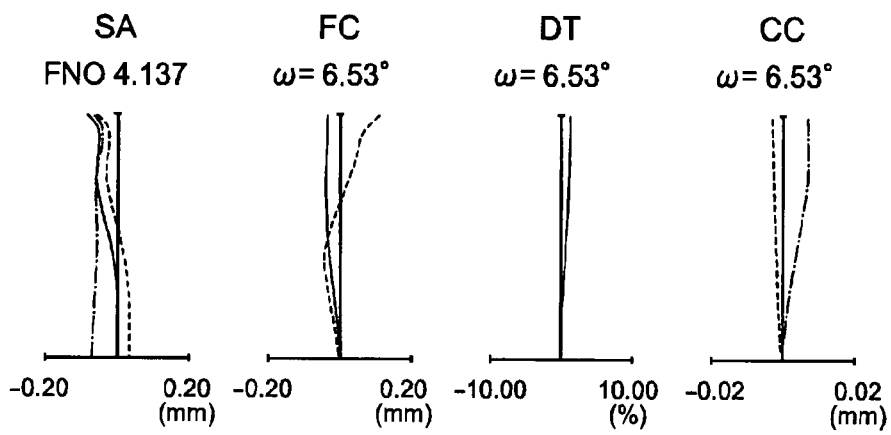
Figure 24A:
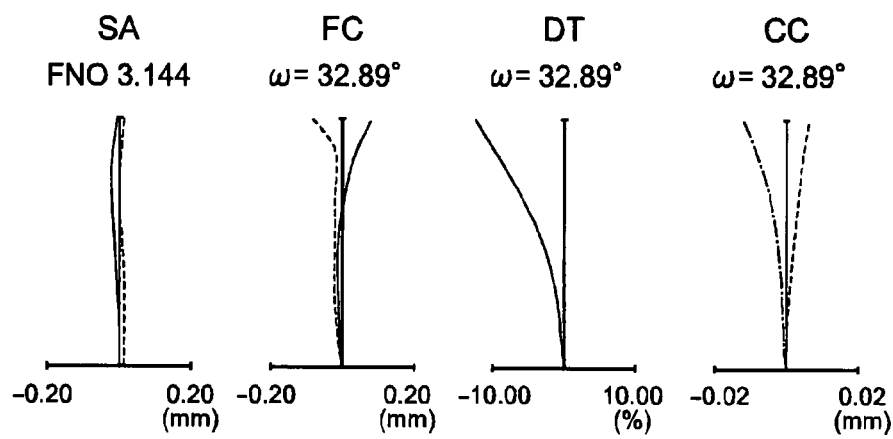
FIGS. 24A to 24C are aberration diagrams showing a spherical aberration (SA), astigmatism (FC), distortion (DT) and chromatic aberration of magnification (CC) of Example 12 when focused on an infinitely far object.
Figure 24B:
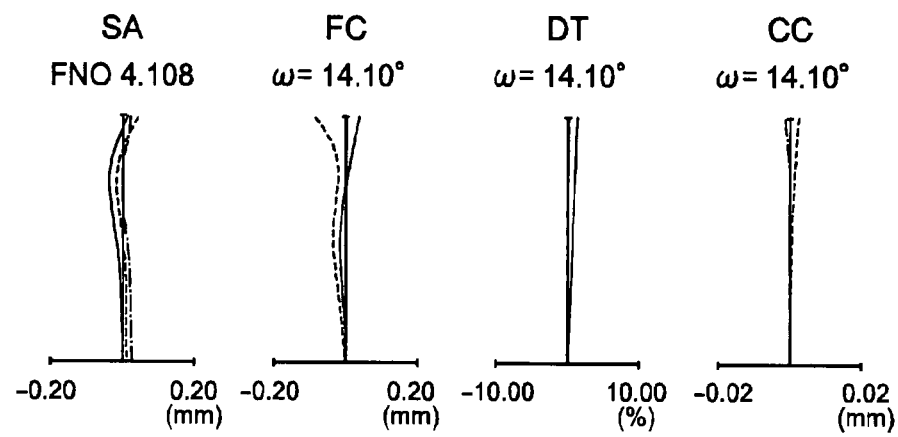
Figure 24C:
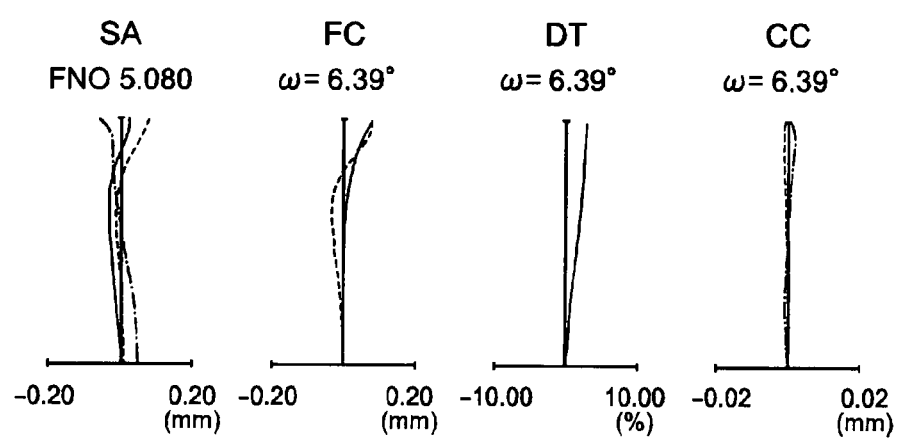

FIGS. 19A to 19E are sectional views of Example 12 along an optical axis, FIG. 19A shows an arrangement of lens units in a wide-angle end, FIGS. 19B, 19C and 19D show arrangements of the lens units in three states between the wide-angle end and a telephoto end, and FIG. 19E shows an arrangement of the lens units in the telephoto end. A focal length increases in order from FIGS. 19A, 19B, 19C, 19D and 19E.

As shown in FIG. 19A, this zoom lens system includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power.

During zooming from the wide-angle end to the telephoto end, the first lens unit G1 moves toward the object side. The second lens unit G2 once moves toward an image side, and then reverses its movement direction in the wide-angle side of an intermediate focal length state to move toward the object side. The third lens unit G3 moves toward the object side. The fourth lens unit G4 once moves toward the object side, and then reverses its movement direction in the vicinity of the intermediate focal length state to move toward the image side.

The first lens unit G1 is constituted of a first double convex positive lens. The second lens unit G2 is constituted of, in order from the object side, a second double concave negative lens and a third positive meniscus lens whose convex surface faces the object side. The third lens unit G3 is constituted of, in order from the object side, a fourth double convex positive lens and a fifth double concave negative lens. The fourth lens unit G4 is constituted of a sixth positive meniscus lens whose convex surface faces the object side.

Aspherical surfaces are used on nine surfaces including the opposite surfaces of the first double convex positive lens, the opposite surfaces of the second double concave negative lens, the opposite surfaces of a fourth double convex positive lens, an image-side surface of the fifth double concave negative lens and the opposite surfaces of the sixth positive meniscus lens.

An image height is 3.8 mm. The focal lengths are 6.72, 10.1, 14.97, 22.16 and 33.11 mm in order from the wide-angle end, a first middle state, a second middle state, a third middle state and the telephoto end, and Fno are 3.14, 3.57, 4.11, 4.42 and 5.08 in order from the wide-angle end, the first middle state, the second middle state, the third middle state and the telephoto end.

Next, numerical data of the above Examples will hereinafter be described. In the above Examples, $r_1, r_2 \ldots$ are paraxial radii of curvatures of the lens surfaces; $d_1, d_2 \ldots$ are thicknesses of lenses or spaces between the lenses; $n_{d1}, n_{d2} \ldots$ are refractive indices of the lenses for the d-line, and $v_{d1}, v_{d2} \ldots$ are the Abbe numbers of the lenses for the d-line. Furthermore, Fno is the F-number, fL is a focal length of the zoom lens system, and 2ω is an angle of field (ω is a half angle of view). In addition, a unit of each of R, D and fL is mm. It is to be noted that "*" attached to a surface number means that the surface is an aspherical surface, "S" means that the surface is an aperture stop, and "I" means that the surface is an image surface, respectively. It is to be noted that a shape of the aspherical surface is represented by the following equation in a coordinate system in which an intersection between the aspherical surface and the optical axis is an origin, an optical axis is a z-axis, and a y-axis is set in a direction crossing the optical axis at right angles and passing though the origin:

$$z = (y^2/R) / \left[1 + \{1 - (K+1)(y/R)^2\}^{1/2}\right] + A_4 \cdot y^4 + A_6 \cdot y^6 + A_8 \cdot y^8 + A_{10} \cdot y^{10} + A_{12} \cdot y^{12},$$

in which R is a paraxial radius of curvature, K is a conic constant, and $A_4, A_6, A_8, A_{10}$ and $A_{12}$ are 4-th, 6-th, 8-th, 10-th and 12-th order aspherical coefficients. Among the aspherical coefficients, "e-n" (n is an integer) indicates multiplication by "$10^{-n}$". For example, a value of the aspherical coefficient $A_4$ of the first surface of Numerical Data 8 is -2.50643e-05, but this means $-2.50643 \times 10^{-5}$.

Numerical Data 8

| | | | |
|---|---|---|---|
| $r_1 = 15.276*$ | $d_1 = 2.900$ | $n_{d1} = 1.49700$ | $v_{d1} = 81.54$ |
| $r_2 = -44.570$ | $d_2 =$ variable | | |
| $r_3 = -17.096*$ | $d_3 = 0.706$ | $n_{d2} = 1.88300$ | $v_{d2} = 40.76$ |
| $r_4 = 4.727*$ | $d_4 = 1.000$ | | |
| $r_5 = 8.493$ | $d_5 = 1.700$ | $n_{d3} = 1.92286$ | $v_{d3} = 20.88$ |
| $r_6 = 30.000$ | $d_6 =$ variable | | |
| $r_7 = \infty$ (S) | $d_7 = 0.100$ | | |
| $r_8 = 5.006*$ | $d_8 = 1.567$ | $n_{d4} = 1.80610$ | $v_{d4} = 40.92$ |
| $r_9 = -41.194*$ | $d_9 = 0.100$ | | |
| $r_{10} = 12.074$ | $d_{10} = 1.473$ | $n_{d5} = 1.72916$ | $v_{d5} = 54.68$ |
| $r_{11} = -8.311$ | $d_{11} = 0.627$ | $n_{d6} = 1.84666$ | $v_{d6} = 23.78$ |
| $r_{12} = 3.840$ | $d_{12} =$ variable | | |
| $r_{13} = 15.436*$ | $d_{13} = 1.800$ | $n_{d7} = 1.84666$ | $v_{d7} = 23.78$ |
| $r_{14} = -33.483*$ | $d_{14} =$ variable | | |
| $r_{15} = \infty$ | $d_{15} = 0.805$ | $n_{d8} = 1.54771$ | $v_{d8} = 62.84$ |
| $r_{16} = \infty$ | $d_{16} = 0.568$ | | |
| $r_{17} = \infty$ | $d_{17} = 0.474$ | $n_{d9} = 1.51633$ | $v_{d9} = 64.14$ |
| $r_{18} = \infty$ | $d_{18} = 0.600$ | | |
| $r_{19} = \infty$ (I) | | | |

TABLE 17-1

Aspherical Coefficient

| | First surface | Third surface | Fourth surface | Eighth surface |
|---|---|---|---|---|
| R | 15.276 | -17.096 | 4.727 | 5.006 |
| K | 0.000 | 0.000 | 0.000 | 0.519 |
| $A_4$ | -2.50643e-05 | -8.67993e-04 | -2.06495e-03 | -8.21286e-04 |
| $A_6$ | -1.04945e-07 | 7.43878e-05 | 2.48483e-05 | 1.13605e-04 |
| $A_8$ | -3.19294e-09 | -2.29563e-06 | 1.36292e-06 | -2.47318e-05 |
| $A_{10}$ | 2.91729e-11 | 2.78272e-08 | -1.68529e-07 | 3.75291e-06 |

TABLE 17-2

Aspherical Coefficient

| | Ninth surface | Thirteenth surface | Fourteenth surface |
|---|---|---|---|
| R | -41.194 | 15.436 | -33.483 |
| K | 0.000 | 0.000 | 0.000 |
| $A_4$ | 8.69153e-04 | -2.79359e-04 | -2.21293e-04 |
| $A_6$ | 2.22565e-04 | -8.23673e-06 | -9.73740e-06 |
| $A_8$ | -4.01388e-05 | 0.000 | 2.08202e-07 |
| $A_{10}$ | 6.95715e-06 | 0.000 | -3.09294e-09 |

TABLE 18

Zoom Data (∞)

| | WE | ST1 | ST2 | ST3 | TE |
|---|---|---|---|---|---|
| fL(mm) | 6.46 | 9.93 | 14.00 | 20.85 | 30.96 |
| $F_{NO}$ | 2.8 | 3.27 | 3.43 | 3.56 | 4.11 |
| 2ω(°) | 68.71 | 43.27 | 30.1 | 20.2 | 13.01 |
| $d_2$ | 1 | 1.89 | 4.733 | 7.841 | 10.189 |
| $d_6$ | 9.739 | 5.248 | 3.395 | 1.387 | 1 |
| $d_{12}$ | 1.8 | 2.126 | 2.703 | 4.993 | 12.756 |
| $d_{14}$ | 5.035 | 7.038 | 7.68 | 7.681 | 4.628 |

Numerical Data 9

| | | | |
|---|---|---|---|
| $r_1 = 20.645*$ | $d_1 = 3.100$ | $n_{d1} = 1.49700$ | $v_{d1} = 81.54$ |
| $r_2 = -40.563*$ | $d_2 =$ variable | | |
| $r_3 = -13.518*$ | $d_3 = 0.800$ | $n_{d2} = 1.80610$ | $v_{d2} = 40.92$ |

-continued

| | | | |
|---|---|---|---|
| $r_4 = 5.165^*$ | $d_4 = 1.000$ | | |
| $r_5 = 8.595$ | $d_5 = 1.700$ | $n_{d3} = 1.92286$ | $v_{d3} = 20.88$ |
| $r_6 = 26.980$ | $d_6 = $ variable | | |
| $r_7 = \infty$ (S) | $d_7 = 0.200$ | | |
| $r_8 = 5.293^*$ | $d_8 = 1.800$ | $n_{d4} = 1.80610$ | $v_{d4} = 40.92$ |
| $r_9 = -41.027^*$ | $d_9 = 0.100$ | | |
| $r_{10} = 11.090$ | $d_{10} = 1.600$ | $n_{d5} = 1.72916$ | $v_{d5} = 54.68$ |
| $r_{11} = -8.868$ | $d_{11} = 0.700$ | $n_{d6} = 1.84666$ | $v_{d6} = 23.78$ |
| $r_{12} = 3.921$ | $d_{12} = $ variable | | |
| $r_{13} = 11.765^*$ | $d_{13} = 1.800$ | $n_{d7} = 1.84666$ | $v_{d7} = 23.78$ |
| $r_{14} = -643.914^*$ | $d_{14} = $ variable | | |
| $r_{15} = \infty$ | $d_{15} = 0.805$ | | |
| $r_{16} = \infty$ | $d_{16} = 0.568$ | | |
| $r_{17} = \infty$ | $d_{17} = 0.474$ | $n_{d8} = 1.54771$ | $v_{d8} = 62.84$ |
| $r_{18} = \infty$ | $d_{18} = 0.600$ | | |
| $r_{19} = \infty$ (I) | | | |

TABLE 19-1

Aspherical Coefficient

| | First surface | Second surface | Third surface | Fourth surface |
|---|---|---|---|---|
| R | 20.645 | −40.563 | −13.518 | 5.165 |
| K | 0.000 | 0.000 | 0.000 | 0.000 |
| $A_4$ | −8.34769e−06 | −1.39373e−06 | −3.50951e−04 | −1.28818e−03 |
| $A_6$ | −2.39511e−07 | 2.18516e−08 | 4.80493e−05 | 3.45126e−05 |
| $A_8$ | 1.07387e−08 | 4.89856e−09 | −1.56011e−06 | −1.42120e−07 |
| $A_{10}$ | −7.33141e−11 | −5.03666e−11 | 1.91666e−08 | −6.95325e−08 |

TABLE 19-2

Aspherical Coefficient

| | Eighth surface | Ninth surface | Thirteenth surface | Fourteenth surface |
|---|---|---|---|---|
| R | 5.293 | −41.027 | 11.765 | −643.914 |
| K | 0.519 | 0.000 | 0.000 | 0.000 |
| $A_4$ | −6.26610e−04 | 9.89234e−04 | 6.00707e−05 | 1.66629e−04 |
| $A_6$ | 8.84092e−05 | 1.57976e−04 | −8.23673e−06 | −1.08820e−05 |
| $A_8$ | −1.62349e−05 | −2.40891e−05 | 0.000 | 2.04069e−08 |
| $A_{10}$ | 2.48408e−06 | 4.63539e−06 | 0.000 | 1.12478e−09 |

TABLE 20

Zoom Data (∞)

| | WE | ST1 | ST2 | ST3 | TE |
|---|---|---|---|---|---|
| fL(mm) | 6.45 | 9.55 | 14.13 | 20.91 | 30.83 |
| $F_{NO}$ | 2.99 | 3.31 | 3.65 | 4.05 | 4.9 |
| 2ω(°) | 69.61 | 43.49 | 29.24 | 19.73 | 13.25 |
| $d_2$ | 1 | 4.022 | 6.775 | 9.763 | 11.424 |
| $d_6$ | 9.721 | 6.66 | 4.024 | 2.342 | 1 |
| $d_{12}$ | 1.8 | 2.762 | 4.226 | 7.884 | 14.053 |
| $d_{14}$ | 4.323 | 5.028 | 5.786 | 5.403 | 4.269 |

Numerical Data 10

| | | | |
|---|---|---|---|
| $r_1 = 22.761^*$ | $d_1 = 3.000$ | $n_{d1} = 1.49700$ | $v_{d1} = 81.54$ |
| $r_2 = -27.953^*$ | $d_2 = $ variable | | |
| $r_3 = -11.246^*$ | $d_3 = 0.900$ | $n_{d2} = 1.80610$ | $v_{d2} = 40.92$ |
| $r_4 = 5.463^*$ | $d_4 = 0.950$ | | |
| $r_5 = 7.356$ | $d_5 = 1.800$ | $n_{d3} = 1.92286$ | $v_{d3} = 18.90$ |
| $r_6 = 15.297$ | $d_6 = $ variable | | |
| $r_7 = \infty$ (S) | $d_7 = 0.100$ | | |
| $r_8 = 4.618$ | $d_8 = 3.794$ | $n_{d4} = 1.72916$ | $v_{d4} = 54.68$ |

-continued

| | | | |
|---|---|---|---|
| $r_9 = -10.974$ | $d_9 = 0.900$ | $n_{d5} = 1.84666$ | $v_{d5} = 23.78$ |
| $r_{10} = 9.435^*$ | $d_{10} = $ variable | | |
| $r_{11} = 9.935^*$ | $d_{11} = 1.900$ | $n_{d6} = 1.84666$ | $v_{d6} = 23.78$ |
| $r_{12} = 22.957^*$ | $d_{12} = $ variable | | |
| $r_{13} = \infty$ | $d_{13} = 0.500$ | $n_{d7} = 1.54771$ | $v_{d7} = 62.84$ |
| $r_{14} = \infty$ | $d_{14} = 0.500$ | | |
| $r_{15} = \infty$ | $d_{15} = 0.500$ | $n_{d8} = 1.51633$ | $v_{d8} = 64.14$ |
| $r_{16} = \infty$ | $d_{16} = 0.600$ | | |
| $r_{17} = \infty$ (I) | | | |

TABLE 21-1

Aspherical Coefficient

| | First surface | Second surface | Third surface | Fourth surface |
|---|---|---|---|---|
| R | 22.761 | −27.953 | −11.246 | 5.463 |
| K | 4.871 | −24.594 | −20.250 | −1.195 |
| $A_4$ | 2.40819e−05 | −5.03888e−06 | −4.89004e−04 | 1.76802e−03 |
| $A_6$ | −2.61804e−06 | −1.45098e−06 | −2.57063e−06 | −1.48351e−04 |
| $A_8$ | 4.73401e−08 | 4.01677e−08 | 2.16378e−06 | 1.48125e−05 |
| $A_{10}$ | −6.93734e−10 | −5.89568e−10 | −1.05342e−07 | −6.56627e−07 |
| $A_{12}$ | 0.000 | 0.000 | 1.57598e−09 | 9.59896e−09 |

TABLE 21-2

Aspherical Coefficient

| | Tenth surface | Eleventh surface | Twelfth surface |
|---|---|---|---|
| R | 9.435 | 9.935 | 22.957 |
| K | −2.680 | −3.199 | −9.550 |
| $A_4$ | 3.42862e−03 | 3.97971e−04 | 3.13525e−04 |
| $A_6$ | 2.68488e−04 | 1.44767e−05 | −3.56291e−06 |
| $A_8$ | −1.34268e−05 | −3.07455e−06 | −2.92811e−06 |
| $A_{10}$ | 5.14048e−06 | 7.91400e−08 | 8.98009e−08 |

TABLE 22

Zoom Data (∞)

| | WE | ST1 | ST2 | ST3 | TE |
|---|---|---|---|---|---|
| fL(mm) | 6.72 | 10.1 | 15.07 | 22.12 | 33.05 |
| $F_{NO}$ | 3.15 | 3.53 | 4.11 | 4.33 | 5 |
| 2ω(°) | 65.95 | 41.57 | 28.03 | 19.09 | 12.99 |
| $d_2$ | 1.002 | 3.466 | 4.77 | 9.063 | 10.761 |
| $d_6$ | 9.624 | 6.472 | 3.491 | 2.926 | 1 |
| $d_{10}$ | 2.3 | 2.938 | 3.472 | 8.723 | 13.689 |
| $d_{12}$ | 5.36 | 6.588 | 8.895 | 6.489 | 6.106 |

Numerical Data 11

| | | | |
|---|---|---|---|
| $r_1 = 15.917^*$ | $d_1 = 3.300$ | $n_{d1} = 1.49700$ | $v_{d1} = 81.54$ |
| $r_2 = -67.319$ | $d_2 = $ variable | | |
| $r_3 = -14.932^*$ | $d_3 = 0.900$ | $n_{d2} = 1.78800$ | $v_{d2} = 47.37$ |
| $r_4 = 4.110^*$ | $d_4 = 0.861$ | | |
| $r_5 = 6.353^*$ | $d_5 = 1.500$ | $n_{d3} = 1.84666$ | $v_{d3} = 23.78$ |
| $r_6 = 16.929^*$ | $d_6 = $ variable | | |
| $r_7 = \infty$ (S) | $d_7 = 0.100$ | | |
| $r_8 = 4.949$ | $d_8 = 4.326$ | $n_{d4} = 1.72916$ | $v_{d4} = 54.68$ |
| $r_9 = -7.130$ | $d_9 = 0.700$ | $n_{d5} = 1.84666$ | $v_{d5} = 23.78$ |
| $r_{10} = 12.328^*$ | $d_{10} = $ variable | | |
| $r_{11} = 14.123^*$ | $d_{11} = 1.900$ | $n_{d6} = 1.84666$ | $v_{d6} = 23.78$ |
| $r_{12} = -287.298^*$ | $d_{12} = $ variable | | |
| $r_{13} = \infty$ | $d_{13} = 0.500$ | $n_{d7} = 1.54771$ | $v_{d7} = 62.84$ |
| $r_{14} = \infty$ | $d_{14} = 0.500$ | | |

-continued

| | | | |
|---|---|---|---|
| $r_{15} = \infty$ | $d_{15} = 0.500$ | $n_{d8} = 1.51633$ | $v_{d8} = 64.14$ |
| $r_{16} = \infty$ | $d_{16} = 0.600$ | | |
| $r_{17} = \infty$ (I) | | | |

TABLE 23-1

Aspherical Coefficient

| | First surface | Third surface | Fourth surface | Fifth surface |
|---|---|---|---|---|
| R | 15.917 | −14.932 | 4.110 | 6.353 |
| K | −0.599 | −63.368 | −1.532 | −1.178 |
| $A_4$ | 5.37009e−06 | −1.50715e−03 | 1.49250e−03 | −6.07153e−04 |
| $A_6$ | −2.47696e−07 | 4.10980e−05 | −1.54909e−04 | 1.65896e−04 |
| $A_8$ | 4.36761e−09 | 5.35980e−07 | 1.87926e−05 | −1.24871e−06 |
| $A_{10}$ | −3.25099e−11 | −3.65971e−08 | −9.67597e−07 | −2.98130e−08 |
| $A_{12}$ | 0.000 | 4.29176e−10 | 2.46057e−08 | 0.000 |

TABLE 23-2

Aspherical Coefficient

| | Sixth surface | Tenth surface | Eleventh surface | Twelfth surface |
|---|---|---|---|---|
| R | 16.929 | 12.328 | 14.123 | −287.298 |
| K | −2.656 | −13.681 | 2.297 | 0.000 |
| $A_4$ | −6.58586e−04 | 3.53633e−03 | 1.28881e−04 | 3.16377e−04 |
| $A_6$ | 9.76229e−05 | −5.47959e−05 | −3.54485e−05 | −4.21901e−05 |
| $A_8$ | 4.91541e−06 | 5.41497e−05 | 6.66687e−07 | 6.80905e−07 |
| $A_{10}$ | −2.06003e−07 | −4.14658e−06 | −2.04292e−08 | −1.21921e−08 |

TABLE 24

Zoom Data (∞)

| | WE | ST1 | ST2 | ST3 | TE |
|---|---|---|---|---|---|
| fL(mm) | 6.85 | 10.09 | 15.26 | 22.13 | 32.77 |
| $F_{NO}$ | 2.81 | 3.3 | 3.41 | 3.6 | 4.14 |
| 2ω(°) | 66.28 | 43.03 | 27.97 | 19.4 | 13.07 |
| $d_2$ | 1 | 0.761 | 5.993 | 9.698 | 11.55 |
| $d_6$ | 8.7 | 4.4 | 3.095 | 2.416 | 1 |
| $d_{10}$ | 2.3 | 1.787 | 3.352 | 7.932 | 13.3 |
| $d_{12}$ | 5.681 | 8.508 | 8.482 | 6.826 | 5.462 |

Numerical Data 12

| | | | |
|---|---|---|---|
| $r_1 = 23.111*$ | $d_1 = 3.000$ | $n_{d1} = 1.49700$ | $v_{d1} = 81.54$ |
| $r_2 = -28.669*$ | $d_2 =$ variable | | |
| $r_3 = -10.862*$ | $d_3 = 0.900$ | $n_{d2} = 1.80610$ | $v_{d2} = 40.92$ |
| $r_4 = 5.945*$ | $d_4 = 1.116$ | | |
| $r_5 = 7.751$ | $d_5 = 1.800$ | $n_{d3} = 1.92286$ | $v_{d3} = 18.90$ |
| $r_6 = 14.939$ | $d_6 =$ variable | | |
| $r_7 = \infty$ (S) | $d_7 = 0.226$ | | |
| $r_8 = 4.395$ | $d_8 = 2.963$ | $n_{d4} = 1.72916$ | $v_{d4} = 54.68$ |
| $r_9 = -10.093*$ | $d_9 = 0.445$ | | |
| $r_{10} = -10.479$ | $d_{10} = 0.900$ | $n_{d5} = 1.84666$ | $v_{d5} = 23.78$ |
| $r_{11} = 6.895*$ | $d_{11} =$ variable | | |
| $r_{12} = 10.678*$ | $d_{12} = 1.900$ | $n_{d6} = 1.84666$ | $v_{d6} = 23.78$ |
| $r_{13} = 34.486*$ | $d_{13} =$ variable | | |
| $r_{14} = \infty$ | $d_{14} = 0.500$ | $n_{d7} = 1.54771$ | $v_{d7} = 62.84$ |
| $r_{15} = \infty$ | $d_{15} = 0.500$ | | |

-continued

| | | | |
|---|---|---|---|
| $r_{16} = \infty$ | $d_{16} = 0.500$ | $n_{d8} = 1.51633$ | $v_{d7} = 64.14$ |
| $r_{17} = \infty$ | $d_{17} = 0.600$ | | |
| $r_{18} = \infty$ (I) | | | |

TABLE 25-1

Aspherical Coefficient

| | First surface | Second surface | Third surface | Fourth surface |
|---|---|---|---|---|
| R | 23.111 | −28.669 | −10.862 | 5.945 |
| K | 3.867 | −17.018 | −24.767 | −0.979 |
| $A_4$ | 1.41852e−05 | 5.01823e−06 | −5.34390e−04 | 2.00639e−03 |
| $A_6$ | −1.82954e−06 | −1.08751e−06 | 2.73714e−07 | −1.57053e−04 |
| $A_8$ | 3.31572e−08 | 2.11274e−08 | 1.63353e−06 | 8.12819e−06 |
| $A_{10}$ | −5.71417e−10 | −4.04896e−10 | −6.14871e−08 | 1.51514e−07 |
| $A_{12}$ | 0.000 | 0.000 | 5.82474e−10 | −1.55486e−08 |

TABLE 25-2

Aspherical Coefficient

| | Eighth surface | Ninth surface | Eleventh surface | Twelfth surface |
|---|---|---|---|---|
| R | 4.395 | −10.093 | 6.895 | 10.678 |
| K | −0.126 | −1.788 | −1.541 | −2.429 |
| $A_4$ | −2.31341e−04 | 1.42181e−04 | 3.87791e−03 | 1.62650e−04 |
| $A_6$ | −3.42936e−05 | −1.01877e−04 | 1.24906e−04 | −4.98070e−06 |
| $A_8$ | −2.38589e−06 | −1.65182e−05 | 1.22878e−04 | −7.54471e−07 |
| $A_{10}$ | −6.93781e−07 | 1.56050e−06 | −1.45541e−05 | 1.29114e−09 |

TABLE 25-3

Aspherical Coefficient

| | Thirteenth surface |
|---|---|
| R | 34.486 |
| K | 26.492 |
| $A_4$ | −1.72971e−05 |
| $A_6$ | −1.71981e−05 |
| $A_8$ | −7.74088e−07 |
| $A_{10}$ | 1.13106e−08 |

TABLE 26

Zoom Data (∞)

|  | WE | ST1 | ST2 | ST3 | TE |
|---|---|---|---|---|---|
| fL(mm) | 6.72 | 10.1 | 14.97 | 22.16 | 33.11 |
| $F_{No}$ | 3.14 | 3.57 | 4.11 | 4.42 | 5.08 |
| 2ω(°) | 65.77 | 41.65 | 28.2 | 18.99 | 12.77 |
| $d_2$ | 1 | 3.335 | 5.01 | 8.895 | 10.857 |
| $d_6$ | 9.626 | 6.439 | 3.684 | 2.73 | 1 |
| $d_{11}$ | 2.3 | 3.156 | 4.035 | 8.551 | 13.689 |
| $d_{13}$ | 4.919 | 6.143 | 8.089 | 6.674 | 6.106 |

FIGS. 20A to 24C are aberration diagrams showing spherical aberrations (SA), astigmatisms (FC), distortions (DT) and chromatic aberrations of magnifications (CC) of Examples 8 to 12 when focused on an infinite object, FIGS. 20A, 21A, 22A, 23A and 24A show the aberrations in the wide-angle end, FIGS. 20B, 21B, 22B, 23B and 24B show the aberrations in the states shown in FIGS. 15C, 16C, 17C, 18C and 19C, respectively, and FIGS. 20C, 21C, 22C, 23C and 24C show the aberrations in the telephoto end. In the drawings, "ω" is a half angle of view of the object.

Next, values of Conditions (1) to (17) of the Examples are described below.

TABLE 27

|  | Example 8 | Example 9 | Example 10 | Example 11 | Example 12 |
|---|---|---|---|---|---|
| $f_T/f_{g1}$ | 1.33 | 1.10 | 1.28 | 1.25 | 1.26 |
| $f_T/f_{g2}$ | −4.54 | −4.05 | −4.86 | −4.91 | −4.81 |
| $f_T/f_{g3}$ | 2.89 | 3.03 | 3.27 | 3.18 | 3.36 |
| $f_{g1}/f_{g3}$ | 2.17 | 2.75 | 2.55 | 2.55 | 2.67 |
| $f_{g1}/f_{g4}$ | 1.83 | 2.05 | 1.33 | 1.65 | 1.49 |
| $f_{g2}/f_{g4}$ | −0.54 | −0.56 | −0.35 | −0.42 | −0.39 |
| $f_{g23w}/f_{g23T}$ | −1.18 | −0.59 | −0.47 | −0.61 | −0.54 |
| $f_{g1}/f_{g23T}$ | −1.51 | −1.18 | −1.04 | −1.11 | −1.18 |
| $\beta_{2T}/\beta_{2W}$ | 2.87 | 2.36 | 2.42 | 2.72 | 2.36 |
| $\beta_{3T}/\beta_{3W}$ | 1.54 | 2.01 | 2.19 | 1.71 | 2.38 |
| $\beta_{4T}/\beta_{4W}$ | 1.08 | 1.01 | 0.93 | 1.03 | 0.88 |
| $D_{g1}/D$ | 0.92 | 1.09 | 0.99 | 1.00 | 1.04 |
| $D_{g3}/D$ | 0.88 | 0.95 | 0.91 | 0.79 | 0.95 |
| $r_{2f}/r_{2r}$ | −3.62 | −2.62 | −2.06 | −3.63 | −4.83 |
| $r_{3f}/r_{3r}$ | −2.16 | −2.26 | −1.16 | −0.58 | −1.52 |
| $f_T/f_W$ | 4.79 | 4.78 | 4.92 | 4.78 | 4.93 |
| $(D_{g4s} − D_{g4max})/Ih$ | 0.70 | 0.38 | 0.70 | 0.70 | 0.49 |

Figure 25:
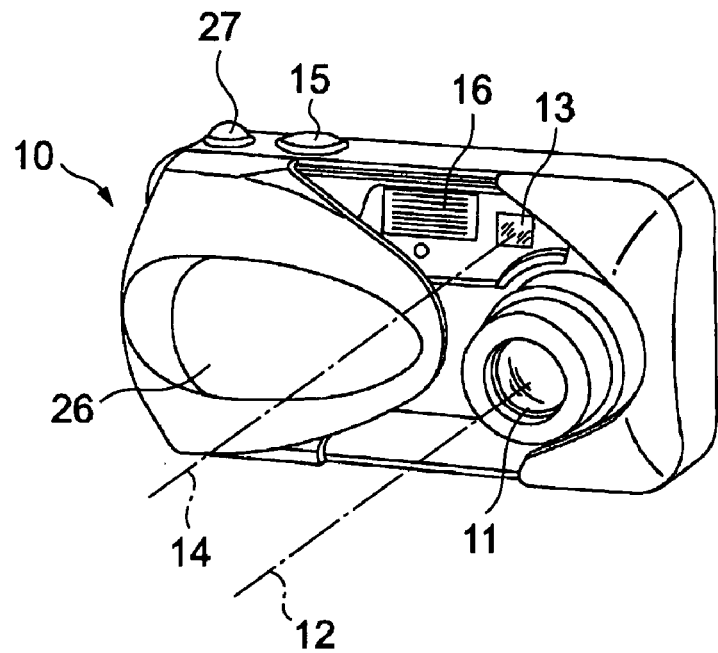
FIG. 25 is a front perspective view showing an appearance of a digital camera indicating a zoom lens system according to the present invention.
Figure 26:
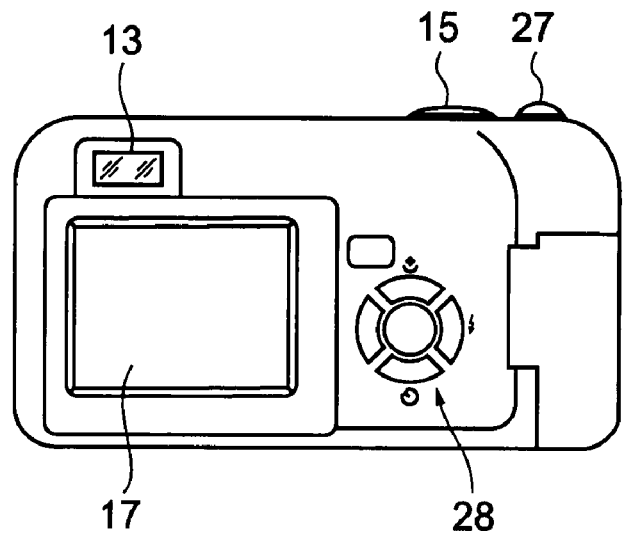
FIG. 26 is a rear view of the digital camera shown in FIG. 25.
Figure 27:
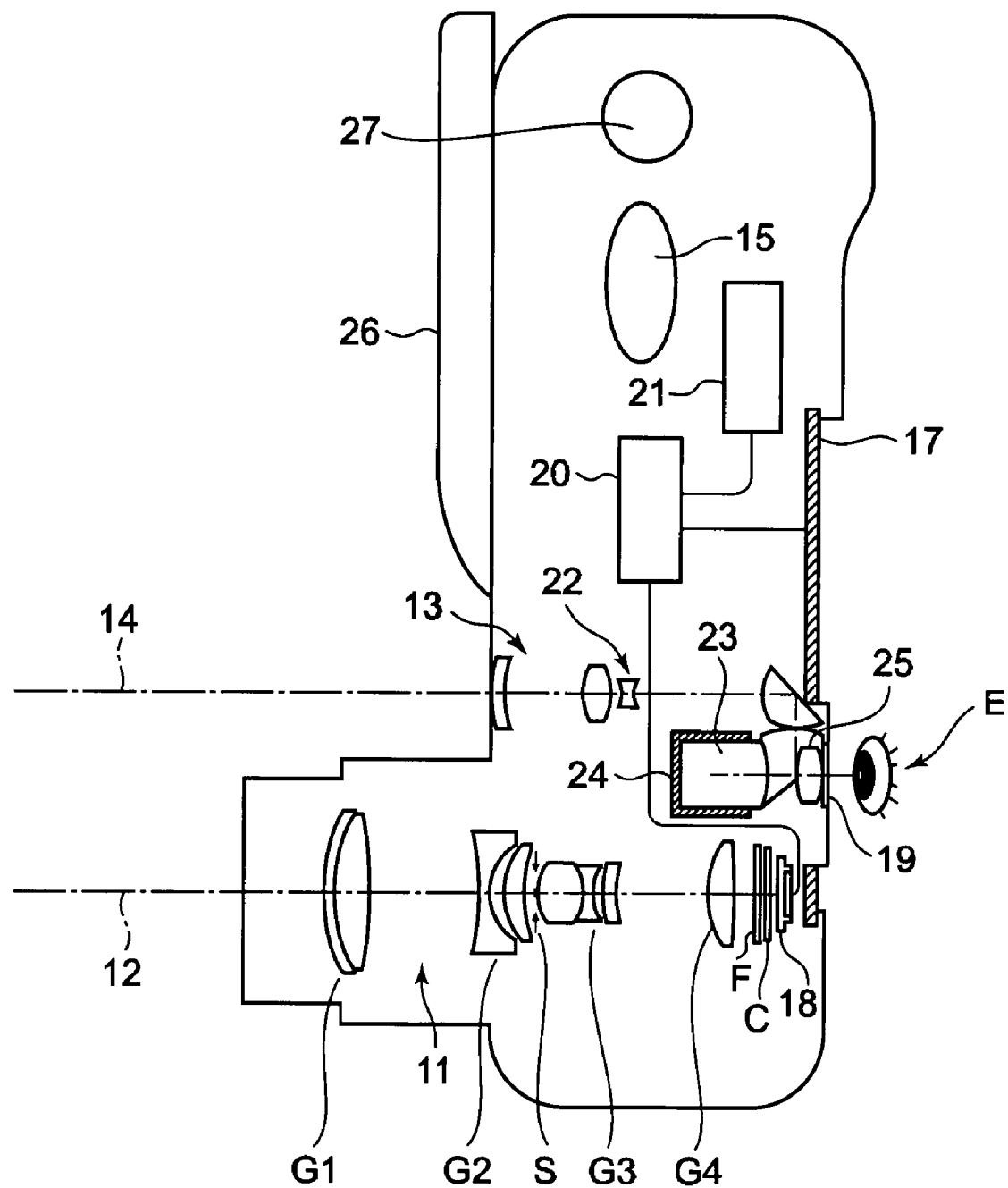
FIGS. 27 to 29 are explanatory views showing an inner constitution of the digital camera shown in FIG. 25.
Figure 28:
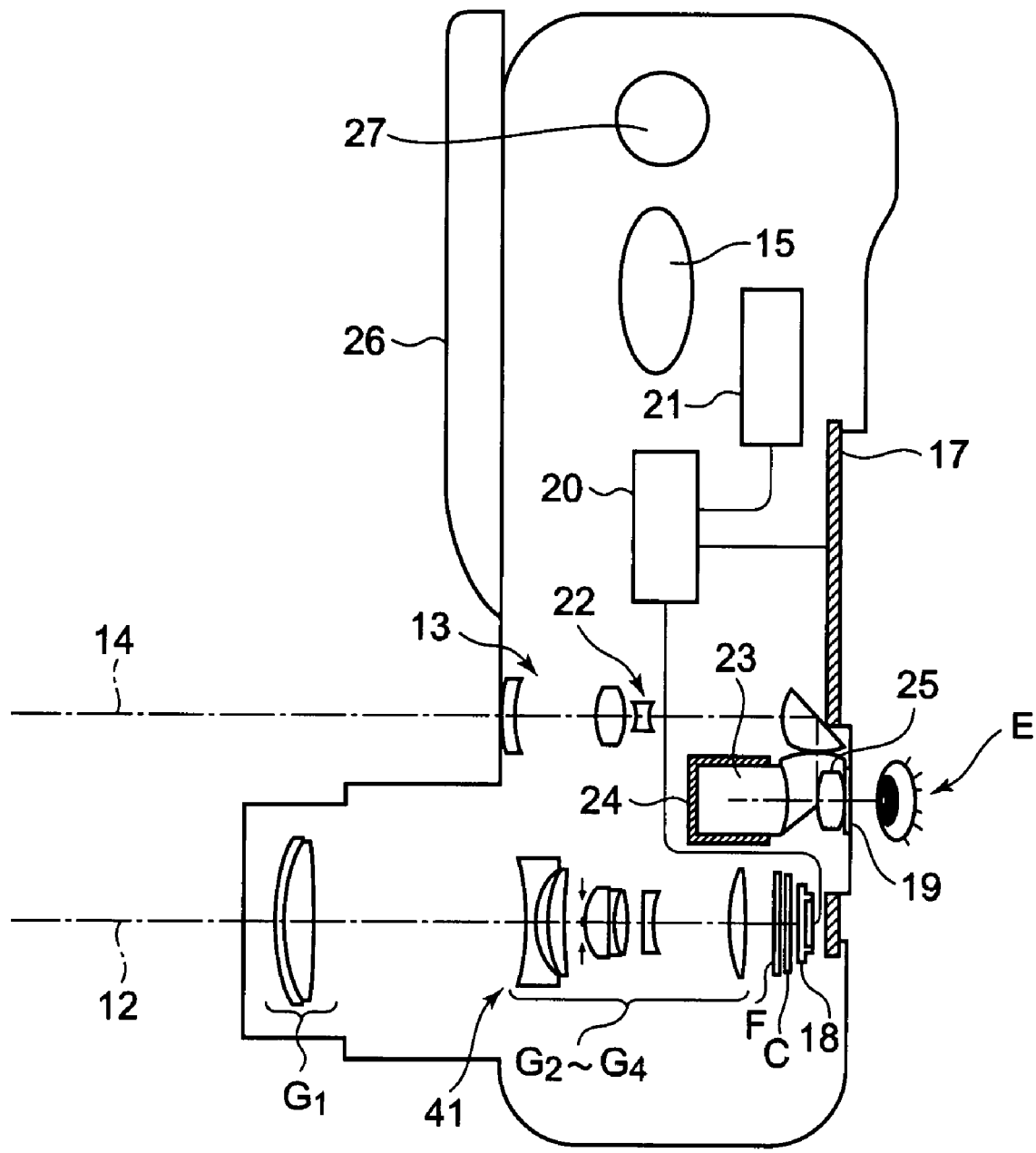
Figure 29:
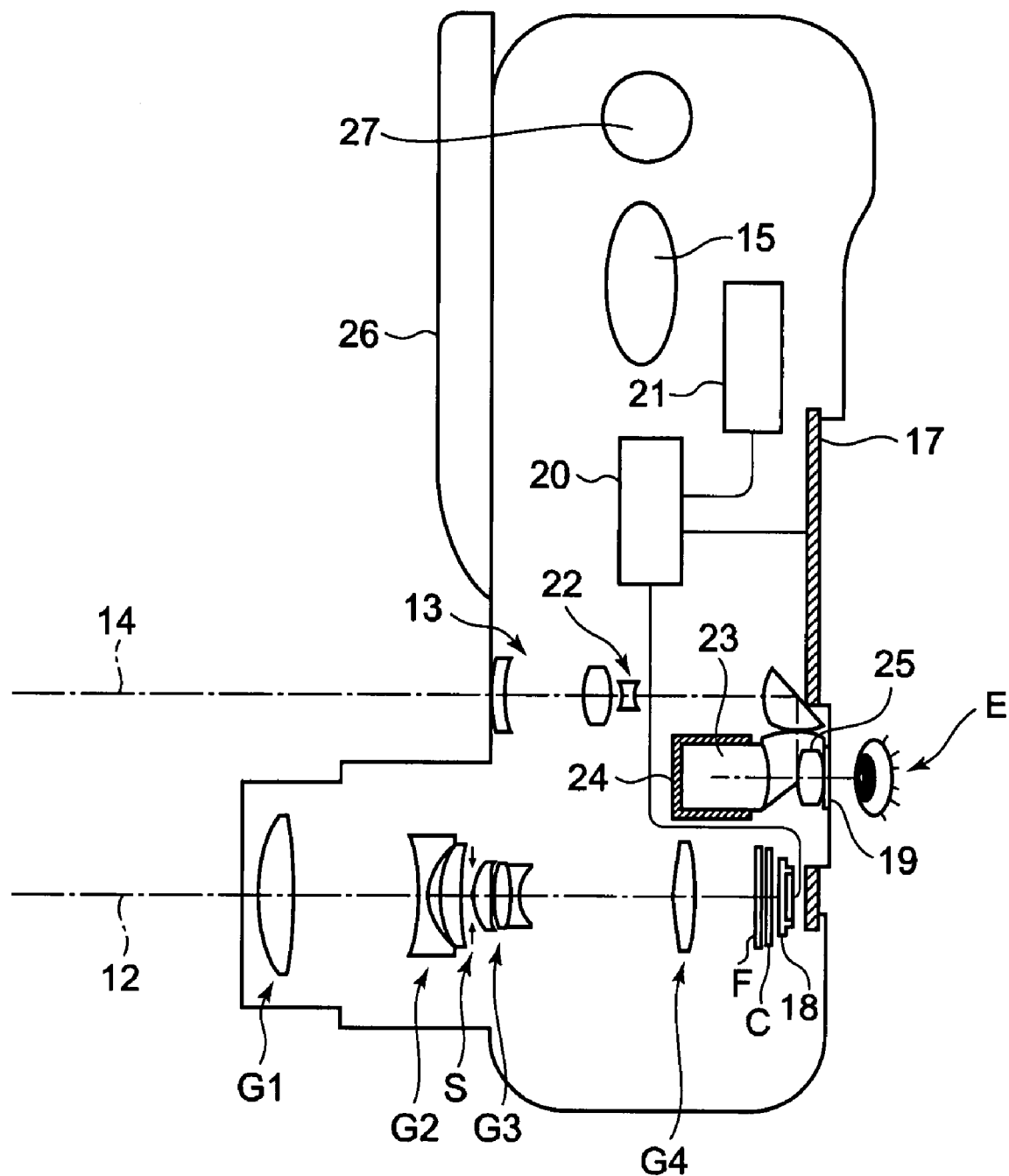

FIGS. 25 to 29 are conceptual diagrams showing a constitution of a digital camera, which is an example of an image pickup apparatus according to the present invention, in which the above zoom lens system is incorporated in a photographing optical system. FIG. 25 is a front perspective view showing an appearance of a digital camera 10, FIG. 26 is a rear view of the digital camera; and FIGS. 27 to 29 are explanatory views showing an inner constitution of the digital camera 10. In addition, in FIGS. 25 and 27 to 29, a non-collapsible state of a photographing optical system 11 is shown. In this example, the digital camera 10 includes the photographing optical system 11 having a photographing optical path 12; a finder optical system 13 having an optical path 14 for a finder; a shutter button 15; a flash lamp 16; a liquid crystal display monitor 17; a focal length change button 27; a setting change switch 28 and the like. In a case where the photographing optical system 11 is collapsed, when a cover 26 is slid, the photographing optical system 11, the finder optical system 13 and the flash lamp 16 are covered with the cover 26. Moreover, when the cover 26 is opened to bring the camera 10 into a photographing state, the photographing optical system 11 is brought into the non-collapsed state shown in FIG. 25. When the shutter button 15 disposed in an upper portion of the camera 10 is pressed, the photographing is performed through the photographing optical system 11 in response to the pressed button. The above zoom lens system is usable as the photographing optical system. FIG. 27 shows an example in which the zoom lens system (Example 1) shown in FIGS. 1A to 1E is used. FIG. 28 shows an example in which the zoom lens system (Example 4) shown in FIGS. 7A to 7E is used. FIG. 29 shows an example in which the zoom lens system (Example 8) shown in FIGS. 15A to 15E is used. By the photographing optical system 11, an image of an object is formed on an image pickup surface of a CCD image sensor 18 via a low pass filter F and a cover glass C provided with a wavelength band restrictive coating. This object image is converted into an electric signal by the CCD image sensor 18, and displayed as an electronic image in the liquid crystal display monitor 17 disposed in a rear surface of the camera via processing section 20. This processing section 20 is connected to recording section 21, and the photographed electronic image can be recorded. It is to be noted that in the recording section 21, a memory card, DVD, a hard disk drive (HDD) or the like is usable as a recording medium.

The objective optical system 13 for the finder is disposed along the optical path 14 for the finder. As the objective optical system 13 for the finder, a zoom optical system is used which is constituted of a plurality of lens units (three lens units in the drawing) and two prisms and in which a focal length changes in conjunction with the zoom lens system of the photographing optical system 11. The object image formed by the objective optical system 13 for the finder is formed on a view field frame 24 of an erecting prism 23 as an image erecting member. Behind this erecting prism 23, an eyepiece optical system 25 is disposed which leads an erected image into an observer's eyeball E. It is to be noted that a cover member 19 is disposed on an emission side of the eyepiece optical system 25.

In the digital camera 10 constituted in this manner, when the zoom lens system according to the present invention is used as the photographing optical system 11, a high performance, miniaturization and a wide angle of view can be realized.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens system comprising, in order from an object side:
    a first lens unit having a positive refractive power;
    a second lens unit having a negative refractive power;
    a third lens unit having a positive refractive power; and
    a fourth lens unit having a positive refractive power,
    wherein a space between the lens units is changed to perform magnification change from a wide-angle end to a telephoto end;
    the third lens unit comprises, in order from the object side, a first lens which is a positive lens element, a second lens which is a double concave negative lens element and a third lens which is a negative lens element, and the total number of the lens elements included in the third lens unit is three; and
    in the telephoto end as compared with the wide-angle end,
        a space between the first lens unit and the second lens unit increases, and
        a space between the second lens unit and the third lens unit decreases.

2. The zoom lens system according to claim 1, wherein the third lens of the third lens unit is a negative meniscus lens element whose convex surface faces the object side.

3. The zoom lens system according to claim 1, wherein the first lens unit and the third lens unit are arranged closer to the object side in the telephoto end than in the wide-angle end.

4. The zoom lens system according to claim 1, wherein the total number of the lens elements included in each of the first lens unit, the second lens unit and the fourth lens unit is one or two.

5. An image pickup apparatus comprising:
    the zoom lens system according to claim 1; and
    an image pickup element which is disposed on an image side of the zoom lens system and which converts an optical image formed by the zoom lens system into an electric signal.

6. A zoom lens system comprising, in order from an object side:
    a first lens unit having a positive refractive power;
    a second lens unit having a negative refractive power;
    a third lens unit having a positive refractive power; and
    a fourth lens unit having a positive refractive power,
    wherein a space between the lens units is changed to perform magnification change from a wide-angle end to a telephoto end;
    the third lens unit comprises, in order from the object side, a first lens which is a positive lens element, a second lens which is a negative lens element and a third lens which is a negative meniscus lens element whose convex surface faces the object side, and the total number of the lens elements included in the third lens unit is three; and
    in the telephoto end as compared with the wide-angle end,
        a space between the first lens unit and the second lens unit increases, and
        a space between the second lens unit and the third lens unit decreases.

7. A zoom lens system comprising, in order from an object side:
    a first lens unit having a positive refractive power;
    a second lens unit having a negative refractive power;
    a third lens unit having a positive refractive power; and
    a fourth lens unit having a positive refractive power,
    wherein the first lens unit, the second lens unit, the third lens unit and the fourth lens unit move in an optical axis direction so as to change an air space between the lens units, and perform magnification change from a wide-angle end to a telephoto end;
    in the telephoto end as compared with the wide-angle end,
        a space between the first lens unit and the second lens unit increases, and
        a space between the second lens unit and the third lens unit decreases;
    the third lens unit comprises, in order from the object side, a first lens which is a positive lens element, a second lens which is a negative lens element, a third lens which is a positive lens element and a fourth lens which is a negative lens element, and the total number of the lens elements included in the third lens unit is four; and
    the second lens of the third lens unit is cemented to at least one of the first lens and the third lens on the optical axis;
    wherein at least one of the second lens and the fourth lens of the third lens unit is a double concave lens.

8. The zoom lens system according to claim 7, wherein the first lens unit and the third lens unit are positioned closer to the object side in the telephoto end than in the wide-angle end.

9. An image pickup apparatus comprising:
    the zoom lens system according to claim 7;
    an image pickup element which is disposed on an image side of the zoom lens system and which converts an optical image formed by the zoom lens system into an electric signal.

10. A zoom lens system comprising, in order from an object side:
    a first lens unit having a positive refractive power;
    a second lens unit having a negative refractive power;
    a third lens unit having a positive refractive power; and
    a fourth lens unit having a positive refractive power,
    wherein the first lens unit, the second lens unit, the third lens unit and the fourth lens unit move in an optical axis direction so as to change an air space between the lens units, and perform magnification change from a wide-angle end to a telephoto end;
    in the telephoto end as compared with the wide-angle end,
        a space between the first lens unit and the second lens unit increases, and
        a space between the second lens unit and the third lens unit decreases;
    the third lens unit comprises, in order from the object side, a first lens which is a positive lens element, a second lens which is a negative lens element, a third lens which is a positive lens element and a fourth lens which is a negative lens element, and the total number of the lens elements included in the third lens unit is four; and
    the second lens of the third lens unit is cemented to at least one of the first lens and the third lens on the optical axis;
    wherein the total number of the lens elements included in each of the first lens unit, the second lens unit and the fourth lens unit is one or two.

11. A zoom lens system comprising, in order from an object side:
    a first lens unit having a positive refractive power;
    a second lens unit having a negative refractive power;
    a third lens unit having a positive refractive power; and
    a fourth lens unit having a positive refractive power,
    wherein during zooming from a wide-angle end to a telephoto end,
        a space between the first lens unit and the second lens unit increases, a space between the second lens unit and the third lens unit decreases, and a space between the third lens unit and the fourth lens unit changes;

the first lens unit comprises a positive lens element, and the total number of the lens elements included in the first lens unit is one;

the second lens unit comprises, in order from the object side, a negative lens element and a positive lens element, the total number of the lens elements included in the second lens unit is two, and the negative lens element of the second lens unit is a double concave negative lens element;

the third lens unit comprises, in order from the object side, a positive lens element, a positive lens element and a negative lens element, and the total number of the lens elements included in the third lens unit is three; and in the telephoto end, a composite system of the second lens unit and the third lens unit has a negative composite focal length.

12. The zoom lens system according to claim 11, further comprising:

an aperture stop disposed just before the third lens unit.

13. The zoom lens system according to claim 11, wherein the zoom lens system is four-unit zoom lens system.

14. The zoom lens system according to claim 11, wherein the fourth lens unit comprises a positive lens element, and the total number of the lens elements included in the fourth lens unit is one.

15. The zoom lens system according to claim 11, wherein the following condition is satisfied:

$$0.5 < f_T/f_{g1} < 2.5 \quad (1C),$$

in which $f_T$ is a focal length of the zoom lens system in the telephoto end, and $f_{g1}$ is a focal length of the first lens unit.

16. The zoom lens system according to claim 11, wherein the following condition is satisfied:

$$-7 < f_T/f_{g2} < -2 \quad (2C),$$

in which $f_T$ is a focal length of the zoom lens system in the telephoto end, and $f_{g2}$ is a focal length of the second lens unit.

17. The zoom lens system according to claim 11, wherein the following condition is satisfied:

$$1.8 < f_T/f_{g3} < 6 \quad (3C),$$

in which $f_T$ is a focal length of the zoom lens system in the telephoto end, and $f_{g3}$ is a focal length of the third lens unit.

18. The zoom lens system according to claim 11, wherein the following condition is satisfied:

$$1.5 < f_{g1}/f_{g3} < 3.0 \quad (4C),$$

in which $f_{g1}$ is a focal length of the first lens unit, and $f_{g3}$ is a focal length of the third lens unit.

19. The zoom lens system according to claim 11, wherein the following condition is satisfied:

$$1.0 < f_{g1}/f_{g4} < 3.0 \quad (5C),$$

in which $f_{g1}$ is a focal length of the first lens unit, and $f_{g4}$ is a focal length of the fourth lens unit.

20. The zoom lens system according to claim 11, wherein the following condition is satisfied:

$$-0.7 < f_{g2}/f_{g4} < -0.1 \quad (6C),$$

in which $f_{g2}$ is a focal length of the second lens unit, and $f_{g4}$ is a focal length of the fourth lens unit.

21. The zoom lens system according to claim 11, wherein a composite system of the second lens unit and the third lens unit have a positive composite focal length in the wide-angle end;

a composite system of the second lens unit and the third lens unit have a negative composite focal length in the telephoto end; and the following condition is satisfied:

$$-2.5 < f_{g23W}/f_{g23T} < -0.1 \quad (7C),$$

in which $f_{g23W}$ is a composite focal length of the composite system of the second lens unit and the third lens units in the wide-angle end, and $f_{g23T}$ is a composite focal length of the composite system of the second and the third lens units in the telephoto end.

22. The zoom lens system according to claim 11, wherein the following condition is satisfied:

$$-2.5 < f_{g1}/f_{g23T} < -0.5 \quad (8C),$$

in which $f_{g1}$ is a focal length of the first lens unit, and $f_{g23T}$ is a composite focal length of the composite system of the second lens unit and the third lens units in the telephoto end.

23. The zoom lens system according to claim 11, wherein the following condition is satisfied:

$$1.8 < \beta_{2T}/\beta_{2W} < 4.0 \quad (9C),$$

in which $\gamma_{2T}$ is a lateral magnification of the second lens unit in the telephoto end, and $\beta_{2W}$ is a lateral magnification of the second lens unit in the wide-angle end.

24. The zoom lens system according to claim 11, wherein the following condition is satisfied:

$$1.2 < \beta_{3T}/\beta_{3W} < 3.0 \quad (10C),$$

in which $\beta_{3T}$ is a lateral magnification of the third lens unit in the telephoto end, and $\beta_{3W}$ is a lateral magnification of the third lens unit in the wide-angle end.

25. The zoom lens system according to claim 11, wherein the following condition is satisfied:

$$0.85 < \beta_{4T}/\beta_{4W} < 2.0 \quad (11C),$$

in which $\beta_{4T}$ is a lateral magnification of the fourth lens unit in the telephoto end, and $\beta_{4W}$ is a lateral magnification of the fourth lens unit in the wide-angle end.

26. The zoom lens system according to claim 11, wherein the first lens unit is positioned closer to the object side in the telephoto end than in the wide-angle end; and the following condition is satisfied:

$$0.5 < D_{g1}/D < 2.0 \quad (12C),$$

in which $D_{g1}$ is a movement amount of the first lens unit during the magnification change from the wide-angle end to the telephoto end, and D is a sum of axial distances from incidence surfaces to emission surfaces of the lens units.

27. The zoom lens system according to claim 11, wherein the third lens unit is positioned closer to the object side in the telephoto end than in the wide-angle end; and the following condition is satisfied:

$$0.65 < D_{g3}/D < 1.5 \quad (13C),$$

in which $D_{g3}$ is a movement amount of the third lens unit during the magnification change from the wide-angle end to the telephoto end, and D is a sum of axial distances from the incidence surfaces to the emission surfaces of the lens units.

28. The zoom lens system according to claim 11, wherein the negative lens of the second lens unit is a double concave lens; and the following condition is satisfied:

$$-7 < r_{2f}/r_{2r} < -0.5 \quad (14C),$$

in which $r_{2f}$ is a paraxial radius of curvature of an object-side surface of the negative lens of the second lens unit, and $r_{2r}$ is a paraxial radius of curvature of an image-side surface of the negative lens of the second lens unit.

29. The zoom lens system according to claim 11, wherein the negative lens of the third lens unit is a double concave lens; and the following condition is satisfied:

$$-4 < r_{3f}/r_{3r} < -0.1 \quad (15C),$$

in which $r_{3f}$ is a paraxial radius of curvature of an object-side surface of the negative lens of the third lens unit, and $r_{3r}$ is a paraxial radius of curvature of an image-side surface of the negative lens of the third lens unit.

30. The zoom lens system according to claim 11, wherein the following condition is satisfied:

$$4.0 < f_T/f_W < 10.0 \quad (16C),$$

in which $f_T$ is a focal length of the zoom lens system in the telephoto end, and $f_W$ is a focal length of the zoom lens system in the wide-angle end.

31. The zoom lens system according to claim 11, wherein the fourth lens unit is positioned closer to the object side in an intermediate focal length state than in the wide-angle end and the telephoto end; and the following condition is satisfied:

$$0.1 < (D_{g4s} - D_{g4max})/Ih < 1.5 \quad (17C),$$

in which $D_{g4s}$ is a distance from an image surface of the zoom lens system to the fourth lens unit in the intermediate focal length state, $D_{g4max}$ is a larger value of distances from the image surface of the zoom lens system to the fourth lens unit in the wide-angle end and the telephoto end, and Ih is the maximum image height; and the intermediate focal length state is a state in which a focal length of the zoom lens system has a geometrical average value of the focal length of the zoom lens system in the wide-angle end and the focal length of the zoom lens system in the telephoto end.

32. An image pickup apparatus comprising:

the zoom lens system according to claim 11; and
an image pickup element which is disposed on an image side of the zoom lens system and which converts an image formed by the zoom lens system into an electric signal.

33. A zoom lens system comprising, in order from an object side:

a first lens unit having a positive refractive power;
a second lens unit having a negative refractive power;
a third lens unit having a positive refractive power; and
a fourth lens unit having a positive refractive power,
wherein during zooming from a wide-angle end to a telephoto end,
a space between the first lens unit and the second lens unit increases,
a space between the second lens unit and the third lens unit decreases, and
a space between the third lens unit and the fourth lens unit changes;
the first lens unit comprises a positive lens element, and the total number of the lens elements included in the first lens unit is one;
the second lens unit comprises, in order from the object side, a negative lens element and a positive lens element, and the total number of the lens elements included in the second lens unit is two;
the third lens unit comprises, in order from the object side, a positive lens element, a positive lens element and a negative lens element, and the total number of the lens elements included in the third lens unit is three; and
during zooming from the wide-angle end to the telephoto end, all of the first lens unit to the fourth lens unit move along an optical axis, and the fourth lens unit moves on a movement track which comprises a portion being convex toward the object side.

34. A zoom lens system comprising, in order from an object side:

a first lens unit having a positive refractive power;
a second lens unit having a negative refractive power;
a third lens unit having a positive refractive power; and
a fourth lens unit having a positive refractive power,
wherein during zooming from a wide-angle end to a telephoto end,
a space between the first lens unit and the second lens unit increases,
a space between the second lens unit and the third lens unit decreases, and
a space between the third lens unit and the fourth lens unit changes;
the first lens unit comprises a positive lens element, and the total number of the lens elements included in the first lens unit is one;
the second lens unit comprises, in order from the object side, a negative lens element and a positive lens element, and the total number of the lens elements included in the second lens unit is two; and
the third lens unit comprises, in order from the object side, a positive lens element and a double concave negative lens element, and the total number of the lens elements included in the third lens unit is two.

35. A zoom lens system comprising, in order from an object side:

a first lens unit having a positive refractive power;
a second lens unit having a negative refractive power;
a third lens unit having a positive refractive power; and
a fourth lens unit having a positive refractive power,
wherein the first lens unit, the second lens unit, the third lens unit and the fourth lens unit move in an optical axis direction so as to change an air space between the lens units, and perform magnification change from a wide-angle end to a telephoto end;
in the telephoto end as compared with the wide-angle end,
a space between the first lens unit and the second lens unit increases, and
a space between the second lens unit and the third lens unit decreases;
the third lens unit comprises, in order from the object side, a first lens which is a positive lens element, a second lens which is a negative lens element, a third lens which is a positive lens element and a fourth lens which is a negative lens element, and the total number of the lens elements included in the third lens unit is four;
the second lens of the third lens unit is cemented to at least one of the first lens and the third lens on the optical axis; and
the total number of the lens elements included in the first lens unit is two.

36. A zoom lens system comprising, in order from an object side:

a first lens unit having a positive refractive power;
a second lens unit having a negative refractive power;
a third lens unit having a positive refractive power; and a fourth lens unit having a positive refractive power,
wherein the first lens unit, the second lens unit, the third lens unit and the fourth lens unit move in an optical axis direction so as to change an air space between the lens units, and perform magnification change from a wide-angle end to a telephoto end;
in the telephoto end as compared with the wide-angle end,
  a space between the first lens unit and the second lens unit increases, and
  a space between the second lens unit and the third lens unit decreases;
the third lens unit comprises, in order from the object side, a first lens which is a positive lens element, a second lens which is a negative lens element, a third lens which is a positive lens element and a fourth lens which is a negative lens element, and the total number of the lens elements included in the third lens unit is four;
the second lens of the third lens unit is cemented to at least one of the first lens and the third lens on the optical axis; and
the total number of the lens components included in the first lens unit is one.

37. A zoom lens system comprising, in order from an object side:
a first lens unit having a positive refractive power;
a second lens unit having a negative refractive power;
a third lens unit having a positive refractive power; and
a fourth lens unit having a positive refractive power,
wherein the first lens unit, the second lens unit, the third lens unit and the fourth lens unit move in an optical axis direction so as to change an air space between the lens units, and perform magnification change from a wide-angle end to a telephoto end;
in the telephoto end as compared with the wide-angle end,
  a space between the first lens unit and the second lens unit increases, and
  a space between the second lens unit and the third lens unit decreases;
the third lens unit comprises, in order from the object side, a first lens which is a positive lens element, a second lens which is a negative lens element, a third lens which is a positive lens element and a fourth lens which is a negative lens element, and the total number of the lens elements of the third lens unit is four;
at least one of the second lens and the fourth lens of the third lens unit is a double concave lens; and
the total number of the lens elements included in the first lens unit is two.

38. A zoom lens system comprising, in order from an object side:
a first lens unit having a positive refractive power;
a second lens unit having a negative refractive power;
a third lens unit having a positive refractive power; and
a fourth lens unit having a positive refractive power,
wherein the first lens unit, the second lens unit, the third lens unit and the fourth lens unit move in an optical axis direction so as to change an air space between the lens units, and perform magnification change from a wide-angle end to a telephoto end;
in the telephoto end as compared with the wide-angle end,
  a space between the first lens unit and the second lens unit increases, and
  a space between the second lens unit and the third lens unit decreases;
the third lens unit comprises, in order from the object side, a first lens which is a positive lens element, a second lens which is a negative lens element, a third lens which is a positive lens element and a fourth lens which is a negative lens element, and the total number of the lens elements of the third lens unit is four;
at least one of the second lens and the fourth lens of the third lens unit is a double concave lens; and
the total number of the lens components included in the first lens unit is one.

39. A zoom lens system comprising, in order from an object side:
a first lens unit having a positive refractive power;
a second lens unit having a negative refractive power;
a third lens unit having a positive refractive power; and
a fourth lens unit having a positive refractive power,
wherein during zooming from a wide-angle end to a telephoto end,
  a space between the first lens unit and the second lens unit increases,
  a space between the second lens unit and the third lens unit decreases, and
  a space between the third lens unit and the fourth lens unit changes;
the first lens unit comprises a positive lens element, and the total number of the lens elements included in the first lens unit is one;
the second lens unit comprises, in order from the object side, a negative lens element and a positive lens element, the total number of the lens elements included in the second lens unit is two, and the negative lens element of the second lens unit is a double concave negative lens element;
the third lens unit comprises, in order from the object side, a positive lens element and a negative lens element, and the total number of the lens elements included in the third lens unit is two; and
the following condition is satisfied:

$$1.8 < f_T/f_{g3} < 6$$

in which $f_T$ is a focal length of the zoom lens system in the telephoto end, and $f_{g3}$ is a focal length of the third lens unit.

40. A zoom lens system comprising, in order from an object side:
a first lens unit having a positive refractive power;
a second lens unit having a negative refractive power;
a third lens unit having a positive refractive power; and
a fourth lens unit having a positive refractive power,
wherein during zooming from a wide-angle end to a telephoto end,
  a space between the first lens unit and the second lens unit increases,
  a space between the second lens unit and the third lens unit decreases, and
  a space between the third lens unit and the fourth lens unit changes;
the first lens unit comprises a positive lens element, and the total number of the lens elements included in the first lens unit is one;
the second lens unit comprises, in order from the object side, a negative lens element and a positive lens element, the total number of the lens elements included in the second lens unit is two, and the negative lens element of the second lens unit is a double concave negative lens element;
the third lens unit comprises, in order from the object side, a positive lens element and a negative lens element, and the total number of the lens elements included in the third lens unit is two;

a composite system of the second lens unit and the third lens unit has a positive composite focal length in the wide-angle end;

a composite system of the second lens unit and the third lens unit has a negative composite focal length in the telephoto end; and the following condition is satisfied:

$$-2.5 < f_{g23W}/f_{g23T} < -0.1$$

in which $f_{g23W}$ is a composite focal length of the composite system of the second lens unit and the third lens units in the wide-angle end, and $f_{g23T}$ is a composite focal length of the composite system of the second and the third lens units in the telephoto end.

41. A zoom lens system comprising, in order from an object side:

a first lens unit having a positive refractive power;
a second lens unit having a negative refractive power;
a third lens unit having a positive refractive power; and
a fourth lens unit having a positive refractive power,
wherein during zooming from a wide-angle end to a telephoto end,
a space between the first lens unit and the second lens unit increases,
a space between the second lens unit and the third lens unit decreases, and
a space between the third lens unit and the fourth lens unit changes;
the first lens unit comprises a positive lens element, and the total number of the lens elements included in the first lens unit is one;
the second lens unit comprises, in order from the object side, a negative lens element and a positive lens element, the total number of the lens elements included in the second lens unit is two, and the negative lens element of the second lens unit is a double concave negative lens element;
the third lens unit comprises, in order from the object side, a positive lens element and a negative lens element, and the total number of the lens elements included in the third lens unit is two; and
the following condition is satisfied:

$$-2.5 < f_{g1}/f_{g23T} < -0.5$$

in which $f_{g1}$ is a focal length of the first lens unit, and $f_{g23T}$ is a composite focal length of the composite system of the second lens unit and the third lens units in the telephoto end.

42. A zoom lens system comprising, in order from an object side:

a first lens unit having a positive refractive power;
a second lens unit having a negative refractive power;
a third lens unit having a positive refractive power; and
a fourth lens unit having a positive refractive power,
wherein during zooming from a wide-angle end to a telephoto end,
a space between the first lens unit and the second lens unit increases,
a space between the second lens unit and the third lens unit decreases, and
a space between the third lens unit and the fourth lens unit changes;
the first lens unit comprises a positive lens element, and the total number of the lens elements included in the first lens unit is one;
the second lens unit comprises, in order from the object side, a negative lens element and a positive lens element, the total number of the lens elements included in the second lens unit is two, and the negative lens element of the second lens unit is a double concave negative lens element;
the third lens unit comprises, in order from the object side, a positive lens element and a negative lens element, and the total number of the lens elements included in the third lens unit is two;
the first lens unit is positioned closer to the object side in the telephoto end than in the wide-angle end; and
the following condition is satisfied:

$$0.5 < D_{g1}/D < 2.0$$

in which $D_{g1}$ is a movement amount of the first lens unit during the magnification change from the wide-angle end to the telephoto end, and D is a sum of axial distances from incidence surfaces to emission surfaces of the lens units.

43. A zoom lens system comprising, in order from an object side:

a first lens unit having a positive refractive power;
a second lens unit having a negative refractive power;
a third lens unit having a positive refractive power; and
a fourth lens unit having a positive refractive power,
wherein during zooming from a wide-angle end to a telephoto end,
a space between the first lens unit and the second lens unit increases,
a space between the second lens unit and the third lens unit decreases, and
a space between the third lens unit and the fourth lens unit changes;
the first lens unit comprises a positive lens element, and the total number of the lens elements included in the first lens unit is one;
the second lens unit comprises, in order from the object side, a negative lens element and a positive lens element, the total number of the lens elements included in the second lens unit is two, and the negative lens element of the second lens unit is a double concave negative lens element;
the third lens unit comprises, in order from the object side, a positive lens element and a negative lens element, and the total number of the lens elements included in the third lens unit is two;
the third lens unit is positioned closer to the object side in the telephoto end than in the wide-angle end; and
the following condition is satisfied:

$$0.65 < D_{g3}/D < 1.5$$

in which $D_{g3}$ is a movement amount of the third lens unit during the magnification change from the wide-angle end to the telephoto end, and D is a sum of axial distances from the incidence surfaces to the emission surfaces of the lens units.

44. A zoom lens system comprising, in order from an object side:

a first lens unit having a positive refractive power;
a second lens unit having a negative refractive power;
a third lens unit having a positive refractive power; and
a fourth lens unit having a positive refractive power,
wherein during zooming from a wide-angle end to a telephoto end,
a space between the first lens unit and the second lens unit increases,
a space between the second lens unit and the third lens unit decreases, and
a space between the third lens unit and the fourth lens unit changes;

the first lens unit comprises a positive lens element, and the total number of the lens elements included in the first lens unit is one;

the second lens unit comprises, in order from the object side, a negative lens element and a positive lens element, the total number of the lens elements included in the second lens unit is two, and the negative lens element of the second lens unit is a double concave negative lens element;

the third lens unit comprises, in order from the object side, a positive lens element and a negative lens element, and the total number of the lens elements included in the third lens unit is two;

the negative lens of the second lens unit is a double concave lens; and the following condition is satisfied:

$$-7 < r_{2f}/r_{2r} < -0.5$$

in which $r_{2f}$ is a paraxial radius of curvature of an object-side surface of the negative lens of the second lens unit, and $r_{2r}$ is a paraxial radius of curvature of an image-side surface of the negative lens of the second lens unit.

45. A zoom lens system comprising, in order from an object side:
a first lens unit having a positive refractive power;
a second lens unit having a negative refractive power;
a third lens unit having a positive refractive power; and
a fourth lens unit having a positive refractive power,
wherein during zooming from a wide-angle end to a telephoto end,
a space between the first lens unit and the second lens unit increases,
a space between the second lens unit and the third lens unit decreases, and
a space between the third lens unit and the fourth lens unit changes;
the first lens unit comprises a positive lens element, and the total number of the lens elements included in the first lens unit is one;
the second lens unit comprises, in order from the object side, a negative lens element and a positive lens element, the total number of the lens elements included in the second lens unit is two, and the negative lens element of the second lens unit is a double concave negative lens element;
the third lens unit comprises, in order from the object side, a positive lens element and a negative lens element, and the total number of the lens elements included in the third lens unit is two;
the fourth lens unit is positioned closer to the object side in an intermediate focal length state than in the wide-angle end and the telephoto end;
the following condition is satisfied:

$$0.1 < (D_{g4s} - D_{g4max})/Ih < 1.5$$

in which $D_{g4s}$ is a distance from an image surface of the zoom lens system to the fourth lens unit in the intermediate focal length state, $D_{g4max}$ is a larger value of distances from the image surface of the zoom lens system to the fourth lens unit in the wide-angle end and the telephoto end, and Ih is the maximum image height; and the intermediate focal length state is a state in which a focal length of the zoom lens system has a geometrical average value of the focal length of the zoom lens system in the wide-angle end and the focal length of the zoom lens system in the telephoto end.

46. A zoom lens system comprising, in order from an object side:
a first lens unit having a positive refractive power;
a second lens unit having a negative refractive power;
a third lens unit having a positive refractive power; and
a fourth lens unit having a positive refractive power,
wherein during zooming from a wide-angle end to a telephoto end,
a space between the first lens unit and the second lens unit increases,
a space between the second lens unit and the third lens unit decreases, and
a space between the third lens unit and the fourth lens unit changes;
the first lens unit comprises a positive lens element, and the total number of the lens elements included in the first lens unit is one;
the second lens unit comprises, in order from the object side, a negative lens element and a positive lens element, the total number of the lens elements included in the second lens unit is two, and the negative lens element of the second lens unit is a double concave negative lens element;
the third lens unit comprises, in order from the object side, a positive lens element and a negative lens element, and the total number of the lens elements included in the third lens unit is two; and
the positive lens element in the second lens unit has an object side lens surface convex to the object side.

47. A zoom lens system comprising, in order from an object side:
a first lens unit having a positive refractive power;
a second lens unit having a negative refractive power;
a third lens unit having a positive refractive power; and
a fourth lens unit having a positive refractive power,
wherein during zooming from a wide-angle end to a telephoto end,
a space between the first lens unit and the second lens unit increases,
a space between the second lens unit and the third lens unit decreases, and
a space between the third lens unit and the fourth lens unit changes;
the first lens unit comprises a positive lens element, and the total number of the lens elements included in the first lens unit is one;
the second lens unit comprises, in order from the object side, a negative lens element and a positive lens element, the total number of the lens elements included in the second lens unit is two, and the negative lens element of the second lens unit is a double concave negative lens element;
the third lens unit comprises, in order from the object side, a positive lens element and a negative lens element, and the total number of the lens elements included in the third lens unit is two; and
the total number of the lens components included in the third lens unit is one.

48. A zoom lens system comprising, in order from an object side:
a first lens unit having a positive refractive power;
a second lens unit having a negative refractive power;
a third lens unit having a positive refractive power; and
a fourth lens unit having a positive refractive power,
wherein during zooming from a wide-angle end to a telephoto end, a space between the first lens unit and the second lens unit increases, a space between the second lens unit and the third lens unit decreases, and a space between the third lens unit and the fourth lens unit changes;

the first lens unit comprises a positive lens element, and the total number of the lens elements included in the first lens unit is one;

the second lens unit comprises, in order from the object side, a negative lens element and a positive lens element, the total number of the lens elements included in the second lens unit is two, and the negative lens element of the second lens unit is a double concave negative lens element;

the third lens unit comprises, in order from the object side, a positive lens element and a negative lens element, and the total number of the lens elements included in the third lens unit is two; and the zoom lens system comprises an aperture stop which moves with the third lens unit.

* * * * *